(12) United States Patent
Rapoport et al.

(10) Patent No.: US 6,950,059 B2
(45) Date of Patent: Sep. 27, 2005

(54) POSITION ESTIMATION USING A NETWORK OF A GLOBAL-POSITIONING RECEIVERS

(75) Inventors: Lev Borisovich Rapoport, Moscow (RU); Alexei Eugenyevich Zinoviev, Moscow (RU)

(73) Assignee: Topcon GPS LLC, Pleasanton, CA (US)

( * ) Notice: Subject to any disclaimer, the term of this patent is extended or adjusted under 35 U.S.C. 154(b) by 186 days.

(21) Appl. No.: 10/670,116

(22) Filed: Sep. 23, 2003

(65) Prior Publication Data

US 2004/0130485 A1 Jul. 8, 2004

Related U.S. Application Data

(60) Provisional application No. 60/413,205, filed on Sep. 23, 2002.

(51) Int. Cl.$^7$ ................................................ H04B 7/185
(52) U.S. Cl. .............................. 342/357.03; 342/357.06
(58) Field of Search ........................ 342/357.01, 357.02, 342/357.03, 357.04, 357.06; 701/207, 213, 214, 215

(56) References Cited

U.S. PATENT DOCUMENTS

| | | | | |
|---|---|---|---|---|
| 5,786,773 | A | * 7/1998 | Murphy | 340/947 |
| 5,899,957 | A | * 5/1999 | Loomis | 701/214 |
| 6,181,274 | B1 | * 1/2001 | Pratt et al. | 342/357.04 |
| 6,374,432 | B1 | * 4/2002 | Morris | 4/476 |
| 6,397,147 | B1 | * 5/2002 | Whitehead | 701/213 |

* cited by examiner

*Primary Examiner*—Dao Phan
(74) *Attorney, Agent, or Firm*—Sheppard Mullin Richter & Hampton LLP

(57) ABSTRACT

Disclosed are methods and apparatuses for determining the position of a roving receiver in a coordinate system using at least two base-station receivers, which are located at fixed and known positions within the coordinate system. The knowledge of the precise locations of the base-station receivers makes it possible to better account for one or all of carrier ambiguities, receiver time offsets, and atmospheric effects encountered by the rover receiver, and to thereby increase the accuracy of the estimated receiver position of the rover. Baselines are established between the rover and each base-station, and baselines are established between the base stations. Navigation equations, which have known quantities and unknown quantities, are established for each baseline. Unknowns for the baseline between base stations are estimated, and then used to correlate and reduce the number of unknowns associated with rover baselines, thereby improving accuracy of the rover's estimated position.

78 Claims, 6 Drawing Sheets

| Instruction Set #1 directs the data processor to receive the known positions of the base stations |
|---|

| Instruction Set #2 directs the data processor to obtain a first time offset representative of the time difference between the clocks of the first and second base stations |
|---|

| Instruction Set #3 directs the data processor to obtain a second time offset representative of the time difference between the clocks of the first and third base stations |
|---|

| Instruction Set #4 directs the data processor to obtain a third time offset representative of the time difference between the clocks of the second and third base stations |
|---|

| Instruction Set #5 directs the data processor to generate a first set of residuals of differential navigation equations associated with a first baseline (R–B1) between the rover and the first base station, the residuals being related to the measured pseudo-range satellite data received by the rover station and the first base station, the locations of the satellites, and the locations of the rover station and the first base station |
|---|

| Instruction Set #6 directs the data processor to generate a second set of residuals of differential navigation equations associated with a second baseline (R–B2) between the rover and the second base station, the residuals being related to the measured pseudo-range satellite data received by the rover station and the second base station, the locations of the satellites, and the locations of the rover station and the second base station |
|---|

| Instruction Set #7 directs the data processor to generate a third set of residuals of differential navigation equations associated with a third baseline (R–B3) between the rover and the third base station, the residuals being related to the measured pseudo-range satellite data received by the rover station and the third base station, the locations of the satellites, and the locations of the rover station and the third base station |
|---|

| Instruction Set #8 directs the data processor to obtain a first set of satellite carrier-phase cycle ambiguities associated with the baseline between the first and second base stations |
|---|

| Instruction Set #9 directs the data processor to obtain a second set of satellite carrier-phase cycle ambiguities associated with the baseline between the first and third base stations |
|---|

| Instruction Set #10 directs the data processor to obtain a third set of satellite carrier-phase cycle ambiguities associated with the baseline between the second and third base stations |
|---|

COMPUTER-READABLE MEDIUM

*FIG. 7A*

| FIG. 7A |
|---|
| FIG. 7B |

Instruction Set #11 directs the data processor to generate a first set of carrier-phase-based residuals for the first baseline (R-B1) between the rover and the first base station, the first set of carrier-phase-based residuals of differential navigation equations being related to at least the measured satellite carrier-phase data received by the rover station and the first base station, the locations of the satellites, and the locations of the rover station and the first base station Instruction Set #12 directs the data processor to generate a second set of carrier-phase-based residuals of differential navigation equations for the second baseline (R-B2) between the rover and the second base station, the second set of carrier-phase-based residuals being related to at least the measured satellite carrier-phase data received by the rover station and the second base station, the locations of the satellites, and the locations of the rover station and the second base station Instruction Set #13 directs the data processor to generate a third set of carrier-phase-based residuals of differential navigation equations for the third baseline (R-B3) between the rover and the third base station, the third set of carrier-phase-based residuals being related to at least the measured satellite carrier-phase data received by the rover station and the third base station, the locations of the satellites, and the locations of the rover station and the third base station Instruction Set #14 directs the data processor to obtain a first set of first ionosphere delay differentials associated with the satellite signals received along the base line formed by the first and second base stations Instruction Set #15 directs the data processor to obtain a second set of second ionosphere delay differentials associated with the satellite signals received along the base line formed by the first and third base stations Instruction Set #16 directs the data processor to obtain a third set of second ionosphere delay differentials associated with the satellite signals received along the base line formed by the second and third base stations Instruction Set #17 directs the data processor to generate corrections to one or more of the residuals, the corrections being related to the first set of first ionosphere delay differentials, the second set of second ionosphere delay differentials, the locations of the base stations, and an estimated location of the rover station, wherein one or more of the sets of the instructions which direct the processor to generate the residuals further comprises instructions to modify their respective residuals with the corrections Instruction Set #18 directs the data processor to generate an estimate of the rover's location from the sets of residuals, the time offsets between the clocks of the base stations, the sets of the carrier-phase-based residuals, and the sets of satellite-phase cycle ambiguities

COMPUTER-READABLE MEDIUM

*FIG. 7B*

POSITION ESTIMATION USING A
NETWORK OF A GLOBAL-POSITIONING
RECEIVERS

CROSS-REFERENCE TO RELATED APPLICATION

This application claims priority under 35 U.S.C. §119(e) to Provisional U.S. Patent Application Ser. No. 60/413,205, filed Sep. 23, 2002, the entire contents of which are incorporated herein by reference.

FIELD OF THE INVENTION

The present invention relates to estimating the precise position of a stationary or moving object using multiple satellite signals and a network of multiple receivers. The present invention is particularly suited to position estimation in real-time kinetic environments where it is desirable to take into account the spatial distribution of the ionosphere delay.

BACKGROUND OF THE INVENTION

Satellite navigation systems, such as GPS (USA) and GLONASS (Russia), are intended for accurate self-positioning of different users possessing special navigation receivers. A navigation receiver receives and processes radio signals broadcast by satellites located within line-of-sight distance, and from this, computes the position of the receiver within a predefined coordinate system. However, for military reasons, the most accurate parts of these satellite signals are encrypted with codes only known to military users. Civilian users cannot access the most accurate parts of the satellite signals, which makes it difficult for civilian users to achieve accurate results. In addition, there are sources of noise and error that degrade the accuracy of the satellite signals, and consequently reduce the accuracy of computed values of position. Such sources include carrier ambiguities, receiver time offsets, and atmospheric effects on the satellite signals.

The present invention is directed to increasing the accuracy of estimating the position of a rover station in view of carrier ambiguities, receiver time offsets, and atmospheric effects.

SUMMARY OF THE INVENTION

The present invention relates to a method and apparatus for determining the position of a receiver (e.g., rover) with respect to the positions of at least two other receivers (e.g., base receivers) which are located at known positions. The knowledge of the precise locations of the at least two other receivers (located at known positions within the coordinate system) makes it possible to better account for one or all of carrier ambiguities, receiver time offsets, and atmospheric effects encountered by the rover receiver, and to thereby increase the accuracy of the estimated receiver position of the rover (e.g., rover position).

In a first aspect of the present invention, an exemplary apparatus/method comprises receiving the known locations of a first base station and a second base station, obtaining a time offset representative of the time difference between the clocks of the first and second base stations, and obtaining measured satellite data as received by the rover, the first base station, and the second base station. The measured satellite data comprises pseudo-range information. The exemplary apparatus/method generates a first set of residuals of differential navigation equations associated with a set of measured pseudo-ranges related to a first baseline (R-B1) between the rover and the first base station. The residuals are related to the measured satellite data received by the rover station and the first base station, the locations of the satellites, and the locations of the rover station and the first base station. The exemplary apparatus, method also generates a second set of residuals of differential navigation equations associated with a set of measure pseudo-ranges related to a second baseline (R-B2) between the rover and the second base station. These residuals are related to the measured satellite data received by the rover station and the second base station, the locations of the satellites, and the locations of the rover station and the second base station. The exemplary apparatus/method estimates the rover's location from the first set of residuals, the second set of residuals, and the time offset between the clocks of the first and second base stations.

In a second aspect of the present invention, the position information and measured satellite data from a third base station are received. Also, a time offset representative of the time difference between the clocks of the first and third base stations is obtained. Thereafter, the exemplary apparatus/method also generates a third set of residuals of differential navigation equations associated with a set of measured pseudo-ranges related to a third baseline (R-B3) between the rover and the third base station, and estimates the rover's location further with the third set of residuals and the time offset between the clocks of the first and third base stations.

In a third aspect of the present invention, which may be applied with any of the aspects of the present invention described herein, the exemplary apparatus/method generates the time offset(s) for the base stations from the measured satellite data of the base stations provided to it.

In a fourth aspect of the present invention, which may be applied with any of the aspects of the present invention described herein, the exemplary apparatus/method obtains measured satellite carrier phase data as received by the rover and the first base station (the first baseline). The exemplary apparatus/method generates a fourth set of residuals of differential navigation equations associated with a set of measured carrier phase data related to the first baseline, and resolves the cycle ambiguities in the carrier phase data from the fourth residual and one or more of the first, second, and third residuals. The resolved cycle ambiguities may take the form of floating ambiguities, fixed-integer ambiguities, and/or integer ambiguities. The exemplary apparatus/method estimates the rover's location further with the fourth set of residuals and the resolved cycle ambiguities associated with the first baseline.

In a fifth aspect of the present invention, which may be applied with any of the aspects of the present invention described herein, the exemplary apparatus/method obtains measured satellite carrier phase data as received by the second base station, and further obtains a set of cycle ambiguities related to a set of satellite phase measurements associated with the baseline between the first and second base stations (B1–B2). The exemplary apparatus/method generates a fifth set of residuals of differential navigation equations associated with a set of measured carrier phase data related to the second base line between the rover and the second base station (R-B2), and resolves the cycle ambiguities in the carrier phase data from the fifth residual, the set of cycle ambiguities associated with the baseline between the first and second base stations, and one or more of the first, second, third, and fourth residuals. The resolved cycle ambiguities may take the form of floating ambiguities, fixed-integer ambiguities, and/or integer ambiguities. The exemplary apparatus/method estimates the rover's location further with the fifth set of residuals and the resolved cycle ambiguities associated with the second baseline (R-B2).

In a sixth aspect of the present invention, which may be applied with any of the aspects of the present invention described herein, the exemplary apparatus/method receives measured satellite carrier phase data as received by the third base station, and further obtains a set of cycle ambiguities related to a set of satellite phase measurements associated with the baseline between the first and third base stations (B1–B3). The exemplary apparatus/method generates a sixth set of residuals of differential navigation equations associated with a set of measured carrier phase data related to the third base line between the rover and the third base station (R-B3), and resolves the cycle ambiguities in the carrier phase data from the sixth residual, the set of cycle ambiguities associated with the baseline between the first and third base stations, and one or more of the first, second, third, fourth, and fifth residuals. The resolved cycle ambiguities may take the form of floating ambiguities, fixed-integer ambiguities, and/or integer ambiguities. The exemplary apparatus/method estimates the rover's location further with the sixth set of residuals and the resolved cycle ambiguities associated with the third base line (R-B3).

In a seventh aspect of the present invention, which may be applied with any of the aspects of the present invention described herein, the exemplary apparatus/method obtains a first set of first ionosphere delay differentials associated with the satellite signals received along the baseline formed by the first and second base stations, and generates ionosphere delay corrections to one or more of the above-described first through sixth residuals from the first set of first ionosphere delay differentials, the locations of the first and second base stations, and an estimated location of the rover station. As a further option, the exemplary apparatus/method obtains a set of second ionosphere delay differentials associated with the satellite signals received along the baseline formed by the first and third base stations (or the baseline formed by the second and third base stations), and generates the ionosphere delay corrections to the one or more of the above-described first through sixth residuals further from the second set of ionosphere delay differentials and the location of the third base station.

In an eighth aspect of the present invention, which may be applied to the seventh and further aspects of the present invention described herein, the exemplary apparatus/method forms one or more of the first through sixth residuals to account for second order effects in the ionosphere delay corrections applied to the baselines associated with the rover, and further generates an estimate of the second order effects.

In a ninth aspect of the present invention, which may be applied with any of the aspects of the present invention described herein, the exemplary apparatus/method generates the time offset representative of the time difference between the clocks of the first and second base stations, and optionally the time offset representative of the time difference between the clocks of the first and third base stations. As a further option, the apparatus/method generates the time offset representative of the time difference between the clocks of the second and third base stations, and performs a consistency check of the time offsets.

In an tenth aspect of the present invention, which may be applied with several of the aspects of the present invention described herein, the exemplary apparatus/method generates the resolved cycle ambiguities associated with the baseline between the first and second base stations (B1–B2), and optionally generates the resolved cycle ambiguities associated with the baseline between the first and third base stations (B1–B3). As a further option, the apparatus/method generates the resolved cycle ambiguities associated with the baseline between the second and third base stations (B2–B3), and performs a consistency check of the cycle ambiguities associated with the baselines between the base stations.

In an eleventh aspect of the present invention, which may be applied with any aspects of the present invention described herein which account for ionosphere delays, the exemplary apparatus/method generates the first set of first ionosphere delay differentials, and optionally the second set of first ionosphere delay differentials. As a further option, the apparatus/method generates a third set of ionosphere delay differentials associated with the satellite signals received along the baseline formed by the second and third base stations, and generates therefrom three sets of ionosphere delay differentials which are self-consistent.

Accordingly, it is an object of the present invention to increase the accuracy of estimating the rover's position using information from one or more baselines associated with two or more base stations.

It is a further object of the present invention to enable the spacing between the rover and the base stations to increase while maintaining or improving the accuracy of the estimation of the rover's position.

These and other objects of the present invention will become apparent to those skilled in the art from the following detailed description of the invention, the accompanying drawings, and the appended claims.

BRIEF DESCRIPTION OF THE DRAWINGS

FIG. 7 is a schematic diagram of an exemplary computer program product according to the present invention.

DETAILED DESCRIPTION OF THE INVENTION

Figure 1:
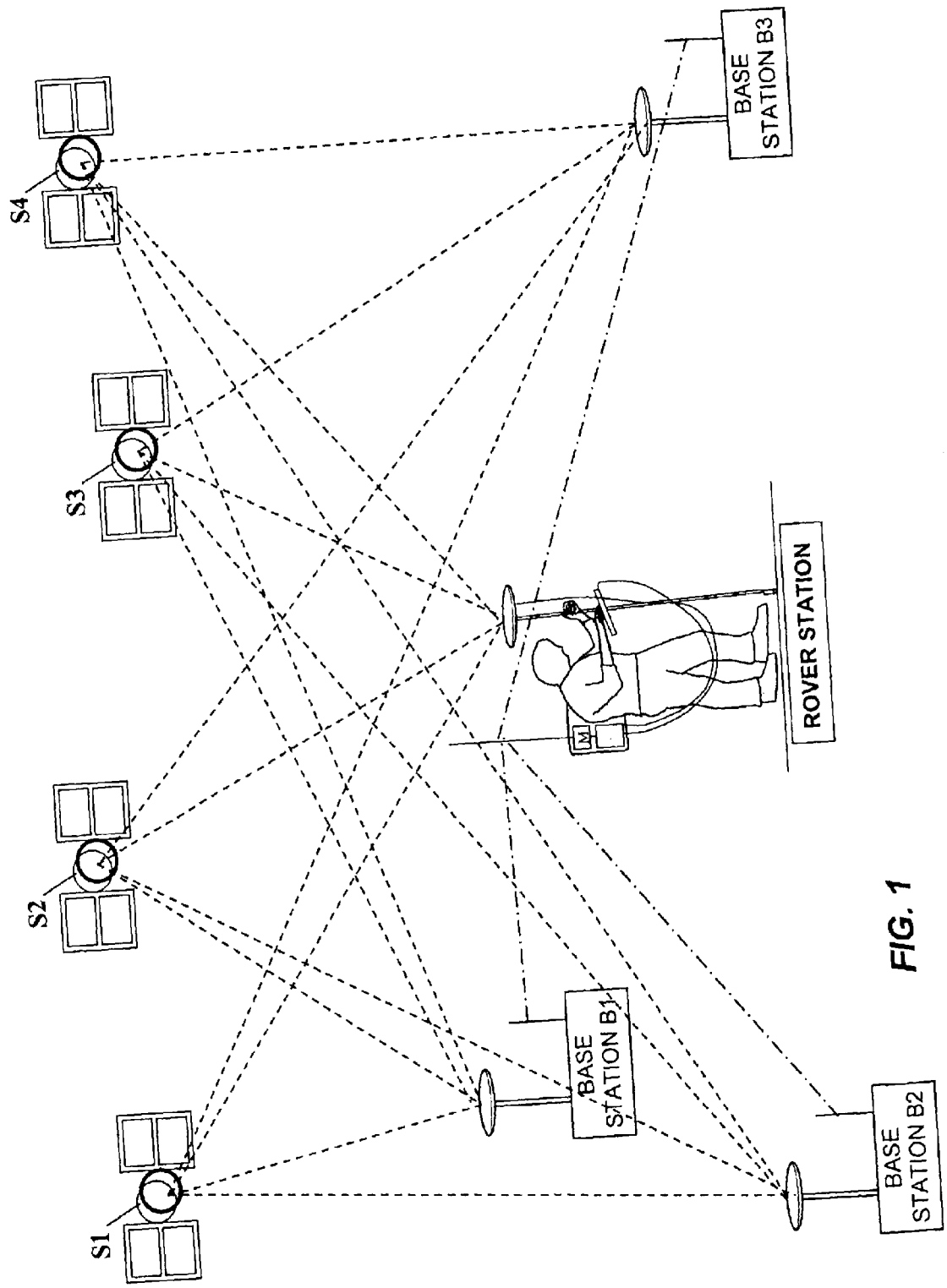
FIG. 1 is a perspective view of a rover station (R) and three base stations (B1, B2, B3) in an exemplary network according to exemplary embodiments of the present invention.
Figure 2:
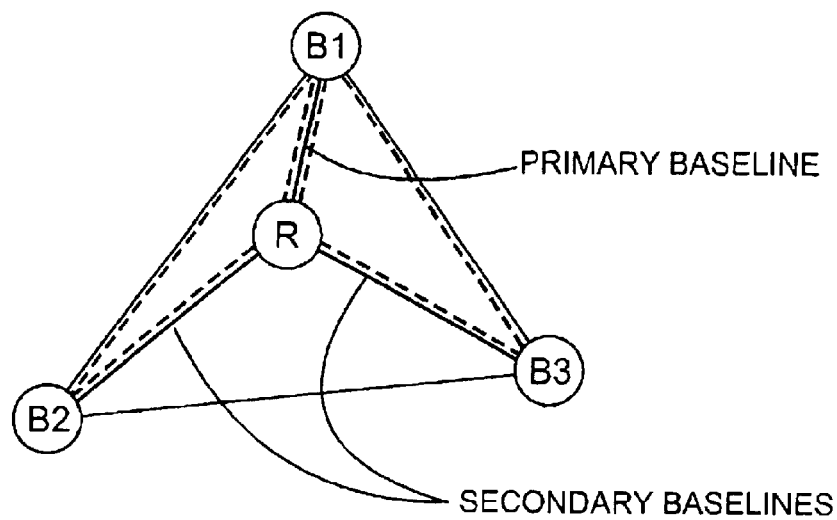
FIG. 2 is a top-plan schematic drawing the rover station (R) and three base stations (B1, B2, B3) in the exemplary network shown in FIG. 1 according to the present invention.

FIG. 1 is a perspective view of a rover station (R) and three base stations (B1, B2, B3) in an exemplary network according exemplary embodiments of the present invention, and FIG. 2 is a top plan schematic drawing thereof. The present invention pertains to estimating the position of the rover station with information provided from two or three of the base stations and with satellite measurements made by the rover station. Referring to FIG. 1, each station has a receiver that receives the satellite positioning signals with a satellite antenna (shown as a substantially flat disk). A plurality of satellites S1–S4 are depicted in FIG. 1, with the range between each satellite and each antenna being depicted by a respective dashed line. In the example shown in FIG. 1, the Rover station is operated by a human user, and has a positioning pole for positioning the Rover's satellite antenna over a location whose coordinates are to be determined. The Rover's satellite antenna is coupled to the receiver's processor, which may be disposed in a backpack and carried by the user. The user interacts with the receiver's processor through a keypad/display. The receiver also has a radio modem (more formally a demodulator) that can receive data from the base stations through a conventional RF antenna and relay it to the processor. In other embodiments, the Rover's satellite antenna may be mounted to a vehicle, and the receiver may operate independently and automatically without the need of a human operator. The present invention is applicable to these and other physical embodiments.

The satellite signals comprise carrier signals which are modulated by pseudo-random binary codes, which are then used to measure the delay relative to a local reference clock or oscillator. These measurements enable one to determine the so-called pseudo-ranges between the receiver and the satellites. The pseudo-ranges are different from true ranges (distances) between the receiver and the satellites due to variations in the time scales of the satellites and receiver and various noise sources. To produce these time scales, each satellite has its own on-board atomic clock, and the receiver has its own on-board clock, which usually comprises a quartz crystal. If the number of satellites is large enough (four or more), then the measured pseudo-ranges can be processed to determine the user location (e.g., X, Y, and Z coordinates) and to reconcile the variations in the time scales. Finding the user location by this process is often referred to as solving a navigational problem or task.

More specifically, the GPS system employs a constellation of satellites in orbit around the earth at an altitude of approximately 26,000 km. Each GPS satellite transmits microwave radio signals in two frequency bands located around 1575.42 MHz and 1227.6 MHz, referred to as L1 band and L2 band, respectively. The GPS L1-band signal is modulated by a coarse/acquisition code (C/A) and a precision ranging code (P-code). The L2-band signal is binary modulated by the P-code. The GPS C/A code is a pseudo-random (PR) Gold code that is specific to each satellite and is used to identify the source of a received signal. The P-code is a pseudo-random code signal and is also specific to each satellite, having a symbol rate which is ten time more than C/A, which reduces the granularity by a factor of ten. The GPS satellite transmission standards are set in detail by the *ICD-GPS-200, Revision C, ARINC Research Corporation*, 10 Oct., 1993.

The satellites of the GLONASS system transmit signals in two frequency bands around 1602 MHz, and around 1246 MHZ, referred to also as L1 band and L2 band, respectively. The GLONASS L1-band signal is modulated by a pseudo-random C/A code and a pseudo-random P-code. The L2-band signal is modulated by the P-code. Unlike GPS, in which all of the satellites transmit on the same nominal frequency, the GLONASS satellites each transmit at a unique frequency in order to differentiate between the satellites. The GLONASS L1-band carrier frequency is equal to 1602 MHz+l*0.5625 MHz, where 1 is an integer index ranging between 0 and 24 that identifies the satellites. The GLONASS L2-band carrier frequency is equal to 1246 MHz+l*0.4375 MHz. Details of the GLONASS signals may be found in *GLONASS ICD, Version* 4.0, 1998.

The distance between a receiver and a satellite (called the "receiver-to-satellite range") is determined by measuring the time that it takes for the signal to pass from the satellite to the receiver, provided that the position of the satellite is known. The satellites and receivers have internal clocks that are synchronized to a single GPS time. For each satellite signal being tracked, the receiver generates a local version of the satellite's expected P-code, and then retards that version in time until the local version correlates (i.e., matches) with the received satellite signal. Thereafter, the satellite signal is tracked by advancing or retarding the local version of the PR-code. The carrier phase of the satellite can also be tracked, which is usually done by tracking the Doppler shift of the satellite signal. The positions of the satellites are, except for minor variations, highly predictable as a function of time, and the receiver generally carriers a model of the satellite's position as a function of GPS time. In theory, by determining the ranges to three different satellites, the receiver can perform a three-dimensional triangulation to find its position. But because of limitations in the accuracy of the receiver's clock, the internally generated time is offset somewhat from true GPS time. Thus, the ranges to at least four different satellites are simultaneously measured in order to be able to solve for four unknowns, namely the three coordinates of the position of the receiver location (e.g., x, y, and z) and an offset of the receiver clock time from the GPS time. The location is usually performed with respect to the defined Cartesian coordinates frame.

In theory, a GPS receiver can track both the C/A code and the P-code of a satellite. The C/A code generally provides accuracy to within 20–50 meters, and the P-code generally provides greater accuracy to within 10 meters because of its higher repetition rate (less granularity) relative to the C/A code. However, knowledge of the P-code is restricted to military users and not available to civilian users. Nonetheless, some approaches for tracking P-codes have been developed.

The desire to guarantee the solution of navigational tasks with accuracy better than 10 meters, and the desire to raise the stability and reliability of measurements, have led to the development of the mode of "differential navigation ranging," also called "differential navigation" (DN). In the DN mode, the task of finding the user position is performed relative to a Base station (Base), the coordinates of which are known with high accuracy and precision. The Base station has a navigation receiver that receives the signals of the satellites and processes them to generate measurements. The results of these measurements enable one to calculate corrections, which are then transmitted to a roving GPS receiver, which the user has set up. We call this GPS receiver the "Rover station," or "Rover receiver." By using these corrections, the roving GPS receiver gains the ability to compensate for the major part of the strongly correlated errors in the measured pseudo-ranges, and to substantially improve the accuracy of the estimate of its position.

Usually, the Base station is immobile during measurements. The rover station may be either immobile or mobile. Depending on the navigational tasks to be solved, different modes of operation may be used in the DN mode. They differ in the way in which the measurement results are transmitted from the Base to the Rover. In the post-processing (PP) mode, these results are transmitted as digital recordings and go to the user after all the measurements have been finished. In the PP mode, the user reconstructs his or her location for definite moments in the past.

Another mode is the Real-Time Processing (RTP) mode, and it provides for the positioning of the Rover receiver just during the measurements. The RTP mode uses a communication link (such as the radio communication links shown in FIG. 1), through which all the necessary information is transmitted from the Base to the Rover receiver in digital form.

Further improvement of accuracy of differential navigation may be reached by supplementing the measurements of the pseudoranges with the measurements of the phases of the satellite carrier signals. If one measures the carrier phase of the signal received from a satellite in the Base receiver and compares it with the carrier phase of the same satellite measured in the Rover receiver, one can obtain measurement accuracy to within several percent of the carrier's wavelength, i.e., to within several centimeters.

The practical implementation of those advantages, which might be guaranteed by the measurement of the carrier phases, runs into the problem of there being ambiguities in the phase measurements.

The ambiguities are caused by two factors. First, the difference of distances $\Delta D$ from any satellite to the Base and Rover is usually much greater than the carrier's wavelength $\lambda$. Therefore, the difference in the phase delays of a carrier signal $\Delta \phi = \Delta D / \lambda$ received by the Base and Rover receivers may substantially exceed one cycle. Second, it is not possible to measure the integer number of cycles in $\Delta \phi$ from the incoming satellite signals; one can only measure the fractional part of $\Delta \phi$. Therefore, it is necessary to determine the integer part of $\Delta \phi$, which is called the "ambiguity". More precisely, we need to determine the set of all such integer parts for all the satellites being tracked, one integer part for each satellite. One has to determine this set along with other unknown values, which include the Rover's coordinates and the variations in the time scales.

In a general way, the task of generating highly-accurate navigation measurements may be formulated by defining a set of unknowns and system of relationships between the unknowns and measured navigation parameters. The vector of unknowns, denoted herein as $\eta_\Sigma$, include three Rover coordinates (usually along Cartesian axes X, Y, Z) in a given coordinate system (sometimes time derivatives of coordinates are added too); the variations of the time scales which is caused by the phase drift of the local main reference oscillator; and n integer unknown values associated with the ambiguities of the phase measurements of the carrier frequencies. The value of n is determined by the number of different carrier signals being processed, and accordingly coincides with the number of satellite channels actively functioning in the receiver. At least one satellite channel is used for each satellite whose broadcast signals are being received and processed by the receiver. Some satellites broadcast more than one code-modulated carrier signal, such as a GPS satellite, which broadcasts a carrier in the $L_1$ frequency band and a carrier in the $L_2$ frequency band. If the receiver processes the carrier signals in both of the $L_1$ and $L_2$ bands, the number of satellite channels (n) increases correspondingly.

Two sets of navigation parameters are measured by the Base and Rover receivers, respectively, and are used to determine the set of unknowns, which is sometimes called the "state vector." Each set of navigation parameters includes the pseudo-range of each satellite to the receiver, and the full (complete) phase of each satellite carrier signal. Each pseudo-range is obtained by measuring the time delay of a code modulation signal of the corresponding satellite (C/A code or P-code). The code modulation signal is tracked by a delay-lock loop (DLL) circuit in each satellite-tracking channel. The full phase of a satellite's carrier signal is tracked by a phase-lock-loop (PLL) in the corresponding satellite tracking channel. (The DLL and PLL are, for example, provided by the demodulator 120 of an exemplary rover shown in FIG. 5). An observation vector is generated as the collection of the measured navigation parameters for specific (definite) moments of time.

The relationship between the state vector and the observation vector is defined by a well-known system of navigation equations. Given an observation vector, the system of equations may be solved to find the state vector if the number of equations equals or exceeds the number of unknowns in the state vector. In the latter case, conventional statistical methods are used to solve the system: the least squares method, the method of dynamic Kalman filtering, the method of least squares and various modifications of these methods.

One method may comprise the following steps. The measured values of the pseudo-ranges and full phases at specific (definite) moments of time, along with an indication of the satellites to which these measurements belong to and the time moments of the measurements, are transmitted from the Base to the Rover (such as through the communication link or as recordings). Corresponding values are measured in the Rover receiver. The processing includes the determination of the single differences of the pseudo-ranges and full phases between the Base and Rover measurements for each satellite. The strongly correlated errors are largely compensated (i.e., substantially cancelled) in the single differences. Then, the residuals of the single differences are calculated by subtraction of calculated values from the measured results. The processing of residuals allows one to linearize the initial system of navigation equations (sometimes several subsequent iterations are necessary for that), which makes possible the use of the well-developed body of mathematics for solving systems of linear equations. The subsequent iterative solution of the linearized system of navigation equations is equivalent to the minimization of the sum of squared non-linear residuals by the Gauss-Newton minimization method. The components of the state vector, with the n ambiguities included, are found as a result of the solution. But the calculated values of the ambiguities are not necessarily integer numbers, and are often floating point numbers. Because of this, they are called "float ambiguities," or "floating ambiguities," at this stage of the solution. To find true values of the integer ambiguities one uses the procedure of rounding off the float ambiguity vector to the nearest set of integers. This process is called 'the ambiguity resolution'. After the ambiguity resolution has been done, is it possible to generate more accurate values of residuals and then, by solving the system of equation again, to find the coordinate values for the baseline connecting the Base and Rover, and consequently to more accurately estimate the coordinates of Rover and the correction to its clock drift.

There are fractional parts associated with each ambiguity due to the time offset in the receiver's carrier generator, and as a practical matter, it is more convenient to include this fractional offset into the floating ambiguities and "integer" ambiguities. In this case, one additionally solves for the unknown fractional offset of the receiver's carrier generator, and then resolves the "integer" ambiguities in the form of integers plus a common fractional part that is related to the time offset of the receiver's carrier generator. We call these resolved ambiguities "fixed-integer ambiguities" because, although these ambiguities have fractional parts, the difference between any two fixed-integer ambiguities for two corresponding satellites measured by the same pair of receivers is an integer.

Even with all of the above-described processing to account for clock offsets and carrier ambiguities, there are additional factors which affect the accuracy of measurements made with GPS and/or GLONASS signals. As one factor, the trajectory of each satellite (or its initial data called the ephemeris), is elliptical and is affected by natural causes such as solar winds. The accuracy of any measurement is dependent upon knowledge of the position of the satellites at a certain time. An estimate of the ephemeris is calculated on earth for each of the satellites and is periodically uploaded to the satellite. The position information of a satellite is encoded onto a low frequency (50 Hz) signal which is modulated on to one of the carrier signals, and transmitted to the GPS receiver on earth.

Two additional and important factors that affect the accuracy of measurements made with GPS and/or GLONASS signals are the effects of the troposphere and ionosphere on propagation of signals from the satellites to the receivers. The troposphere is the lower part of the atmosphere and variations in the temperature, pressure, and humidity lead to spatial variations in the signal propagation. The ionosphere is at the upper part of the atmosphere and has a slice of ionized gas at the altitude of around 300 km. The density of ionized particles is sufficiently high to affect the propagation of electromagnetic signals, and has a spatial variation and a time variation. The ionosphere effect becomes even more important during years of high solar activity. These variations in the troposphere and ionosphere introduce variable delays in the propagation of the satellite signals to the receivers. If the base and rover are widely separated, these delays will be significantly different for the base and rover stations, and will introduce error into the estimation of the rover's position.

With that general overview, we now describe the invention in greater detail. For the sake of simplifying the presentation, and without loss of generality, we assume "N" satellites identified by the index "s", s=1, ..., N, and we assume that each receiver can track the satellite's L1 band signal and the satellite's L2 band signal. The receivers extract timing information from the satellite signals, and report this information as predefined increments k of time, which we call epochs k. The time between epochs can be selected by the user, and generally ranges between 0.1 seconds to 2 seconds, with 1 second being typical. The clocks of all of the receivers are typically accurate to within several milliseconds of the true GPS time, and for practical purposes the receivers can determine the number k of the current epoch from their clocks. The following timing information can be extracted from each satellite "s" at each epoch "k" by each receiver "r".

1. The low-frequency (50 Hz) information signal which provides information on the orbit (position) of the satellites which enables the receiver to determine the satellite's position.
2. the pseudo-range $\rho_{r,k}^{L2,s}$ derived from the L1-band C/A code (or optionally the L1-band P-code for military users), and having the units of length (e.g., meters [m]);
3. the pseudo-range $\rho_{r,k}^{L1,s}$ derived from the L2-band C/A code (or optionally the L2-band P-code for military users), and having the units of length (e.g., meters [m]);
4. the L1-band carrier phase $100_{r,k}^{L1,s}$ derived from the L1-band carrier, and typically having the dimensionless units of cycles (but is sometimes expressed in terms of meters by multiplying the cycles by the L1-band wavelength $\lambda^{L1,s}$; and
5. the L2-band carrier phases $\phi_{r,k}^{L2,s}$ derived from the L2-band carrier, and typically having the dimensionless units of cycles (but is sometimes expressed in terms of meters by multiplying the cycles by the L2-band wavelength $\lambda^{L2,s}$.

Each of $\rho_{r,k}^{L1,s}$, $\rho_{r,k}^{L2,s}$, $\phi_{r,k}^{L1,s}$ and $\phi_{r,k}^{L2,s}$ are known as observed quantities, or "observables," because the are measured by the receiver from the satellite signals. The observables are related to the speed of light "c," the wavelengths $\lambda^{L1,s}$ and $\lambda^{L2,s}$ of the L1-band and L2-band carriers of satellite "s," the frequencies $f^{L1,s}=c/\lambda^{L1,s}$ and $f^{L2,s}=c/\lambda^{L2,s}$ of the L1-band and L2-band carriers of satellite "s," various variables that are to be determined, and various noise sources, in the following manner:

$$\rho_{r,k}^{L1,s} = R_{r,k}^s + c(\tau_k^s - \tau_{r,k}) + T_{r,k}^s + I_{r,k}^s + n_{r,k}^{L1,s} \quad [1A]$$

$$\rho_{r,k}^{L2,s} = R_{r,k}^s + c(\tau_k^s - \tau_{r,k}) + T_{r,k}^k + \left(\frac{\lambda^{L2,s}}{\lambda^{L1,s}}\right)^2 I_{r,k}^s + n_{r,k}^{L2,s} \quad [1B]$$

$$\phi_{r,k}^{L1,s} = \frac{1}{\lambda^{L1,s}} R_{r,k}^s + f^{L1,s}(\tau_k^s - \tau_{r,k}) + \frac{1}{\lambda^{L1,s}} T_{r,k}^s - \frac{1}{\lambda^{L1,s}} I_{r,k}^s + N_r^{L1,s} + \psi_r^{L1} + v_{r,k}^{L1,s} \quad [1C]$$

$$\phi_{r,k}^{L2,s} = \frac{1}{\lambda^{L2,s}} R_{r,k}^s + f^{L2,s}(\tau_k^s - \tau_{r,k}) + \frac{1}{\lambda^{L2,s}} T_{r,k}^s - \frac{\lambda^{L2,s}}{(\lambda^{L1,s})^2} I_{r,k}^s + N_r^{L2,s} + \psi_r^{L2} + v_{r,k}^{L2,s} \quad [1D]$$

where variables (which are to be determined) are:
- $R_{r,k}^s$ is the true range between the satellite "s" and receiver "r" at the epoch "k", having dimension of distance (usually expressed as meters [m]);
- $\tau_k^s$ is the time offset from true GPS time of the clock of satellite "s" at epoch "k";
- $\tau_{r,k}$ is the time offset from true GPS time of the clock of receiver "r" at epoch "r";
- $T_{r,k}^s$ is the delay due to tropospheric effects between satellite "s" and receiver "k", at epoch "k";
- $I_{r,k}^s$ is the delay due to ionospheric effects between satellite "s" and receiver "r" at epoch "k" (the full amount of $I_{r,k}^s$ affects the pseudo-range in the L1-band);
- $N_r^{L1,s}$ is the integer phase ambiguity in the L1-band observable $\phi_{r,k}^{L1,s}$;
- $N_r^{L2,s}$ is the integer phase ambiguity in the L2-band observable $\phi_{r,k}^{L2,s}$
- $\psi_r^{L1}$ s the initial phase offset of the L1-band phase tracker of receiver "r"; and
- $\psi_r^{L2}$ is the initial phase offset of the L2-band phase tracker of receiver "r", and where various noise sources are:
- $n_{r,k}^{L1,s}$ is the total effect of the noise sources on the pseudo-range measurement at epoch "k" in receiver "r" when tracking the L1-band C/A-code signal (or P-code signal) of satellite "s";
- $n_{r,k}^{L2,s}$ is the total effect of the noise sources on the pseudo-range measurement at epoch "k" in receiver "r" when tracking the L2-band C/A-code signal (or P-code signal) of satellite "s";
- $v_{r,k}^{L1,s}$ is the total effect of the noise sources on the carrier-phase measurement at epoch "k" in receiver "r" when tracking the L1-band carrier of satellite "s"; and
- $v_{r,k}^{L1,s}$ is the total effect of the noise sources on the carrier-phase measurement at epoch "k" in receiver "r" when tracking the L2-band carrier of satellite "s".

Forms [1A]–[1D] are known as the satellite navigation equations.

In embodiments of the present invention, we will be forming differences between the observables of pairs of stations, and differences between instances of the satellite navigation equations. The vector, or straight line, between a pair of two such stations is called a baseline. The baselines between all of the stations shown in FIG. 1 are best seen in the top plan view of FIG. 2. We generally note the difference of an observable measured by two stations with the prefix notation $\Delta_{q,r}$, where each of "q" and "r" represents one of the stations B1, B2, B3, and R. For example, $$\Delta_{q,r}\rho_k^{L1,s} = \rho_{r,k}^{L1,s} - \rho_{q,k}^{L1,s} \qquad [2A]$$

$$\Delta_{q,r}\rho_k^{L2,s} = \rho_{r,k}^{L2,s} - \rho_{q,k}^{L2,s} \qquad [2B]$$

$$\Delta_{q,r}\phi_k^{L1,s} = \phi_{r,k}^{L1,s} - \phi_{q,k}^{L1,s} \qquad [2C]$$

$$\Delta_{q,r}\phi_k^{L2,s} = \phi_{r,k}^{L2,s} - \phi_{q,k}^{L2,s} \qquad [2D]$$

Forms [2A]–[2D] are often referred to as the between-station (or between-receiver) single differences of the signals of satellite "s" between stations (receivers) "r" and "q". The between station operator $\Delta_{q,r}$ can be applied to the variables and noise sources as well.

For example, $\Delta_{q,r}R_k^s = R_{r,k}^s - R_{q,k}^s$, and $\Delta_{q,r}n_k^{L1,s} = n_{r,k}^{L1,s} - n_{q,k}^{L1,s}$. With this background, we can relate the between-station single differences of the observables to the differences in the variables as follows:

$$\Delta_{q,r}\rho_k^{L1,s} = \Delta_{q,r}R_k^s - c\Delta_{q,r}\tau_k + \Delta_{q,r}T_k^s + \Delta_{q,r}I_k^s + \Delta_{q,r}n_k^{L1,s} \qquad [3A]$$

$$\Delta_{q,r}\rho_k^{L2,s} = \Delta_{q,r}R_k^s - c\Delta_{q,r}\tau_k + \Delta_{q,r}T_k^s + \left(\frac{\lambda^{L2,s}}{\lambda^{L1,s}}\right)^2 \Delta_{q,r}I_k^s + \Delta_{q,r}n_k^{L2,s} \qquad [3B]$$

$$\Delta_{q,r}\phi_k^{L1,s} = \frac{1}{\lambda^{L1,s}}\Delta_{q,r}R_k^s - f^{L1,s}\Delta_{q,r}\tau_k + \frac{1}{\lambda^{L1,s}}\Delta_{q,r}T_k^s - \frac{1}{\lambda^{L1,s}}\Delta_{q,r}I_k^s + \Delta_{q,r}N^{L1,s} + \Delta_{q,r}\psi^{L1} + \Delta_{q,r}v_k^{L1,s} \qquad [3C]$$

$$\Delta_{q,r}\phi_k^{L2,s} = \frac{1}{\lambda^{L2,s}}\Delta_{q,r}R_k^s - f^{L2,s}\Delta_{q,r}\tau_k + \frac{1}{\lambda^{L2,s}}\Delta_{q,r}T_k^s - \frac{\lambda^{L2,s}}{(\lambda^{L1,s})^2}\Delta_{q,r}I_k^s + \Delta_{q,r}N^{L2,s} + \Delta_{q,r}\psi^{L2} + \Delta_{q,r}v_k^{L2,s} \qquad [3D]$$

The difference form of [3A] is generated by forming two instances of form [1A] for receivers "r" and "q", and then subtracting the two instances (the instance for receiver "q" is subtracted from the instance for receiver "r"). Difference forms [3B], [3C], and [3D], are formed in a similar manner from corresponding instances of forms [1B], [1C], and [1D], respectively. Forms [3A]–[3D] are the single-differences of the navigation equations. The benefit of forming the between-station single differences is that the error term representing the time offset of the satellite clock, $\tau_k^s$, is cancelled out in the differences. We emphasize that the forms [3A]–[3D] can be applied to each satellite that can be observed by receivers "q" and "r." Higher-order differences of the navigation equations, such as the double-differences of the navigation equations, can be formed and are known to the art. For example, a common double-difference equation is the difference between two single-difference equations associated with a common baseline, but with each single-difference equation being based on a different satellite. The present invention may also use these higher-order differences of the navigation equations, although the single differences of the navigation equations are currently preferred. Each of these difference forms is generically referred to as a differential navigation equation.

Between Base Station Processing, Part I.

Because the locations of the base stations are known, and because the locations of the satellites as a function of epoch time (k) are also known, the between-station differences of each true range $\Delta_{q,r}R_k^s = R_{r,k}^s - R_{q,k}^s$ associated with each satellite "s" can be generated from existing information. If vectors $X_r$, $X_q$, and $X^s$ represent the locations of receiver "r", receiver "q", and satellite "s", respectively, in a coordinate system (e.g., a Cartesian coordinate system), and the operator $\|\cdot\|$ represents the distance operator in that coordinate system, then $\Delta_{q,r}R_k^s = \|X^s - X_r\| - \|X^s - X_q\|$. This reduces by one the number of unknowns in forms [3A]–[3D]. In addition, the Goad-Goodman model may be used to model the difference in tropospheric effects (with an error less than a few percent), and thus the difference $\Delta_{q,r}T_k^s$ may be estimated based on the positions of the receivers and the satellite (more specifically, the angles between the receivers and satellite). The noise sources $\Delta_{q,r}n^{L1,s}$, $\Delta_{q,r}n^{L2,s}$, $\Delta_{q,r}v^{L1,s}$, and $\Delta_{q,r}v^{L2,s}$ can never be known, but they are generally zero-mean and their effect can be reduced by averaging. Thus, the number of solvable unknowns in forms [3A]–[3D] may be reduced to the following six: (1) $\Delta_{q,r}\tau_k$, (2) $\Delta_{q,r}I_k^s$, (3) $\Delta_{q,r}N^{L1,s}$, (4) $\Delta_{q,r}\psi^{L1}$, (5) $\Delta_{q,r}N^{L2,s}$, and (6) $\Delta_{q,r}\psi^{L2}$. The first unknown varies with time and is common to all of the satellites being tracked by receivers "q" and "r." The second unknown varies with time and is specific to the satellite "s" being tracked by the pair of receivers "q" and "r." The third and fifth unknowns are each specific to the satellite "s" being tracked by the pair of receivers "q" and "r", and each does not normally vary with time unless a cycle slip occurs in the receiver's phase-lock loop. The fourth and sixth unknowns are specific to the pair of receivers "q" and "r," and do not normally vary with time.

As a practical matter, we note that the third and fourth unknowns are related to the L1-carrier phase measurement of satellite "s" and are time-independent (unless a cycle slip occurs). In theory, these unknowns can be represented as a combined unknown $\Delta_{q,r}\hat{N}^{L1,s} = \Delta_{q,r}N^{L1,s} + \Delta_{q,r}\psi^{L1}$, which we call the between-station "fixed-integer ambiguity" for the L1 carrier of satellite "s," as measured at stations "q" and "r." We call these resolved ambiguities "fixed-integer ambiguities" because, although these ambiguities have fractional parts, the difference between any two fixed-integer ambiguities for two corresponding satellites measured by the same pair of receivers is an integer. In a similar manner, the fifth and sixth unknowns are related to the L2-carrier phase measurement of satellite "s" and are time-independent (unless a cycle slip occurs); they can be represented as a combined unknown $\Delta_{q,r}\hat{N}^{L2,s} = \Delta_{q,r}N^{L2,s} + \Delta_{q,r}\psi^{L2}$, which we call the between-station "fixed-integer ambiguity" for the L2 carrier of satellite "s", as measured at stations "q" and "r."

As a further practical matter, one first generates floating point versions of the fixed-integer ambiguities, and then applies a discretization process to the floating point version to generate the fixed-integer ambiguities. We call these versions the floating-point ambiguities, and denote them as $\Delta_{q,r}\overline{N}^{L1,s} \cong \Delta_{q,r}N^{L1,s} + \Delta_{q,r}\psi^{L1}$ and $\Delta_{q,r}\overline{N}^{L2,s} \cong \Delta_{q,r}N^{L2,s} + \Delta_{q,r}\psi^{L2}$.

Thus, the solvable unknowns for each instance of form [3A]–[3D] can be reduced to four: (1) $\Delta_{q,r}\tau_k$, (2) $\Delta_{q,r}I_k^s$, (3) $\Delta_{q,r}\hat{N}^{L1,s}(\Delta_{q,r}\overline{N}^{L1,s})$, and (4) $\Delta_{q,r}\hat{N}^{L2,s}(\Delta_{q,r}\overline{N}^{L2,s})$. The first unknown is common to all the satellites being tracked by the pair of receivers "q" and "r," whereas the last three are specific to the satellite "s." The first two unknowns vary with time, whereas the last two are time invariant (unless a cycle slip occurs). For the base stations, the known values of forms [3A]–[3D] can be represented as:

$$\Delta_{q,r}b_k^{L1,s} = \Delta_{q,r}\rho_k^{L1,s} - \Delta_{q,r}R_k^s - \Delta_{q,r}T_k^s \quad [4A]$$

$$\Delta_{q,r}b_k^{L2,s} = \Delta_{q,r}\rho_k^{L2,s} - \Delta_{q,r}R_k^s - \Delta_{q,r}T_k^s \quad [4B]$$

$$\Delta_{q,r}p_k^{L1,s} = \Delta_{q,r}\phi_k^{L1,s} - \frac{1}{\lambda^{L1,s}}\Delta_{q,r}R_k^s - \frac{1}{\lambda^{L1,s}}\Delta_{q,r}T_k^s \quad [4C]$$

$$\Delta_{q,r}p_k^{L2,s} = \Delta_{q,r}\phi_k^{L2,s} - \frac{1}{\lambda^{L2,s}}\Delta_{q,r}R_k^s - \frac{1}{\lambda^{L2,s}}\Delta_{q,r}T_k^s \quad [4D]$$

Forms [4A]–[4D] comprise the known terms of the single-differences of the navigation equations, and we call them the "residuals" of the single differences, or more generally the "residuals of a set of differential navigation equations". The magnitude of each residual is generally less than the magnitudes of one or more of the known terms that form the residual.

Then, the unknowns can be estimated from the residuals using the following forms by any of a number of solution methods known to the art:

$$\Delta_{q,r}b_k^{L1,s} = -c\Delta_{q,r}\tau_k + \Delta_{q,r}I_k^s + \Delta_{q,r}n_k^{L1,s} \quad [5A]$$

$$\Delta_{q,r}b_k^{L2,s} = -c\Delta_{q,r}\tau_k + \left(\frac{\lambda^{L2,s}}{\lambda^{L1,s}}\right)^2 \Delta_{q,r}I_k^s + \Delta_{q,r}n_k^{L2,s} \quad [5B]$$

$$\Delta_{q,r}p_k^{L1,s} = -f^{L1,s}\Delta_{q,r}\tau_k - \frac{1}{\lambda^{L1,s}}\Delta_{q,r}I_k^s + \Delta_{q,r}\hat{N}^{L1,s} + \Delta_{q,r}v_k^{L1,s} \quad [5C]$$

$$\Delta_{q,r}p_k^{L2,s} = -f^{L2,s}\Delta_{q,r}\tau_k - \frac{\lambda^{L2,s}}{(\lambda^{L1,s})^2}\Delta_{q,r}I_k^s + \Delta_{q,r}\hat{N}^{L2,s} + \Delta_{q,r}v_k^{L2,s} \quad [5D]$$

All of the residuals, forms, known values, and unknown variables are real-valued. The estimation process usually includes instances of forms [5A]–[5D] for several satellites, and for several epochs of time.

As one aspect of the present invention, one or more of the unknown variables for several satellites are estimated for at least two base stations, and preferably for at least three base stations by a process that is performed at the rover. Using the numbers 1, 2, and 3 to represent the base stations B1, B2, and B3, respectively, in the difference operator "$\Delta_{q,r}$", the estimated values of the between-base station unknowns for each satellite "s" at each epoch "k" are:

Base Stations 1 and 2—$\Delta_{2,1}\tau_k, \Delta_{2,1}I_k^s, \Delta_{2,1}\hat{N}^{L1,s}, \Delta_{2,1}\hat{N}^{L2,s}$ [6A]

Base Stations 1 and 2—$\Delta_{3,1}\tau_k, \Delta_{3,1}I_k^s, \Delta_{3,1}\hat{N}^{L1,s}, \Delta_{3,1}\hat{N}^{L2,s}$ [6B]

Base Stations 1 and 2—$\Delta_{3,2}\tau_k, \Delta_{3,2}I_k^s, \Delta_{3,2}\hat{N}^{L1,s}, \Delta_{3,2}\hat{N}^{L2,s}$ [6C]

An exemplary estimation process is outlined in a section below entitled "Between Base Station Processing, Part II." As one option, the estimation process may break down the fixed integer ambiguities into their components as follows:

Base Stations 1 and 2—$\Delta_{2,1}N^{L1,s}, \Delta_{2,1}\psi^{L1}$ (from $\Delta_{2,1}\hat{N}^{L1,s}$)

$\Delta_{2,1}N^{L2,s}, \Delta_{2,1}\psi^{L2}$ (from $\Delta_{2,1}\hat{N}^{L2,s}$)

Base Stations 1 and 3—$\Delta_{3,1}N^{L1,s}, \Delta_{3,1}\psi^{L1}$ (from $\Delta_{3,1}\hat{N}^{L1,s}$), $\Delta_{3,1}N^{L2,s}, \Delta_{3,1}\psi^{L2}$ (from $\Delta_{3,1}\hat{N}^{L2,s}$)

Base Stations 2 and 3—$\Delta_{3,2}N^{L1,s}, \Delta_{3,2}\psi^{L1}$ (from $\Delta_{3,2}\hat{N}^{L1,s}$), $\Delta_{3,2}N^{L2,s}, \Delta_{3,2}\psi^{L2}$ (from $\Delta_{3,2}\hat{N}^{L2,s}$)

In some applications of the present invention where lower estimate accuracy is acceptable, floating-point ambiguities may be used in place of the fixed-integer ambiguities, and the following set of between-base station unknowns may be generated:

Base Stations 1 and 2—$\Delta_{2,1}\tau_k, \Delta_{2,1}I_k^s, \Delta_{2,1}\overline{N}^{L1,s}, \Delta_{2,1}\overline{N}^{L2,s}$ [7A]

Base Stations 1 and 3—$\Delta_{3,1}\tau_k, \Delta_{3,1}I_k^s, \Delta_{3,1}\overline{N}^{L1,s}, \Delta_{3,1}\overline{N}^{L2,s}$ [7B]

Base Stations 2 and 3—$\Delta_{3,2}\tau_k, \Delta_{3,2}I_k^s, \Delta_{3,2}\overline{N}^{L1,s}, \Delta_{3,2}\overline{N}^{L2,s}$ [7C]

Between Rover and Base Station Processing.

The processing of differences between the rover station and any one of the base stations is more complex because we do not know the position of the rover beforehand. Thus, the term $\Delta_{q,r}R_k^s = R_{r,k}^s - R_{q,k}^s$ is not exactly known. However, given an initial estimated value of the rover's location, which we will denote as $\overline{X}_0$ and which can be generated from the 50 Hz information signals by means known to the art, we can generate an initial range estimate between satellite "s" and the rover, which we denote as $\tilde{R}_{0,k}^s$, and we can generate a linearized approximation of the term as follows, where we use r=0 to denote the rover and use q to generally indicate any one of the base stations:

$$\Delta_{q,0}R_k^s = R_{0,k}^s - R_{q,k}^s \cong (\tilde{R}_{0,k}^s + a_k^s \cdot \delta X) - R_{q,k}^s$$

$$\cong (\tilde{R}_{0,k}^s - R_{q,k}^s) + a_k^s \cdot \delta X_k$$

$$\cong \Delta_{q,0}\tilde{R}_{0,k}^s + a_k^s \cdot \delta X_k$$

where $\delta X_k$ is the vector difference between the actual location $X_0$ of the Rover and the initial estimated location $\overline{X}_0$ ($X_0 = \overline{X}_0 + \delta X_k$), where $a_k^s$ is a row vector comprised of the partial derivatives of the distance form $R_{0,k}^s = \|X^s - X_0\|$ with respect to the rover location $X_0$, as evaluated at $\overline{X}_0$, and where $\Delta_{q,0}\tilde{R}_{0,k}^s$ has been used as a shorthand notation for ($\tilde{R}_{0,k}^s - R_{q,k}^s$). Formally, row vector $a_k^s$ is expressed as:

$$a_k^s = \frac{\partial}{\partial X_0}\{R_{0,k}^s\}\bigg|_{\overline{X}_0} = \frac{\partial}{\partial X_0}\{\|X^s - X_0\|\}\bigg|_{\overline{X}_0}$$

The values of $a_k^s$ depend upon the satellite location, which changes with each time moment "k," and upon the initial location $\overline{X}_0$ of the Rover, which may be periodically updated, particularly if the Rover is moving. The row vectors $a_k^s$ for all of the satellites may be collected together as a single s-by-3 matrix, which we denote as $A_k$. Matrix $A_k$ is commonly known as the Jacobian matrix, the geometry matrix, and the matrix of directional cosines. It is commonly computed in the art and described in many tutorial textbooks on global positioning. The reader unfamiliar with the GPS is directed to these tutorial texts for more detailed explanations of how matrix $A_k$ (which is oftentimes referred to matrix H or matrix G by these texts) is generated.

With $\Delta_{q,0}R_k^s \cong \Delta_{q,0}\tilde{R}_{0,k}^s + a_k^s \cdot \delta X$, we may write the following versions of forms [4] (residuals) for the baselines between the Rover ("0") and any one of the base stations ("q"):

$$\Delta_{q,0}b_k^{L1,s} = \Delta_{q,0}\rho_k^{L1,s} - \Delta_{q,0}\tilde{R}_k^s - \Delta_{q,0}T_k^s \quad [8A]$$

$$\Delta_{q,0}b_k^{L2,s} = \Delta_{q,0}\rho_k^{L2,s} - \Delta_{q,0}\tilde{R}_k^s - \Delta_{q,0}T_k^s \quad [8B]$$

$$\Delta_{q,0}p_k^{L1,s} = \Delta_{q,0}\phi_k^{L1,s} - \frac{1}{\lambda^{L1,s}}\Delta_{q,0}\tilde{R}_k^s - \frac{1}{\lambda^{L1,s}}\Delta_{q,0}T_k^s \quad [8C]$$

-continued $$\Delta_{q,0} p_k^{L2,s} = \Delta_{q,0}\phi_k^{L2,s} - \frac{1}{\lambda^{L2,s}}\Delta_{q,0}\tilde{R}_k^s - \frac{1}{\lambda^{L2,s}}\Delta_{q,0}T_k^s \quad [8D]$$

and the following versions of forms [5]

$$\Delta_{q,0} b_k^{L1,s} = a_k^s \cdot \delta X_k + c\Delta_{q,0}\tau_k + \Delta_{q,0}I_k^s + \Delta_{q,0}n_k^{L1,s} \quad [9A]$$

$$\Delta_{q,0} b_k^{L2,s} = a_k^s \cdot \delta X_k - c\Delta_{q,0}\tau_k + \left(\frac{\lambda^{L2,s}}{\lambda^{L1,s}}\right)^2 \Delta_{q,0}I_k^s + \Delta_{q,0}n_k^{L2,s} \quad [9B]$$

$$\Delta_{q,0} p_k^{L1,s} = \frac{1}{\lambda^{L1,s}} a_k^s \cdot \delta X_k - f^{L1,s}\Delta_{q,0}\tau_k - \frac{1}{\lambda^{L1,s}}\Delta_{q,0}I_k^s + \Delta_{q,0}\hat{N}^{L1,s} + \Delta_{q,0}v_k^{L1,s} \quad [9C]$$

$$\Delta_{q,0} p_k^{L2,s} = \frac{1}{\lambda^{L2,s}} a_k^s \cdot \delta X_k - f^{L2,s}\Delta_{q,0}\tau_k - \frac{\lambda^{L2,s}}{(\lambda^{L1,s})^2}\Delta_{q,0}I_k^s + \Delta_{q,0}\hat{N}^{L2,s} + \Delta_{q,0}v_k^{L2,s} \quad [9D]$$

The solvable unknowns for form [9] include $\delta X_k$, as well as $\Delta_{q,0}\tau_k$, $\Delta_{q,0}I_k^s$, $\Delta_{q,0}\hat{N}^{L1,s}$, and $\Delta_{q,0}\hat{N}^{L2,s}$. As described below in greater detail, estimation processes for these unknowns generally include instances of forms [9A]–[9D] for several satellites, and for several epochs of time.

While the presentation of this section has been made with respect to a specific rover station (0), it may be appreciated that the discussion and above forms generally apply to any pair of receivers (q, r), where "r" substitutes for "0" in the above.

Development of the Present Invention

As part of making their invention, the inventors have recognized that the base station time-offset unknowns, when accurately estimated, should satisfy the following relationship:

$$\Delta_{2,1}\tau_k+\Delta_{3,2}\tau_k=\Delta_{3,1}\tau_k. \quad [10A]$$

An underlying meaning of this relationship can be seen by noting that $\Delta_{3,1}\tau_k=-\Delta_{1,3}\tau_k$, and by rewriting the relationship in the equivalent form of $\Delta_{2,1}\tau_k+\Delta_{3,2}\tau_k+\Delta_{1,3}\tau_k=0$. That is, the sum of the time offsets around a loop of base stations is equal to zero. The other unknowns, when accurately estimated, should satisfy the following similar relationships:

$$\Delta_{2,1}I_k^s+\Delta_{3,2}I_k^s=\Delta_{3,1}I_k^s \quad [10B]$$

$$\Delta_{2,1}\hat{N}^{L1,s}+\Delta_{3,2}\hat{N}^{L1,s}=\Delta_{3,1}\hat{N}^{L1,s} \quad [10C]$$

$$\Delta_{2,1}\hat{N}^{L2,s}+\Delta_{3,2}\hat{N}^{L2,s}=\Delta_{3,1}\hat{N}^{L2,s} \quad [10D]$$

$$\Delta_{2,1}\psi^{L1}+\Delta_{3,2}\psi^{L1}=\Delta_{3,1}\psi^{L1} \quad [10E]$$

$$\Delta_{2,1}\psi^{L2}+\Delta_{3,2}\psi^{L2}=\Delta_{3,1}\psi^{L2} \quad [10F]$$

$$\Delta_{2,1}\hat{N}^{L1,s}+\Delta_{3,2}\hat{N}^{L1,s}=\Delta_{3,1}\hat{N}^{L1,s} \quad [10G]$$

$$\Delta_{2,1}\hat{N}^{L2,s}+\Delta_{3,2}\hat{N}^{L2,s}=\Delta_{3,1}\hat{N}^{L2,s} \quad [10H]$$

$$\Delta_{2,1}\overline{N}^{L1,s}+\Delta_{3,2}\overline{N}^{L1,s}=\Delta_{3,1}\overline{N}^{L1,s} \quad [10I]$$

$$\Delta_{2,1}\overline{N}^{L2,s}+\Delta_{3,2}\overline{N}^{L2,s}=\Delta_{3,1}\overline{N}^{L2,s} \quad [10J]$$

As a further part of making their invention, the inventors have recognized that the above relationships [10A]–[10J] should be satisfied by any set of three receivers, including sets where one of the receivers is the receiver of the rover station. We illustrate this point by replacing station B3 (3) with the rover station, which we will identify by the subscript number "0":

$$\Delta_{2,1}\tau_k+\Delta_{0,2}\tau_k=\Delta_{0,1}\tau_k. \quad [11A]$$

$$\Delta_{2,1}I_k^s+\Delta_{0,2}I_k^s=\Delta_{0,1}I_k^s \quad [11B]$$

$$\Delta_{2,1}\hat{N}^{L1,s}+\Delta_{0,2}\hat{N}^{L1,s}=\Delta_{0,1}\hat{N}^{L1,s} \quad [11C]$$

$$\Delta_{2,1}\hat{N}^{L2,s}+\Delta_{0,2}\hat{N}^{L2,s}=\Delta_{0,1}\hat{N}^{L2,s} \quad [11D]$$

$$\Delta_{2,1}\psi^{L1}+\Delta_{0,2}\psi^{L1}=\Delta_{0,1}\psi^{L1} \quad [11E]$$

$$\Delta_{2,1}\psi^{L2}+\Delta_{0,2}\psi^{L2}=\Delta_{0,1}\psi^{L2} \quad [11F]$$

$$\Delta_{2,1}\hat{N}^{L1,s}+\Delta_{0,2}\hat{N}^{L1,s}=\Delta_{0,1}\hat{N}^{L1,s} \quad [11G]$$

$$\Delta_{2,1}\hat{N}^{L2,s}+\Delta_{0,2}\hat{N}^{L2,s}=\Delta_{0,1}\hat{N}^{L2,s} \quad [11H]$$

$$\Delta_{2,1}\overline{N}^{L1,s}+\Delta_{0,2}\overline{N}^{L1,s}=\Delta_{0,1}\overline{N}^{L1,s} \quad [11I]$$

$$\Delta_{2,1}\overline{N}^{L2,s}+\Delta_{0,2}\overline{N}^{L2,s}=\Delta_{0,1}\overline{N}^{L2,s} \quad [11J]$$

Still further, the inventors have recognized that relationships [10] and [11] can be generalized to apply to any loop of four or more receivers. Nonetheless, we provide exemplary embodiments of the present invention using loops of three receivers in order to simplify the presentation of the invention.

According to general aspects of the present invention, the position of the Rover is estimated by forming a primary baseline between the Rover and one of the base stations, usually the closest base station, and then forming one or more secondary baselines from the Rover to other base stations. Then, one or more of the above relationships are applied to the configuration of stations to relate the measured data associated with the secondary baseline(s) with the measured data associated with the primary baseline, using one or more of the unknowns associated with the baselines between base stations through forms [11]. To simplify the presentation of the present invention, and without loss of generality, we will use base station B1 to form the primary baseline with the Rover, and we use base stations B2 and B3 to form the secondary baselines with the Rover. Varying amounts of measured data from the secondary baselines may be related with the primary baseline. In general, the greater amount of information so related increases the accuracy of the estimated position of the rover, and/or enables a greater spacing between base stations.

First General Group of Embodiments

In a first exemplary embodiment, the measured pseudo-range data from the secondary baselines are related with the measured pseudo-range data of the primary baseline. At first, only the L1-band data is used (forms [4A], [5A], [8A], and [9A]). We take the case where the distances between the stations are small enough that the difference terms associated with the ionosphere terms ($\Delta_{q,r}I_k^s$) are negligible. For the primary baseline, forms [8A] and [9A] reduce to:

$$\Delta_{1,0} b_k^{L1,s}=\Delta_{1,0}\rho_k^{L1,s}-\Delta_{1,0}\tilde{R}_k^s-\Delta_{1,0}T_k^s \quad [12A]$$

$$\Delta_{1,0} b_k^{L1,s}=a_k^s\cdot\delta X_k-c\Delta_{0,1}\tau_k+\Delta_{1,0}n_k^{L1,s} \quad [13A]$$

For the secondary baseline to the second base station, we have:

$$\Delta_{2,0} b_k^{L1,s}=\Delta_{2,0}\rho_k^{L1,s}-\Delta_{2,0}\tilde{R}_k^s-\Delta_{2,0}T_k^s \quad [14A]$$

$$\Delta_{2,0} b_k^{L1,s}=a_k^s\cdot\delta X_k-c\Delta_{2,0}\tau_k+\Delta_{2,0}n_k^{L1,s} \quad [15A]$$

For the secondary baseline to the third base station, we have:

$$\Delta_{3,0} b_k^{L1,s}=\Delta_{3,0}\rho_k^{L1,s}-\Delta_{3,0}\tilde{R}_k^s-\Delta_{3,0}T_k^s \quad [16A]$$

$$\Delta_{3,0} b_k^{L1,s}=a_k^s\cdot\delta X_k-c\Delta_{3,0}\tau_k+\Delta_{3,0}n_k^{L1,s} \quad [17A]$$

The terms in forms [12A], [14A], and [16A] are the residuals of differential navigation equations and are known. The unknowns are contained in the right-hand sides of forms [13A], [15A], and [17A]. There are a total of six solvable unknowns: $\Delta_{1,0}\tau_k$, $\Delta_{2,0}\tau_k$, $\Delta_{3,0}\tau_k$, and the three components of $\delta X_k$. However, using form [11A], $\Delta_{2,0}\tau_k$ may be related to $\Delta_{1,0}\tau_k$ through the estimated base-station time offset $\Delta_{2,1}\tau_k$ as follows: $\Delta_{2,0}\tau_k=\Delta_{2,1}\tau_k-\Delta_{0,1}\tau_k=\Delta_{2,1}\tau_k+\Delta_{1,0}\tau_k$. In a similar manner, $\Delta_{3,0}\tau_k$ may be related to $\Delta_{0,1}\tau_k$ through the estimated base-station time offset $\Delta_{3,1}\tau_k$ as follows: $\Delta_{3,0}\tau_k=\Delta_{3,1}\tau_k-\Delta_{0,1}\tau_k=\Delta_{3,1}\tau_k+\Delta_{1,0}\tau_k$. These two forms reduce the number of true solvable unknowns to four, and the following modified set of forms may be used to estimate the true solvable unknowns:

$$\Delta_{1,0}b_k^{L1,s}=a_k^s \cdot \delta X_k - c\Delta_{1,0}\tau_k + \Delta_{1,0}n_k^{L1,s} \quad [13A]$$

$$(\Delta_{2,0}b_k^{L1,s}+c\Delta_{2,1}\tau_k)=a_k^s \cdot \delta X_k - c\Delta_{1,0}\tau_k + \Delta_{2,0}n_k^{L1,s} \quad [15A^*]$$

$$(\Delta_{3,0}b_k^{L1,s}+c\Delta_{2,1}\tau_k)=a_k^s \cdot \delta X_k - c\Delta_{1,0}\tau_k + \Delta_{3,0}n_k^{L1,s} \quad [17A^*]$$

As an equivalent, one may view forms $\Delta_{2,0}\tau_k=\Delta_{2,1}\tau_k+\Delta_{1,0}\tau_k$ and $\Delta_{3,0}\tau_k=\Delta_{3,1}\tau_k+\Delta_{1,0}\tau_k$ as increasing the total number of forms by two, and may then estimate the six unknowns of the expanded form set:

$$\Delta_{1,0}b_k^{L1,s}=a_k^s \cdot \delta X_k - c\Delta_{1,0}\tau_k + \Delta_{1,0}n_k^{L1,s} \quad [13A]$$

$$\Delta_{2,0}b_k^{L1,s}=a_k^s \cdot \delta X_k - c\Delta_{2,0}\tau_k + \Delta_{2,0}n_k^{L1,s} \quad [15A]$$

$$\Delta_{3,0}b_k^{L1,s}=a_k^s \cdot \delta X_k - c\Delta_{3,0}\tau_k + \Delta_{3,0}n_k^{L1,s} \quad [17A]$$

$$\Delta_{2,0}\tau_k=\Delta_{2,1}\tau_k+\Delta_{1,0}\tau_k \quad [11A^*]$$

$$\Delta_{3,0}\tau_k=\Delta_{3,1}\tau_k+\Delta_{1,0}\tau_k \quad [11A^{**}]$$

The rover's location ($X_0=\overline{X}_0+\delta X_k$) may be estimated from each of the above form sets using any one of several known methods. Here, we demonstrate estimating the rover's location with a least squares fitting approach based on the first form set. After generating the residuals $\Delta_{1,0}b_k^{L1,s}$ for N satellites (s=1 to s=N) for the baseline between the rover and the first base station (R-B1), we collect them together into a first vector:

$$\Delta_{1,0}B_k^{L1}=[\Delta_{1,0}b_k^{L1,1}, \Delta_{1,0}b_k^{L1,2}, \ldots, \Delta_{1,0}b_k^{L1,N}]^T.$$

We do the same for the other two baselines, but modify their residuals according to the between-base station time offsets $c\Delta_{2,1}\tau_k$ and $c\Delta_{3,1}\tau_k$:

$$\Delta_{2,0}B_k^{*L1}=[(\Delta_{2,0}b_k^{L1,1}+c\Delta_{2,1}\tau_k), (\Delta_{2,0}b_k^{L1,2}+c\Delta_{2,1}\tau_k), \ldots, (\Delta_{2,0}b_k^{L1,N}+c\Delta_{2,1}\tau_k)]^T$$

$$\Delta_{3,0}B_k^{*L1}=[(\Delta_{3,0}b_k^{L1,1}+c\Delta_{3,1}\tau_k), (\Delta_{3,0}b_k^{L1,2}+c\Delta_{3,1}\tau_k), \ldots, (\Delta_{3,0}b_k^{L1,N}+c\Delta_{3,1}\tau_k)]^T$$

where the superscript "*" is used to indicate the modification. The noise terms can be similarly grouped as: $\Delta_{1,0}n_k^{L1}$, $\Delta_{2,0}n_k^{L1}$, and $\Delta_{3,0}n_k^{L1}$. The first form set of [13A], [15A*] and [17A*] may then be written in matrix form as:

$$\begin{bmatrix} \Delta_{1,0}B_k^{L1} \\ \Delta_{2,0}B_k^{*L1} \\ \Delta_{3,0}B_k^{*L1} \end{bmatrix} = \begin{bmatrix} A_k & \vec{-1} \\ A_k & \vec{-1} \\ A_k & \vec{-1} \end{bmatrix} \begin{bmatrix} \delta X_k \\ c\Delta_{1,0}\tau_k \end{bmatrix} + \begin{bmatrix} \Delta_{1,0}n_k^{L1} \\ \Delta_{2,0}n_k^{L1} \\ \Delta_{3,0}n_k^{L1} \end{bmatrix} \quad [18]$$

The solvable unknowns $$\begin{bmatrix} \delta X_k \\ c\Delta_{1,0}\tau_k \end{bmatrix}$$

may be estimated by a least squares process as follows:

$$\begin{bmatrix} \delta X_k \\ c\Delta_{1,0}\tau_k \end{bmatrix} = \left[ (A_k^*)^T \cdot C_{n,k}^{-1} \cdot A_k^* \right]^{-1} \cdot (A_k^*)^T \cdot C_{n,k}^{-1} \cdot \begin{bmatrix} \Delta_{1,0}B_k^{L1} \\ \Delta_{2,0}B_k^{*L1} \\ \Delta_{3,0}B_k^{*L1} \end{bmatrix} \quad [19]$$

where $$A_k^* = \begin{bmatrix} A_k & \vec{-1} \\ A_k & \vec{-1} \\ A_k & \vec{-1} \end{bmatrix},$$

and where $C_{n,k}$ is a 3N-by-3N covariance matrix for the noise terms $\Delta_{1,0}n_k^{L1}$, $\Delta_{2,0}n_k^{L1}$, and $\Delta_{3,0}n_k^{L1}$. The generation of covariance matrix $C_{n,k}$ is well known to the GPS art and described in the technical and patent literature (see for example U.S. Pat. No. 6,268,824, incorporated herein by reference, where the covariance matrices are denoted as matrices R), and a description thereof is not needed for one of ordinary skill in the GPS art to make and use the present invention. (In a subsequent section, we describe an estimation process that we prefer to use, and which may be applied to these embodiments.)

For the reader not familiar with the GPS art, we briefly note that matrix $C_{n,k}$ generally comprises a diagonal matrix, with each diagonal element being related to the noise sources in the two receivers that define the baseline (in this case the rover and one of the base stations). A covariance factor is usually associated with each satellite signal received by each receiver, and this covariance factor is usually related to the signal-to-noise ratio of the signal (as received by the receiver) and the elevation angle of the satellite (the multipath error has a strong correlation with the elevation angle). Each diagonal entry of matrix $C_{n,k}$ usually comprises an addition of the two covariance factors associated with the two receivers which contribute to the underlying noise quantity, e.g., base station B1 and the rover for noise quantity $\Delta_{1,0}n_k^{L1,s}$. For more details and information on the generation of the covariance matrices, the reader is directed to A. Leick, *GPS Satellite Surveying*, John Wiley & Sons, (1995). Matrix $A_k^*$ is known as the observation matrix, and it relates the solvable unknowns to the residuals. The solvable unknowns may also be estimated by other processes, such as various Kalman filtering processes.

The above may be carried out by omitting the rows related to one of the secondary base stations B2 and B3, such as the last N rows associated with the third base station. The above may also be carried out by adding rows related to a fourth base station (and even more base stations).

The second form set comprising [13A], [15A], [17A], [11A*], and [11A**] may be written as:

$$\begin{bmatrix} \Delta_{1,0}B_k^{L1} \\ \Delta_{2,0}B_k^{L1} \\ \Delta_{3,0}B_k^{L1} \\ \hline \Delta_{2,1}\tau_k \\ \Delta_{3,1}\tau_k \end{bmatrix} = \begin{bmatrix} A_k & -\vec{1} & \vec{0} & \vec{0} \\ A_k & \vec{0} & -\vec{1} & \vec{0} \\ A_k & \vec{0} & \vec{0} & -\vec{1} \\ \hline 0 & -1 & 1 & 0 \\ 0 & -1 & 0 & 1 \end{bmatrix} \begin{bmatrix} \delta X_k \\ \hline c\Delta_{1,0}\tau_k \\ c\Delta_{1,0}\tau_k \\ c\Delta_{3,0}\tau_k \end{bmatrix} + \begin{bmatrix} \Delta_{1,0}n_k^{L1} \\ \Delta_{2,0}n_k^{L1} \\ \Delta_{3,0}n_k^{L1} \\ \hline 0 \\ 0 \end{bmatrix} \quad [20]$$

and the solvable unknowns may similarly be estimated by various least squares processes, and Kalman filtering processes. The observation matrix in the above form is denoted as $A_k^{**}$.

Thus, the above exemplary embodiments provide methods of estimating the location of the rover station (R) with the use of a first base station (B1) a second base station (B2), and optionally a third base station (B3) or more base stations. In summary, the locations of the base stations were obtained, and one of the base stations (e.g., B1) was selected to form a primary baseline with the Rover station. We refer to this base station as the primary base station, and the other base stations as the secondary base stations. Additionally, for each of the secondary base stations, the time offset representative of the time difference between the clocks of the primary station and secondary base station is obtained. Also, measured satellite data as received by the rover, the primary base station, and the secondary base station(s) is obtained. From this, the set of residuals $\Delta_{1,0}B_k^{L1}$ associated with the primary baseline (R-B1) is generated, and is related to the measured satellite data received by the rover station and the first base station, the locations of the satellites, and the locations of the rover station and the first base station. Similarly, the set(s) of residuals $\Delta_{2,0}B_k^{L1}$, $\Delta_{3,0}B_k^{L1}$, etc. associated with the secondary baseline(s) are generated, each set of residuals being related to the measured satellite data received by the rover station and the secondary base station, the locations of the satellites, and the locations of the rover station and the secondary base station. Thereafter, the rover's location is estimated from the above sets of residuals, the time offset between the clocks of the base stations, and typically an observation matrix.

The above embodiments can be equally implemented using the L2-band signals. The forms for the primary baseline (neglecting ionosphere terms) are:

$$\Delta_{1,0}b_k^{L2,s} = \Delta_{1,0}\rho_k^{L2,s} - \Delta_{1,0}\tilde{R}_k^s - \Delta_{1,0}T_k^s \quad [12B]$$

$$\Delta_{1,0}b_k^{L2,s} = a_k^s \cdot \delta X_k - c\Delta_{1,0}\tau_k + \Delta_{1,0}n_k^{L2,s} \quad [13B]$$

For the secondary baseline to the second base station, we have:

$$\Delta_{2,0}b_k^{L2,s} = \Delta_{2,0}\rho_k^{L2,s} - \Delta_{2,0}\tilde{R}_k^s - \Delta_{2,0}T_k^s \quad [14B]$$

$$\Delta_{2,0}b_k^{L2,s} = a_k^s \cdot \delta X_k - c\Delta_{2,0}\tau_k + \Delta_{2,0}n_k^{L2,s} \quad [15B]$$

For the secondary baseline to the third base station, we have:

$$\Delta_{3,0}b_k^{L2,s} = \Delta_{3,0}\rho_k^{L2,s} - \Delta_{3,0}\tilde{R}_k^s - \Delta_{3,0}T_k^s \quad [16B]$$

$$\Delta_{3,0}b_k^{L2,s} = a_k^s \cdot \delta X_k - c\Delta_{3,0}\tau_k + \Delta_{3,0}n_k^{L2,s} \quad [17B]$$

Not only may these forms be used in place of forms [12A]–[17B], but they may be used in addition to forms [12A]–[17B]. In the latter case, the first form set [18] expands to $$\begin{bmatrix} \Delta_{1,0}B_k^{L1} \\ \Delta_{2,0}B_k^{*L1} \\ \Delta_{3,0}B_k^{*L1} \\ \hline \Delta_{1,0}B_k^{L2} \\ \Delta_{2,0}B_k^{*L2} \\ \Delta_{3,0}B_k^{*L2} \end{bmatrix} = \begin{bmatrix} A_k & -\vec{1} \\ A_k & -\vec{1} \\ A_k & -\vec{1} \\ \hline A_k & -\vec{1} \\ A_k & -\vec{1} \\ A_k & -\vec{1} \end{bmatrix} \begin{bmatrix} \delta X_k \\ \hline c\Delta_{1,0}\tau_k \end{bmatrix} + \begin{bmatrix} \Delta_{1,0}n_k^{L1} \\ \Delta_{2,0}n_k^{L1} \\ \Delta_{3,0}n_k^{L1} \\ \hline \Delta_{1,0}n_k^{L2} \\ \Delta_{2,0}n_k^{L2} \\ \Delta_{3,0}n_k^{L2} \end{bmatrix} \quad [18^+]$$

where:

$$\Delta_{2,0}B_k^{*L2} = [(\Delta_{2,0}b_k^{L2,1} + c\Delta_{2,1}\tau_k), (\Delta_{2,0}b_k^{L2,2} + c\Delta_{2,1}\tau_k), \ldots, (\Delta_{2,0}b_k^{L2,N} + c\Delta_{2,1}\tau_k)]^T$$

$$\Delta_{3,0}B_k^{*L2} = [(\Delta_{3,0}b_k^{L2,1} + c\Delta_{3,1}\tau_k), (\Delta_{3,0}b_k^{L2,2} + c\Delta_{3,1}\tau_k), \ldots, (\Delta_{3,0}b_k^{L2,N} + c\Delta_{3,1}\tau_k)]^T$$

From form [18+], the solvable unknowns may be estimated by a least squares process.

One might envision a different approach whereby the Rover's position is estimated by using each of the three baselines separately to generate three separate estimates of the Rover's location, and then averaging the three separate estimates to generate a final estimate. However, the present invention provides more accurate results than this possible approach because the present invention uses the additional information provided by forms [11] (specifically, [11A], [11A*] and [11A**]), which correlates the values of the unknowns associated with the baselines. The achievement of more accurate results by the present invention is also true for the embodiments described below.

Second General Group of Embodiments

The second group of embodiments builds upon the first group of embodiments by generating and utilizing the residuals derived from the phase measurements at the receivers. We take the case where the distances between the stations are small enough that the difference terms associated with the ionosphere terms ($\Delta_{q,r}I_k^s$) are negligible. In later embodiments, we will take these ionosphere terms into account. With this assumption, forms [8C], [9C], [8D], and [9D] for the primary baseline become the following forms [12C], [13C], [12D], and [13D], respectively:

$$\Delta_{1,0}p_k^{L1,s} = \Delta_{1,0}\phi_k^{L1,s} - \frac{1}{\lambda^{L1,s}}\Delta_{1,0}\tilde{R}_k^s - \frac{1}{\lambda^{L1,s}}\Delta_{1,0}T_k^s \quad [12C]$$

$$\Delta_{1,0}p_k^{L1,s} = \frac{1}{\lambda^{L1,s}}a_k^s \cdot \delta X_k - f^{L1,s}\Delta_{1,0}\tau_k + \Delta_{1,0}\hat{N}^{L1,s} + \Delta_{1,0}v_k^{L1,s} \quad [13C]$$

$$\Delta_{1,0}p_k^{L2,s} = \Delta_{1,0}\phi_k^{L2,s} - \frac{1}{\lambda^{L2,s}}\Delta_{1,0}\tilde{R}_k^s - \frac{1}{\lambda^{L2,s}}\Delta_{1,0}T_k^s \quad [12D]$$

$$\Delta_{1,0}p_k^{L2,s} = \frac{1}{\lambda^{L2,s}}a_k^s \cdot \delta X_k - f^{L2,s}\Delta_{1,0}\tau_k + \Delta_{1,0}\hat{N}^{L2,s} + \Delta_{1,0}v_k^{L2,s} \quad [13D]$$

For the secondary baseline to the second base station, we have:

$$\Delta_{2,0}p_k^{L1,s} = \Delta_{2,0}\phi_k^{L1,s} - \frac{1}{\lambda^{L1,s}}\Delta_{2,0}\tilde{R}_k^s - \frac{1}{\lambda^{L1,s}}\Delta_{2,0}T_k^s \quad [14C]$$

$$\Delta_{2,0}p_k^{L1,s} = \frac{1}{\lambda^{L1,s}}a_k^s \cdot \delta X_k - f^{L1,s}\Delta_{2,0}\tau_k + \Delta_{2,0}\hat{N}^{L1,s} + \Delta_{2,0}v_k^{L1,s} \quad [15C]$$

$$\Delta_{2,0}p_k^{L2,s} = \Delta_{2,0}\phi_k^{L2,s} - \frac{1}{\lambda^{L2,s}}\Delta_{2,0}\tilde{R}_k^s - \frac{1}{\lambda^{L2,s}}\Delta_{2,0}T_k^s \quad [14D]$$

-continued $$\Delta_{2,0} p_k^{L2,s} = \frac{1}{\lambda^{L2,s}} a_k^s \cdot \delta X_k - f^{L2,s} \Delta_{2,0} \tau_k + \Delta_{2,0} \hat{N}^{L2,s} + \Delta_{2,0} v_k^{L2,s} \quad [15D]$$

For the secondary baseline to the third base station, we have:

$$\Delta_{3,0} p_k^{L1,s} = \Delta_{3,0} \phi_k^{L1,s} - \frac{1}{\lambda^{L1,s}} \Delta_{3,0} \tilde{R}_k^s - \frac{1}{\lambda^{L1,s}} \Delta_{3,0} T_k^s \quad [16C]$$

$$\Delta_{3,0} p_k^{L1,s} = \frac{1}{\lambda^{L1,s}} a_k^s \cdot \delta X_k - f^{L1,s} \Delta_{3,0} \tau_k + \Delta_{3,0} \hat{N}^{L1,s} + \Delta_{3,0} v_k^{L1,s} \quad [17C]$$

$$\Delta_{3,0} p_k^{L2,s} = \Delta_{3,0} \phi_k^{L2,s} - \frac{1}{\lambda^{L2,s}} \Delta_{3,0} \tilde{R}_k^s - \frac{1}{\lambda^{L2,s}} \Delta_{3,0} T_k^s \quad [16D]$$

$$\Delta_{3,0} p_k^{L2,s} = \frac{1}{\lambda^{L2,s}} a_k^s \cdot \delta X_k - f^{L2,s} \Delta_{3,0} \tau_k + \Delta_{3,0} \hat{N}^{L2,s} + \Delta_{3,0} v_k^{L2,s} \quad [17D]$$

The terms in forms [12C, D], [14C, D], and [16C, D] are the residuals of the differential navigation equations and are known. The unknowns are contained on the right-hand sides of forms [13C, D], [15C, D], and [17C, D]. For N satellites, there are 6*N equations and a total of (6+6*N) solvable unknowns: $\Delta_{1,0}\tau_k$, $\Delta_{2,0}\tau_k$, $\Delta_{3,0}\tau_k$, the three components of $\delta X_k$, and N instances of each of $\Delta_{1,0}\hat{N}^{L1,s}$, $\Delta_{2,0}\hat{N}^{L1,s}$, $\Delta_{3,0}\hat{N}^{L1,s}$, $\Delta_{1,0}\hat{N}^{L2,s}$, $\Delta_{2,0}\hat{N}^{L2,s}$, and $\Delta_{3,0}\hat{N}^{L2,s}$ for s=1 to s=N satellites. However, using forms [11A], [11C], and [11D], the number of unknowns maybe reduced to 4+2*N. As we saw above, $\Delta_{2,0}\tau_k$ maybe related to $\Delta_{0,1}\tau_k$ through the estimated base-station time offset $\Delta_{2,1}\tau_k$ using form [11A] as follows: $\Delta_{2,0}\tau_k=\Delta_{2,1}\tau_k-\Delta_{0,1}\tau_k=\Delta_{2,1}\tau_k+\Delta_{1,0}\tau_k$. In a similar manner, $\Delta_{3,0}\tau_k$ may be related to $\Delta_{0,1}\tau_k$ through the estimated base-station time offset $\Delta_{3,1}\tau_k$ as follows: $\Delta_{3,0}\tau_k=\Delta_{3,1}\tau_k-\Delta_{0,1}\tau_k=\Delta_{3,1}\tau_k+\Delta_{1,0}\tau_k$. Form [11C] may be used to relate each of the L1 band ambiguities of the secondary baselines to the primary baseline as follows:

$$\Delta_{2,0}\hat{N}^{L1,s}=\Delta_{2,1}\hat{N}^{L1,s}-\Delta_{0,1}\hat{N}^{L1,s}=\Delta_{2,1}\hat{N}^{L1,s}+\Delta_{1,0}\hat{N}^{L1,s}.$$

$$\Delta_{3,0}\hat{N}^{L1,s}=\Delta_{3,1}\hat{N}^{L1,s}-\Delta_{0,1}\hat{N}^{L1,s}=\Delta_{3,1}\hat{N}^{L1,s}+\Delta_{1,0}\hat{N}^{L1,s}.$$

Similarly, Form [11D] may be used to relate each of the L2 band ambiguities of the secondary baselines to the primary baseline as follows:

$$\Delta_{2,0}\hat{N}^{L2,s}=\Delta_{2,1}\hat{N}^{L2,s}-\Delta_{0,1}\hat{N}^{L2,s}=\Delta_{2,1}\hat{N}^{L2,s}+\Delta_{1,0}\hat{N}^{L2,s}$$

$$\Delta_{3,0}\hat{N}^{L2,s}=\Delta_{3,1}\hat{N}^{L2,s}-\Delta_{0,1}\hat{N}^{L2,s}=\Delta_{3,1}\hat{N}^{L2,s}+\Delta_{1,0}\hat{N}^{L2,s}.$$

Forms [15C] and [15D] for the second base station B2 may then be modified as follows:

$$\left(\Delta_{2,0} p_k^{L1,s} + f^{L1,s}\Delta_{2,1}\tau_k - \Delta_{2,1}\hat{N}^{L1,s}\right) = \quad [15C^*]$$
$$\frac{1}{\lambda^{L1,s}} a_k^s \cdot \delta X - f^{L1,s}\Delta_{1,0}\tau_k + \Delta_{1,0}\hat{N}^{L1,s} + \Delta_{2,0}v_k^{L1,s}$$

$$\left(\Delta_{2,0} p_k^{L2,s} + f^{L2,s}\Delta_{2,1}\tau_k - \Delta_{2,1}\hat{N}^{L2,s}\right) = \quad [15D^*]$$
$$\frac{1}{\lambda^{L2,s}} a_k^s \cdot \delta X - f^{L2,s}\Delta_{1,0}\tau_k + \Delta_{1,0}\hat{N}^{L2,s} + \Delta_{2,0}v_k^{L2,s}$$

Forms [17C] and [17D] for the third base station B3 may be similarly modified:

$$\left(\Delta_{3,0} p_k^{L1,s} + f^{L1,s}\Delta_{3,1}\tau_k - \Delta_{3,1}\hat{N}^{L1,s}\right) = \quad [17C^*]$$
$$\frac{1}{\lambda^{L1,s}} a_k^s \cdot \delta X - f^{L1,s}\Delta_{1,0}\tau_k + \Delta_{1,0}\hat{N}^{L1,s} + \Delta_{3,0}v_k^{L1,s}$$

-continued $$\left(\Delta_{3,0} p_k^{L2,s} + f^{L2,s}\Delta_{3,1}\tau_k - \Delta_{3,1}\hat{N}^{L2,s}\right) = \quad [17D^*]$$
$$\frac{1}{\lambda^{L2,s}} a_k^s \cdot \delta X - f^{L2,s}\Delta_{1,0}\tau_k + \Delta_{1,0}\hat{N}^{L2,s} + \Delta_{3,0}v_k^{L2,s}$$

Similar to form [18], forms [13C, D] and modified forms [15C*, D*] and [17C*, D*] can be written in matrix form:

[21]

$$\begin{bmatrix} \Delta_{1,0}p_k^{L1} \\ \Delta_{2,0}p_k^{*L1} \\ \Delta_{3,0}p_k^{*L1} \\ \hline \Delta_{1,0}p_k^{L2} \\ \Delta_{2,0}p_k^{*L2} \\ \Delta_{3,0}p_k^{*L2} \end{bmatrix} = \begin{bmatrix} \Lambda_{L1}^{-1}\cdot A_k & -f^{L1} & I_{N\times N} & 0_{N\times N} \\ \Lambda_{L1}^{-1}\cdot A_k & -f^{L1} & I_{N\times N} & 0_{N\times N} \\ \Lambda_{L1}^{-1}\cdot A_k & -f^{L1} & I_{N\times N} & 0_{N\times N} \\ \hline \Lambda_{L2}^{-1}\cdot A_k & -f^{L2} & 0_{N\times N} & I_{N\times N} \\ \Lambda_{L2}^{-1}\cdot A_k & -f^{L2} & 0_{N\times N} & I_{N\times N} \\ \Lambda_{L2}^{-1}\cdot A_k & -f^{L2} & 0_{N\times N} & I_{N\times N} \end{bmatrix} \begin{bmatrix} \delta X_k \\ \hline \Delta_{1,0}\tau_k \\ \hline \Delta_{1,0}\hat{N}^{L1} \\ \hline \Delta_{1,0}\hat{N}^{L2} \end{bmatrix} +$$

$$\begin{bmatrix} \Delta_{1,0}v_k^{L1} \\ \Delta_{2,0}v_k^{L1} \\ \Delta_{3,0}v_k^{L1} \\ \hline \Delta_{1,0}v_k^{L2} \\ \Delta_{2,0}v_k^{L2} \\ \Delta_{3,0}v_k^{L2} \end{bmatrix}$$

where:

$\Delta_{1,0}p_k^{L1}$ is an N×1 column vector of the L1-band phase residuals $\Delta_{1,0}p_k^{L1,s}$ associated with the primary baseline, $\Delta_{2,0}p_k^{*L1}$ is an N×1 column vector of the modified L1-band phase residuals $(\Delta_{2,0}p_k^{L1,s}+f^{L1,s}\Delta_{2,1}\tau_k-\Delta_{2,1}\hat{N}^{L1,s})$ associated with the secondary baseline between the rover and base station B2, $\Delta_{3,0p_k}^{*L1}$ is an N×1 column vector of the modified L1-band phase residuals $(\Delta_{3,0}p_k^{L1,s}+f^{L1,s}\Delta_{3,1}\tau_k-\Delta_{3,1}\hat{N}^{L1,s})$ associated with the secondary baseline between the rover and base station B3, $\Delta_{1,0}p_k^{L2}$ is an N×1 column vector of the L2-band phase residuals $\Delta_{1,0}p_k^{L2,s}$ associated with the primary baseline, $\Delta_{2,0}p_k^{*L2}$ is an N×1 column vector of the modified L2-band phase residuals $(\Delta_{2,0}p_k^{L2,s}+f^{L2,s}\Delta_{2,1}\tau_k-\Delta_{2,1}\hat{N}^{L2,s})$ associated with the secondary baseline between the rover and base station B2, $\Delta_{3,0}p_k^{*L2}$ is an N×1 column vector of the modified L2-band phase residuals $(\Delta_{3,0}p_k^{L2,s}+f^{L2,s}\Delta_{3,1}\tau_k-\Delta_{3,1}\hat{N}^{L2,s})$ associated with the secondary baseline between the rover and base station B3, $A_k$ is the derivative matrix previously described, $\Lambda_{L1}$ is a diagonal matrix of the carrier wavelengths of the satellites in the L1-band, and $\Lambda_{L1}^{-1}$ is its inverse matrix, $\Lambda_{L2}$ is a diagonal matrix of the carrier wavelengths of the satellites in the L2-band, and $\Lambda_{L2}^{-1}$ is its inverse matrix, $f^{L1}$ is a column vector of the carrier frequencies of the satellites in the L1-band, where $\Lambda_{L1} \cdot f^{L1} = c \cdot \vec{1}$, where $c$ is the speed of light and $\vec{1}$ is a column vector of 1's, $f^{L2}$ is a column vector of the carrier frequencies of the satellites in the L2-band, where $\Lambda_{L2} \cdot f^{L2} = c \cdot \vec{1}$, $I_{N \times N}$ is an N×N identity matrix, and $0_{N \times N}$ is an N×N matrix of zeros.

The solvable unknowns $[\delta X_k, \Delta_{1,0}\tau_k, \Delta_{1,0}\hat{N}^{L1}, \Delta_{1,0}\hat{N}^{L2}]^T$ may be estimated by applying a number of processes to the combination of forms [21] and [18+]. Further below, in a subsequent section, we describe a preferred process that can be used on the combination of forms [21] and [18+]. Here, we describe how a least squares process may be applied to combined forms of [18+] and [21].

To combine form [21] with [18+], we rewrite form [22] to substitute $c \cdot \Delta_{1,0}\tau_k$ for $\Delta_{1,0}\tau_k$ as one of the unknowns, using the facts that $\Lambda_{L1} \cdot f^{L1} = c \cdot \vec{1}$ and $\Lambda_{L2} \cdot f^{L2} = c \cdot \vec{1}$:

$$\begin{bmatrix} \Delta_{1,0}p_k^{L1} \\ \Delta_{2,0}p_k^{*L1} \\ \Delta_{3,0}p_k^{*L1} \\ \hline \Delta_{1,0}p_k^{L2} \\ \Delta_{2,0}p_k^{*L2} \\ \Delta_{3,0}p_k^{*L2} \end{bmatrix} = \begin{bmatrix} \Lambda_{L1}^{-1} \cdot A_k & \Lambda_{L1}^{-1} \cdot \vec{1} & I_{N \times N} & 0_{N \times N} \\ \Lambda_{L1}^{-1} \cdot A_k & \Lambda_{L1}^{-1} \cdot \vec{1} & I_{N \times N} & 0_{N \times N} \\ \Lambda_{L1}^{-1} \cdot A_k & \Lambda_{L1}^{-1} \cdot \vec{1} & I_{N \times N} & 0_{N \times N} \\ \hline \Lambda_{L2}^{-1} \cdot A_k & \Lambda_{L2}^{-1} \cdot \vec{1} & 0_{N \times N} & I_{N \times N} \\ \Lambda_{L2}^{-1} \cdot A_k & \Lambda_{L2}^{-1} \cdot \vec{1} & 0_{N \times N} & I_{N \times N} \\ \Lambda_{L2}^{-1} \cdot A_k & \Lambda_{L2}^{-1} \cdot \vec{1} & 0_{N \times N} & I_{N \times N} \end{bmatrix} \begin{bmatrix} \delta X_k \\ \hline c \cdot \Delta_{1,0}\tau_k \\ \hline \Delta_{1,0}\hat{N}^{L1} \\ \hline \Delta_{1,0}\hat{N}^{L2} \end{bmatrix} + \begin{bmatrix} \Delta_{1,0}v_k^{L1} \\ \Delta_{2,0}v_k^{L1} \\ \Delta_{3,0}v_k^{L1} \\ \hline \Delta_{1,0}v_k^{L2} \\ \Delta_{2,0}v_k^{L2} \\ \Delta_{3,0}v_k^{L2} \end{bmatrix} \quad [22]$$

This facilitates the combination of forms [18+] and [22] as:

$$\begin{bmatrix} \Delta_{1,0}B_k^{L1} \\ \Delta_{2,0}B_k^{*L1} \\ \Delta_{3,0}B_k^{*L1} \\ \hline \Delta_{1,0}B_k^{L2} \\ \Delta_{2,0}B_k^{*L2} \\ \Delta_{3,0}B_k^{*L2} \\ \hline \Delta_{1,0}p_k^{L1} \\ \Delta_{2,0}p_k^{*L1} \\ \Delta_{3,0}p_k^{*L1} \\ \hline \Delta_{1,0}p_k^{L2} \\ \Delta_{2,0}p_k^{*L2} \\ \Delta_{3,0}p_k^{*L2} \end{bmatrix} = \begin{bmatrix} A_k & -\vec{1} & & \\ A_k & -\vec{1} & 0_{3N \times N} & 0_{3N \times N} \\ A_k & -\vec{1} & & \\ \hline A_k & -\vec{1} & & \\ A_k & -\vec{1} & 0_{3N \times N} & 0_{3N \times N} \\ A_k & -\vec{1} & & \\ \hline \Lambda_{L1}^{-1} \cdot A_k & \Lambda_{L1}^{-1} \cdot \vec{1} & & \\ \Lambda_{L1}^{-1} \cdot A_k & \Lambda_{L1}^{-1} \cdot \vec{1} & I_{3N \times N} & 0_{3N \times N} \\ \Lambda_{L1}^{-1} \cdot A_k & \Lambda_{L1}^{-1} \cdot \vec{1} & & \\ \hline \Lambda_{L2}^{-1} \cdot A_k & \Lambda_{L2}^{-1} \cdot \vec{1} & & \\ \Lambda_{L2}^{-1} \cdot A_k & \Lambda_{L2}^{-1} \cdot \vec{1} & 0_{3N \times N} & I_{3N \times N} \\ \Lambda_{L2}^{-1} \cdot A_k & \Lambda_{L2}^{-1} \cdot \vec{1} & & \end{bmatrix} \begin{bmatrix} \delta X_k \\ \hline c \cdot \Delta_{1,0}\tau_k \\ \hline \Delta_{1,0}\hat{N}^{L1} \\ \hline \Delta_{1,0}\hat{N}^{L2} \end{bmatrix} + \begin{bmatrix} \Delta_{1,0}n_k^{L1} \\ \Delta_{2,0}n_k^{L1} \\ \Delta_{3,0}n_k^{L1} \\ \hline \Delta_{1,0}n_k^{L2} \\ \Delta_{2,0}n_k^{L2} \\ \Delta_{3,0}n_k^{L2} \\ \hline \Delta_{1,0}v_k^{L1} \\ \Delta_{2,0}v_k^{L1} \\ \Delta_{3,0}v_k^{L1} \\ \hline \Delta_{1,0}v_k^{L2} \\ \Delta_{2,0}v_k^{L2} \\ \Delta_{3,0}v_k^{L2} \end{bmatrix} \quad [23]$$

A least squares process is applied to form [23] to generate the floating ambiguities over several epochs, and the floating ambiguities are averaged to generate an estimate of the floating ambiguities. For each epoch, the following may be generated:

$$\begin{bmatrix} \delta X_k \\ \hline c \cdot \Delta_{1,0}\tau_k \\ \hline \Delta_{1,0}\vec{N}^{L1} \\ \hline \Delta_{1,0}\vec{N}^{L2} \end{bmatrix} = (A_{23,k}^*)^T \cdot \left[ \begin{bmatrix} C_{n,k}^{L1} & 0_{3N \times 3N} & 0_{3N \times 3N} & 0_{3N \times 3N} \\ 0_{3N \times 3N} & C_{n,k}^{L2} & 0_{3N \times 3N} & 0_{3N \times 3N} \\ 0_{3N \times 3N} & 0_{3N \times 3N} & C_{v,k}^{L1} & 0_{3N \times 3N} \\ 0_{3N \times 3N} & 0_{3N \times 3N} & 0_{3N \times 3N} & C_{v,k}^{L2} \end{bmatrix}^{-1} \cdot A_{23,k}^* \right]^{-1} \times (A_{23,k}^*)^T \cdot$$

$$\begin{bmatrix} C_{n,k}^{L1} & 0_{3N\times 3N} & 0_{3N\times 3N} & 0_{3N\times 3N} \\ 0_{3N\times 3N} & C_{n,k}^{L2} & 0_{3N\times 3N} & 0_{3N\times 3N} \\ 0_{3N\times 3N} & 0_{3N\times 3N} & C_{v,k}^{L1} & 0_{3N\times 3N} \\ 0_{3N\times 3N} & 0_{3N\times 3N} & 0_{3N\times 3N} & C_{v,k}^{L2} \end{bmatrix}^{-1} \cdot \begin{bmatrix} \Delta_{1,0}B_k^{L1} \\ \Delta_{2,0}B_k^{*L1} \\ \Delta_{3,0}B_k^{*L1} \\ \Delta_{1,0}B_k^{L2} \\ \Delta_{2,0}B_k^{*L2} \\ \Delta_{3,0}B_k^{*L2} \\ \Delta_{1,0}p_k^{L1} \\ \Delta_{2,0}p_k^{*L1} \\ \Delta_{3,0}p_k^{*L1} \\ \Delta_{1,0}p_k^{L2} \\ \Delta_{2,0}p_k^{*L2} \\ \Delta_{3,0}p_k^{*L2} \end{bmatrix}$$

where $A^*_{23,k}$ is the observation matrix of form [23] (the matrix which is multiplying the solvable unknowns in form [23]), and where different covariance matrixes $C_{v,k}^{L1}$ and $C_{v,k}^{L2}$ are used for the L1-band and L2-band data since the magnitudes and variances of the noise sources associated with the phase measurements are different from those of the noise sources associated with the pseudorange measurements. Also, the least squares method normally produces the floating ambiguities $\Delta_{1,0}\overline{N}^{L1}$, $\Delta_{1,0}\overline{N}^{L2}$ rather than the fixed-integer ambiguities $\Delta_{1,0}\hat{N}^{L1}$, $\Delta_{1,0}\hat{N}^{L2}$. In practice, the least squares process is applied over many epochs, and the computed floating ambiguities are averaged to generate a final estimate of the floating ambiguities. Several averaging processes are described in U.S. Pat. No. 6,268,824, which is incorporated herein by reference, and may be used. After generating a suitable set of floating ambiguities, a conventional method of generating the fixed-integer ambiguities or the integer ambiguities may take place.

With the fixed-integer ambiguities estimated, the unknowns $\delta X_k$ and $c\cdot\Delta_{1,0}\tau_k$ may be estimated by substituting the estimated values of $\Delta_{1,0}\hat{N}^{L1}$ and $\Delta_{1,0}\hat{N}^{L2}$ into form [23], and moving these terms to the left-hand side with the residuals to provide form [24]:

$$\begin{bmatrix} \Delta_{1,0}B_k^{L1} \\ \Delta_{2,0}B_k^{*L1} \\ \Delta_{3,0}B_k^{*L1} \\ \Delta_{1,0}B_k^{L2} \\ \Delta_{2,0}B_k^{*L2} \\ \Delta_{3,0}B_k^{*L2} \\ \Delta_{1,0}p_k^{L1} \\ \Delta_{2,0}p_k^{*L1} \\ \Delta_{3,0}p_k^{*L1} \\ \Delta_{1,0}p_k^{L2} \\ \Delta_{2,0}p_k^{*L2} \\ \Delta_{3,0}p_k^{*L2} \end{bmatrix} - \begin{bmatrix} 0_{3N\times 1} \\ \hline 0_{3N\times 1} \\ \hline \Delta_{1,0}\hat{N}_k^{L1} \\ \Delta_{2,0}\hat{N}_k^{L1} \\ \Delta_{3,0}\hat{N}_k^{L1} \\ \Delta_{1,0}\hat{N}_k^{L2} \\ \Delta_{2,0}\hat{N}_k^{L2} \\ \Delta_{3,0}\hat{N}_k^{L2} \end{bmatrix} = \begin{bmatrix} A_k & -\vec{1} \\ A_k & -\vec{1} \\ A_k & -\vec{1} \\ A_k & -\vec{1} \\ A_k & -\vec{1} \\ A_k & -\vec{1} \\ \Lambda_{L1}^{-1}A_k & \Lambda_{L1}^{-1}\vec{1} \\ \Lambda_{L1}^{-1}A_k & \Lambda_{L1}^{-1}\vec{1} \\ \Lambda_{L1}^{-1}A_k & \Lambda_{L1}^{-1}\vec{1} \\ \Lambda_{L2}^{-1}A_k & \Lambda_{L2}^{-1}\vec{1} \\ \Lambda_{L2}^{-1}A_k & \Lambda_{L2}^{-1}\vec{1} \\ \Lambda_{L2}^{-1}A_k & \Lambda_{L2}^{-1}\vec{1} \end{bmatrix} \begin{bmatrix} \delta X_k \\ \hline c\cdot\Delta_{1,0}\tau_k \end{bmatrix} + \begin{bmatrix} \Delta_{1,0}n_k^{L1} \\ \Delta_{2,0}n_k^{L1} \\ \Delta_{3,0}n_k^{L1} \\ \Delta_{1,0}n_k^{L2} \\ \Delta_{2,0}n_k^{L2} \\ \Delta_{3,0}n_k^{L2} \\ \Delta_{1,0}v_k^{L1} \\ \Delta_{2,0}v_k^{L1} \\ \Delta_{3,0}v_k^{L1} \\ \Delta_{1,0}v_k^{L2} \\ \Delta_{2,0}v_k^{L2} \\ \Delta_{3,0}v_k^{L2} \end{bmatrix} \quad [24]$$

We consider the left-hand side of form [24] to be a plurality of sets of residuals since each comprises the known quantities of differential navigation equations. A second least squares process may then be applied based on form [24] to estimate the unknowns $\delta X_k$ and $c\cdot\Delta_{1,0}\tau_k$ as follows:

$$\begin{bmatrix} \delta X_k \\ \hline c\cdot\Delta_{1,0}\tau_k \end{bmatrix} = \left[(A_{24,k}^*)^T \cdot \begin{bmatrix} C_{n,k}^{L1} & 0_{3N\times 3N} & 0_{3N\times 3N} & 0_{3N\times 3N} \\ 0_{3N\times 3N} & C_{n,k}^{L2} & 0_{3N\times 3N} & 0_{3N\times 3N} \\ 0_{3N\times 3N} & 0_{3N\times 3N} & C_{v,k}^{L1} & 0_{3N\times 3N} \\ 0_{3N\times 3N} & 0_{3N\times 3N} & 0_{3N\times 3N} & C_{v,k}^{L2} \end{bmatrix}^{-1} \cdot A_{24,k}^* \right]^{-1} \times (A_{24,k}^*)^T \cdot \quad [25]$$

$$\begin{bmatrix} C_{n,k}^{L1} & 0_{3N\times 3N} & 0_{3N\times 3N} & 0_{3N\times 3N} \\ 0_{3N\times 3N} & C_{n,k}^{L2} & 0_{3N\times 3N} & 0_{3N\times 3N} \\ 0_{3N\times 3N} & 0_{3N\times 3N} & C_{v,k}^{L1} & 0_{3N\times 3N} \\ 0_{3N\times 3N} & 0_{3N\times 3N} & 0_{3N\times 3N} & C_{v,k}^{L2} \end{bmatrix}^{-1} \cdot \left\{ \begin{bmatrix} \Delta_{1,0}B_k^{L1} \\ \Delta_{2,0}B_k^{*L1} \\ \Delta_{3,0}B_k^{*L1} \\ \Delta_{1,0}B_k^{L2} \\ \Delta_{2,0}B_k^{*L2} \\ \Delta_{3,0}B_k^{*L2} \\ \Delta_{1,0}p_k^{L1} \\ \Delta_{2,0}p_k^{*L1} \\ \Delta_{3,0}p_k^{*L1} \\ \Delta_{1,0}p_k^{L2} \\ \Delta_{2,0}p_k^{*L2} \\ \Delta_{3,0}p_k^{*L2} \end{bmatrix} - \begin{bmatrix} 0_{3N\times 1} \\ \hline 0_{3N\times 1} \\ \hline \Delta_{1,0}\hat{N}_k^{L1} \\ \Delta_{2,0}\hat{N}_k^{L1} \\ \Delta_{3,0}\hat{N}_k^{L1} \\ \Delta_{1,0}\hat{N}_k^{L2} \\ \Delta_{2,0}\hat{N}_k^{L2} \\ \Delta_{3,0}\hat{N}_k^{L2} \end{bmatrix} \right\}$$

where $A^*_{24,k}$ is the observation matrix of form [24] (the matrix which is multiplying the solvable unknowns in form [24]). In form [25], the floating ambiguities may be used in place of the fixed-integer ambiguities. However, lower accuracy generally results, although the estimation speed is increased since the step of generating the fixed-integer ambiguities from the floating ambiguities may be omitted.

With the large amount of measurement data afforded by the present invention, various residuals may be omitted from use in the estimation process. For example, we may work only with L1-band data of all three stations and use only the residuals associated with this data. We may also work only with data and residuals from two base stations (the primary baseline and one secondary baseline). For applications needing lower accuracy, we may work with the phase and pseudo-range data of the primary baseline (R-B1) and just the pseudo-range data or phase data of one of the secondary baselines. Also, one can undertake an analysis of the satellite constellation and select the satellites which should provide the highest accuracy, using the pseudo-range and phase data from the L1- and L2-bands. Finally, while we have illustrated the invention with the single-difference navigation equations, it may be appreciated that higher-order differences of the navigation equations may be used. Such higher-order differences have known quantities (which form the residuals) and similar unknowns to be solved for, which can be solved by the above-described methods.

Thus, the above exemplary embodiments from the second group of embodiments provide methods of estimating the location of the rover station (R) with the use of a first base station (B1) a second base station (B2), and optionally a third base station (B3) or more base stations. As a summary of an exemplary embodiment of the second group, the locations of the base stations were obtained, and one of the base stations (e.g., B1) was selected to form a primary baseline with the Rover station. Additionally, for each of the secondary base stations, the time offset representative of the time difference between the clocks of the primary and secondary base stations is obtained, and a set of satellite-phase cycle ambiguities related to the baseline between the secondary and primary base stations is obtained for both of the frequency bands. Also, measured satellite data as received by the rover, the primary base station, and the secondary base station(s) is obtained. From this, the sets of residuals $\Delta_{1,0}B_k^{L1}$, $\Delta_{1,0}B_k^{L2}$, $\Delta_{1,0}P_k^{L1}$ and $\Delta_{1,0}P_k^{L2}$ of differential navigation equations associated with the primary baseline (R-B1) are generated, and are related to the measured satellite data received by the rover station and the first base station, the locations of the satellites, and the locations of the rover station and the first base station. Similar set(s) of residuals associated with the secondary baseline(s) are generated, each set of residuals related to the measured satellite data received by the rover station and the secondary base station, the locations of the satellites, and the locations of the rover station and the secondary base station. Thereafter, the rover's location is estimated from the above sets of residuals, the time offset between the clocks of the base stations, the sets of satellite-phase cycle ambiguities related to the baseline between the primary base station and the secondary base stations, and typically an observation matrix.

Third Group of Embodiments

Figure 3:
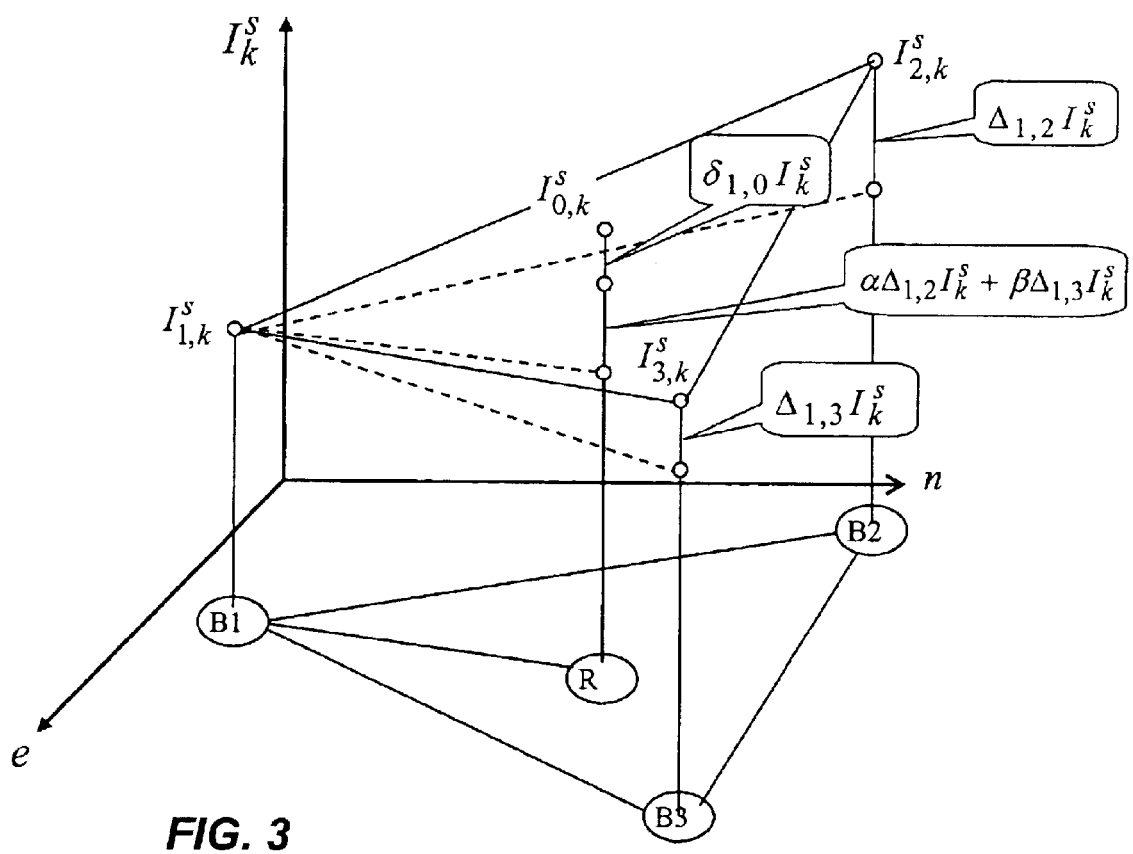
FIG. 3 is a perspective view of the ionosphere delay differentials to selected exemplary methods according to the present invention.

In the above embodiments, the ionosphere delays were assumed to equally affect the rover and base stations, and the between-station differences were neglected. When the base stations and rover are separated by large distances, better accuracy may be obtained by taking into account the ionosphere delays. This can be done in a number of ways according to the present invention. FIG. 3 provides a representation of the ionosphere delays of one satellite "s" at the base and rover stations. Shown is a 3-d Cartesian system having two planar axes, north (n) and east (e), to represent the terrain on which the stations are located, and a vertical axis to represent the ionosphere delays of a satellite "s" as a function of the terrain. The ionosphere delay will be different for each satellite. The locations of the rover station R and three base stations B1, B2, and B3 are indicated in the north-east plane of the figure. The ionosphere delays for each of these stations are indicated as $I_{0,k}^s$, $I_{1,k}^s$, $I_{2,k}^s$ and $I_{3,k}^s$, respectively. The preferred embodiments of the processing of the base station data, which is more fully described below, generates estimates for the between-base station differences in the ionosphere delays $\Delta_{1,2}I_k^s$, $\Delta_{1,3}I_k^s$, and $\Delta_{2,3}I_k^s$, which we call ionosphere delay differentials. From two of these differentials, an estimate for the ionosphere delay between the rover and any of the base stations can be generated. Here, we are most interested in the difference $\Delta_{1,0}I_k^s$ associated with the primary baseline, the one between the rover and the first base station.

The first approach is to generate an estimate $\Delta_{1,0}\tilde{I}_k^s$ of $\Delta_{1,0}I_k^s$ based on an interpolation of two of the known ionosphere delay differentials ($\Delta_{1,2}I_k^s$, $\Delta_{1,3}I_k^s$, $\Delta_{2,3}I_k^s$) onto the known approximate location of the rover. Here, we use $\Delta_{1,2}I_k^s$ and $\Delta_{1,3}I_k^s$ in the following interpolation:

$$\Delta_{1,0}\tilde{I}_s^k = \alpha\Delta_{1,2}I_k^s + \beta\Delta_{1,3}I_k^s \qquad [26]$$

where $\alpha$ and $\beta$ are interpolation constants. The interpolation constants are determined as follows. Let $X_1$, $X_2$, and $X_3$ be three-dimensional vectors which represent the positions of base stations B1, B2, and B3, respectively. Let $\overline{X}_{0,k}$ represent the approximate estimated position of the rover at the "k" epoch. Furthermore, let the notation $\{X\}_n$ denote the north component of a position vector X or a difference vector X of positions, and the notation $\{X\}_e$ denote the east component of a position vector X or a difference vector of positions X. We can then write the north and east components of the position differences $\{\overline{X}_{0,k}-X_1\}_n$ and $\{\overline{X}_{0,k}-X_1\}_e$ as:

$$\{\overline{X}_{0,k}-X_1\}_n = \alpha\{X_2-X_1\}_n + \beta\{X_3-X_1\}_n$$

$$\{\overline{X}_{0,k}-X_1\}_e = \alpha\{X_2-X_1\}_e + \beta\{X_3-X_1\}_e \qquad [27]$$

There are two equations in the two unknowns $\alpha$ and $\beta$, which can be readily solved for $\alpha$ and $\beta$. When $\overline{X}_{0,k}$ is within the triangle formed by the base stations, both of $\alpha$ and $\beta$ are greater than zero, and their sum is equal or less than one.

Because $\overline{X}_{0,k}$ is not necessarily at the exact position of the rover, the estimate $\Delta_{1,0}\tilde{I}_k^s$ will not necessarily be equal to the true value $\Delta_{1,0}I_k^s$. In addition, the ionosphere delay does not always vary in a linear manner over the terrain, and often has second order variations with respect to the east and north directions, which are not modeled well by forms [26] and [27]. We model the difference between $\Delta_{1,0}\tilde{I}_k^s$ and $\Delta_{1,0}I_k^s$ caused by these effects by the unknown quantity $\delta_{1,0}I_k^s$, and thus we can write:

$$\Delta_{1,0}I_k^s = \Delta_{1,0}\tilde{I}_k^s + \delta_{1,0}I_k^s. \qquad [28]$$

We can also relate $I_{0,k}^s$ to $I_{1,k}^s$ as follows:

$$I_{0,k}^s = I_{1,k}^s + \Delta_{1,0}\tilde{I}_k^s + \delta_{1,0}I_k^s = (\alpha\Delta_{1,2}I_k^s + \beta\Delta_{1,3}I_k^s) + \delta_{1,0}I_k^s,$$

which is graphically shown in FIG. 3.

With form [28], estimates for ionosphere differentials on the secondary baselines $\Delta_{2,0}I_k^s$ and $\Delta_{3,0}I_k^s$ can be generated using form [11B] ($\Delta_{2,1}I_k^s + \Delta_{0,2}I_k^s \Delta_{0,1}I_k^s$) as follows:

$$\Delta_{2,0}I_k^s = \Delta_{2,1}I_k^s + \Delta_{1,0}\tilde{I}_k^s + \delta_{1,0}I_k^s \qquad [29]$$

$$\Delta_{3,0}I_k^s = \Delta_{3,1}I_k^s + \Delta_{1,0}\tilde{I}_k^s + \delta_{1,0}I_k^s \qquad [30]$$

In composing forms [12]–[17], we neglected the ionosphere delays. In the third group of embodiments, we add the ionosphere delay terms to these forms. By comparing the general forms [9A–D] to the specific forms [13A–D],

[15A–D], and [17A–D], we can generate augmented forms [12]–[17] as follows:

The primary baseline $$\Delta_{1,0}b_k^{L1}=\Delta_{1,0}\rho_k^{L1}-\Delta_{1,0}\tilde{R}_k-\Delta_{1,0}T_k-\Delta_{1,0}\tilde{I}_k \quad [12A']$$

$$\Delta_{1,0}b_k^{L1}=A_k\cdot\delta X_k-c\Delta_{1,0}\tau_k\cdot\vec{1}+\delta_{1,0}I_k+\Delta_{1,0}n_k^{L1} \quad [13A']$$

$$\Delta_{1,0}b_k^{L2}=\Delta_{1,0}\rho_k^{L2}-\Delta_{1,0}\tilde{R}_k-\Delta_{1,0}T_k-\Lambda_{L2}^{2}\cdot\Lambda_{L1}^{-2}\cdot\Delta_{1,0}\tilde{I}_k \quad [12B']$$

$$\Delta_{1,0}b_k^{L2}=A_k\cdot\delta X_k-c\Delta_{1,0}\tau_k\cdot\vec{1}+\Lambda_{L2}^{2}\cdot\Lambda_{L1}^{-2}\cdot\delta_{1,0}I_k+\Delta_{1,0}n_k^{L2} \quad [13B']$$

$$\Delta_{1,0}p_k^{L1}=\Delta_{1,0}\phi_k^{L1}-\Lambda_{L1}^{-1}\cdot\Delta_{1,0}\tilde{R}_k-\Lambda_{L1}^{-1}\cdot\Delta_{1,0}T_k+\Lambda_{L1}^{-1}\cdot\Delta_{1,0}\tilde{I}_k \quad [12C']$$

$$\Delta_{1,0}p_k^{L1}=\Lambda_{L1}^{-1}\cdot A_k\cdot\delta X_k-f^{L1}\cdot\Delta_{1,0}\tau_k\cdot\vec{1}-\Lambda_{L1}^{-1}\cdot\delta_{1,0}I_k+\Delta_{1,0}\hat{N}^{L1}+\Delta_{1,0}v_k^{L1} \quad [13C']$$

$$\Delta_{1,0}p_k^{L2}=\Delta_{1,0}\phi_k^{L2}-\Lambda_{L2}^{-1}\cdot\Delta_{1,0}\tilde{R}_k-\Lambda_{L2}^{-1}\cdot\Delta_{1,0}T_k+\Lambda_{L2}^{2}\cdot\Lambda_{L1}^{-2}\cdot\Delta_{1,0}\tilde{I}_k \quad [12D']$$

$$\Delta_{1,0}p_k^{L2}=\Lambda_{L2}^{-1}\cdot A_k\cdot\delta X_k-f^{L2}\cdot\Delta_{1,0}\tau_k\cdot\vec{1}+\Delta_{1,0}\hat{N}^{L2}-\Lambda_{L2}\cdot\Lambda_{L1}^{-2}\cdot\delta_{1,0}I_k+\Delta_{1,0}v_k^{L2} \quad [13D']$$

The secondary baseline to the second base station B2

$$\Delta_{2,0}b_k^{\cdot L1}=\Delta_{2,0}\rho_k^{L1}-\Delta_{2,0}\tilde{R}_k-\Delta_{2,0}T_k+c\Delta_{2,1}\tau_k\cdot\vec{1}-(\Delta_{2,1}I_k+\Delta_{1,0}\tilde{I}_k) \quad [14A']$$

$$\Delta_{2,0}b_k^{\cdot L1}=A_k\cdot\delta X_k-c\Delta_{1,0}\tau_k\cdot\vec{1}+\delta_{1,0}I_k+\Delta_{2,0}n_k^{L1} \quad [15A']$$

$$\Delta_{2,0}b_k^{\cdot L2}=\Delta_{2,0}\rho_k^{L2}-\Delta_{2,0}\tilde{R}_k-\Delta_{2,0}T_k+c\Delta_{2,1}\tau_k\cdot\vec{1}-\Lambda_{L2}^{2}\cdot\Lambda_{L1}^{-2}\cdot(\Delta_{2,1}I_k+\Delta_{1,0}\tilde{I}_k) \quad [14B']$$

$$\Delta_{2,0}b_k^{\cdot L2}=A_k\cdot\delta X_k-c\Delta_{1,0}\tau_k\cdot\vec{1}+\Lambda_{L2}^{2}\cdot\Lambda_{L1}^{-2}\cdot\delta_{1,0}I_k+\Delta_{2,0}n_k^{L2} \quad [15B']$$

$$\Delta_{2,0}p^{k\cdot L1}=\Delta_{2,0}\phi_k^{L1}-\Lambda_{L1}^{-1}\cdot\Delta_{2,0}\tilde{R}_k-\Lambda_{L1}^{-1}\cdot\Delta_{2,0}T_k+f^{L1}\cdot\Delta_{2,1}\tau_k\cdot\vec{1}-\Delta_{2,1}\hat{N}^{L1}+\Lambda_{L1}^{-1}\cdot(\Delta_{2,1}I_k+\Delta_{1,0}\tilde{I}_k) \quad [14C']$$

$$\Delta_{2,0}p_k^{\cdot L1}=\Lambda_{L1}^{-1}\cdot A_k\cdot\delta X_k-f^{L1}\cdot\Delta_{1,0}\tau_k\cdot\vec{1}+\Delta_{1,0}\hat{N}^{L1}-\Lambda_{L1}^{-1}\cdot\delta_{1,0}I_k+\Delta_{2,0}v_k^{L1} \quad [15C']$$

$$\Delta_{2,0}p_k^{\cdot L2}=\Delta_{2,0}\phi_k^{L2}-\Lambda_{L2}^{-1}\cdot\Delta_{2,0}\tilde{R}_k-\Lambda_{L2}^{-1}\cdot\Delta_{2,0}T_k+f^{L2}\cdot\Delta_{2,1}\tau_k\cdot\vec{1}-\Delta_{2,1}\hat{N}^{L2}+\Lambda_{L2}\cdot\Lambda_{L1}^{-2}\cdot(\Delta_{2,1}I_k+\Delta_{1,0}\tilde{I}_k) \quad [14D']$$

$$\Delta_{2,0}p_k^{\cdot L2}=\Lambda_{L2}^{-1}\cdot A_k\cdot\delta X_k-f^{L2}\cdot\Delta_{1,0}\tau_k\cdot\vec{1}+\Delta_{1,0}\hat{N}^{L2}-\Lambda_{L2}\cdot\Lambda_{L1}^{-2}\cdot\delta_{1,0}I_k+\Delta_{2,0}v_k^{L2} \quad [15D']$$

The secondary baseline to the third base station B3

$$\Delta_{3,0}b_k^{\cdot L1}=\Delta_{3,0}\rho_k^{L1}-\Delta_{3,0}\tilde{R}_k-\Delta_{3,0}T_k+c\Delta_{3,1}\tau_k\cdot\vec{1}-(\Delta_{3,1}I_k+\Delta_{1,0}\tilde{I}_k) \quad [16A']$$

$$\Delta_{3,0}b_k^{\cdot L1}=A_k\cdot\delta X_k-c\Delta_{1,0}\tau_k\cdot\vec{1}+\delta_{1,0}I_k+\Delta_{3,0}n_k^{L1} \quad [17A']$$

$$\Delta_{3,0}b_k^{\cdot L2}=\Delta_{3,0}\rho_k^{L2}-\Delta_{3,0}\tilde{R}_k-\Delta_{3,0}T_k+c\Delta_{3,1}\tau_k\cdot\vec{1}-\Lambda_{L2}^{2}\cdot\Lambda_{L1}^{-2}\cdot(\Delta_{3,1}I_k+\Delta_{1,0}\tilde{I}_k) \quad [16B']$$

$$\Delta_{3,0}b_k^{\cdot L2}=A_k\cdot\delta X_k-c\Delta_{1,0}\tau_k\cdot\vec{1}+\Lambda_{L2}^{2}\cdot\Lambda_{L1}^{-2}\cdot\delta_{1,0}I_k+\Delta_{3,0}n_k^{L2} \quad [17B']$$

$$\Delta_{3,0}p_k^{\cdot L1}=\Delta_{3,0}\phi_k^{L1}-\Lambda_{L1}^{-1}\cdot\Delta_{3,0}\tilde{R}_k-\Lambda_{L1}^{-1}\cdot\Delta_{3,0}T_k+f^{L1}\cdot\Delta_{3,1}\tau_k\cdot\vec{1}-\Delta_{3,1}\hat{N}^{L1}+\Lambda_{L1}^{-1}\cdot(\Delta_{3,1}I_k+\Delta_{1,0}\tilde{I}_k) \quad [16C']$$

$$\Delta_{3,0}p_k^{\cdot L1}=\Lambda_{L1}^{-1}\cdot A_k\cdot\delta X_k-f^{L1}\cdot\Delta_{1,0}\tau_k\cdot\vec{1}+\Delta_{1,0}\hat{N}^{L1}-\Lambda_{L1}^{-1}\cdot\delta_{1,0}I_k+\Delta_{3,0}v_k^{L1} \quad [17C']$$

$$\Delta_{3,0}p_k^{\cdot L2}=\Delta_{3,0}\phi_k^{L2}-\Lambda_{L2}^{-1}\cdot\Delta_{3,0}\tilde{R}_k-\Lambda_{L2}^{-1}\cdot\Delta_{3,0}T_k+f^{L2}\cdot\Delta_{3,1}\tau_k\cdot\vec{1}-\Delta_{3,1}\hat{N}^{L2}+\Lambda_{L2}\cdot\Lambda_{L1}^{-2}\cdot(\Delta_{3,1}I_k+\Delta_{1,0}\tilde{I}_k) \quad [16D']$$

$$\Delta_{3,0}p_k^{L2}=\Lambda_{L2}^{-1}\cdot A_k\cdot\delta X_k-f^{L2}\cdot\Delta_{1,0}\tau_k\cdot\vec{1}+\Delta_{1,0}\hat{N}^{L2}-\Lambda_{L2}\cdot\Lambda_{L1}^{-2}\cdot\delta_{1,0}I_k+\Delta_{3,0}v_k^{L2} \quad [17D']$$

This set of forms comprises N additional solvable unknowns, as present in the vector $\delta_{1,0}I_k$, which have been incorporated into forms [13'], [15'], and [17']. Also, the rough ionosphere approximation $\Delta_{1,0}\tilde{I}_k$ has been incorporated into forms [12'], [14'], and [16']. Finally, the between-base-station data $\Delta_{2,1}I_k$ has been incorporated into forms [14'], and the between-base-station data $\Delta_{3,1}I_k$ has been incorporated into forms [16'].

The above-described processes of estimating the floating ambiguities and thereafter estimating the rover position can be expanded to include the unknowns $\delta_{1,0}I_k$. For lower accuracy, the unknowns $\delta_{1,0}I_k$ may be omitted from the above forms [13'], [15'], and [17']. However, approximate information on the ionosphere delays is incorporated into forms [12'], [14'], and [16'].

Embodiment Implementations

Figure 5:
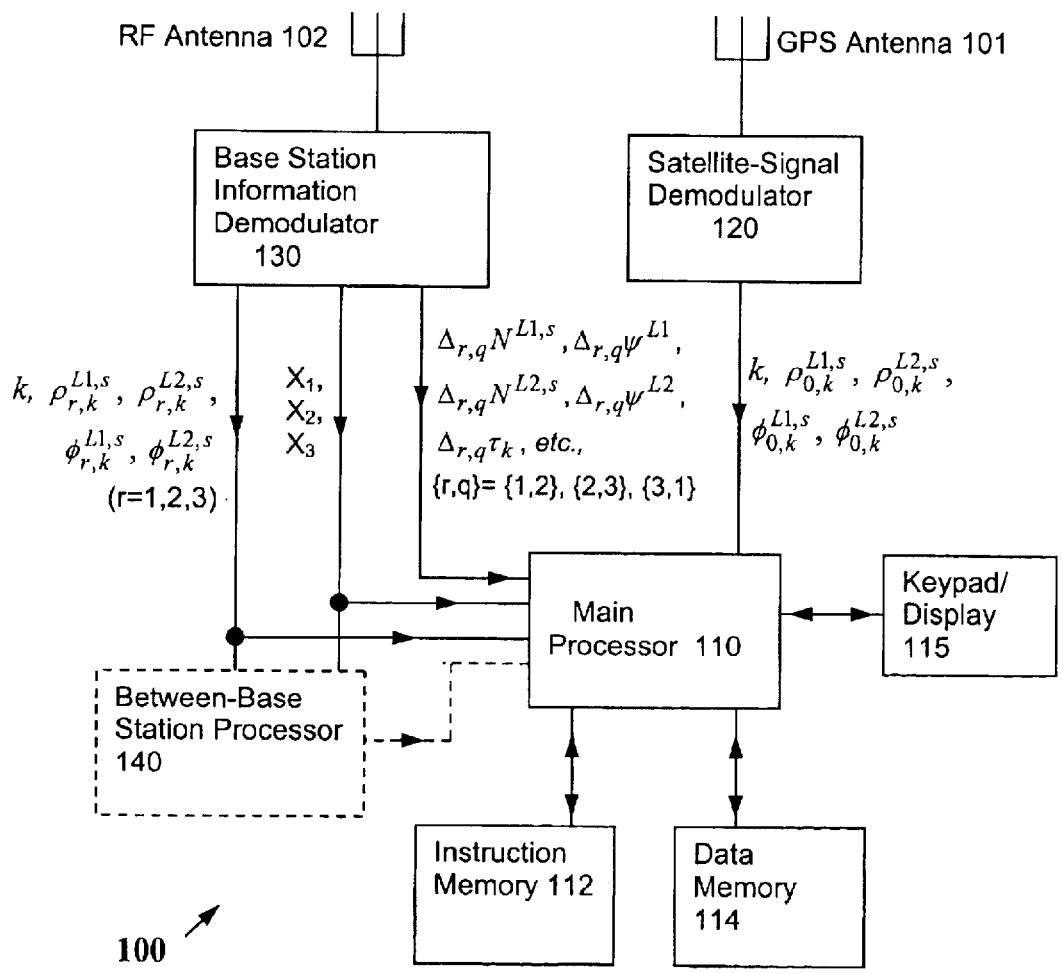
FIG. 5 is a schematic diagram of an exemplary rover station according to the present invention.
Figure 6:
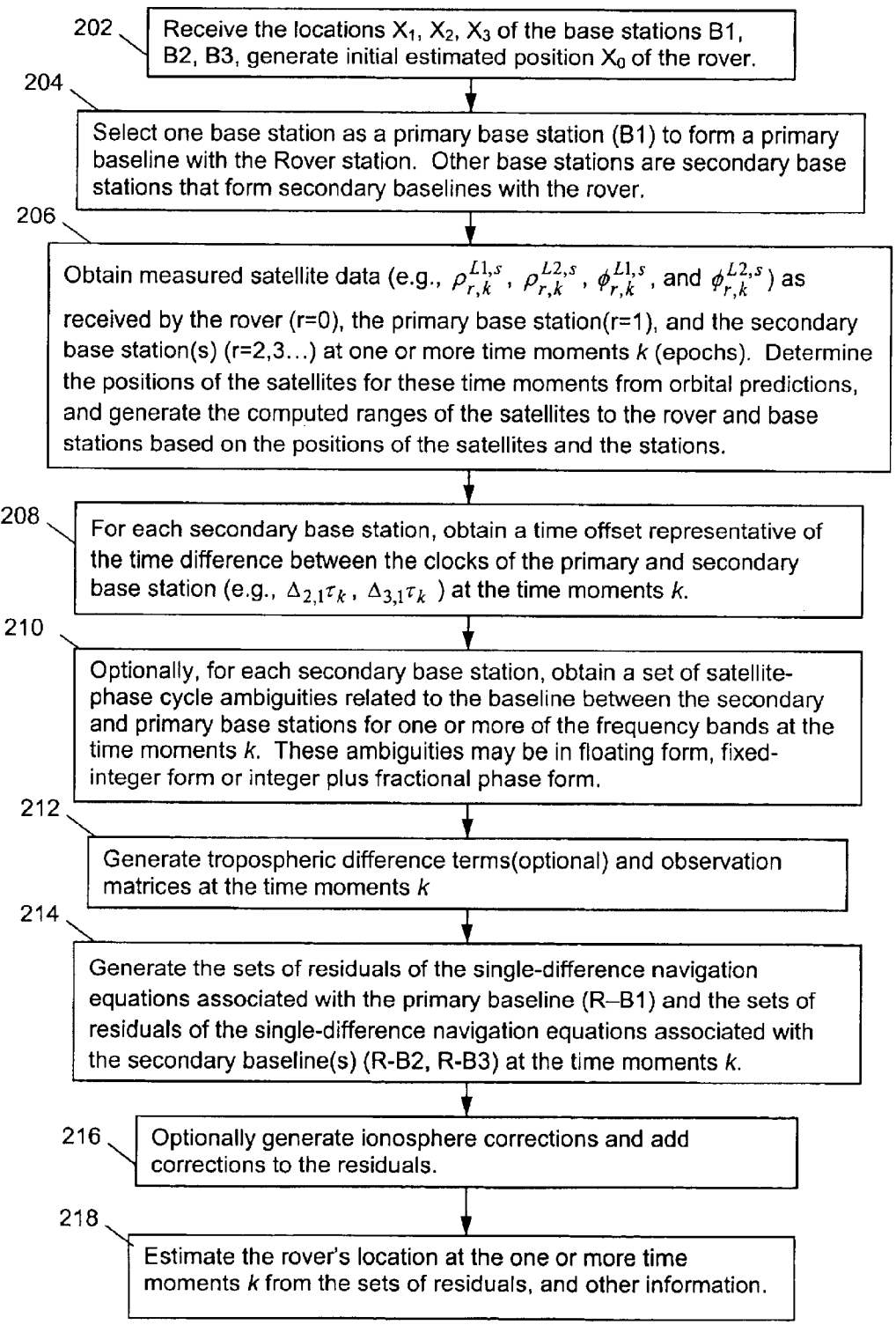
FIG. 6 is a general flow diagram of embodiments of the present invention.

Having thus described three general groups of embodiments, we now describe an exemplary rover station 100 in FIG. 5 that may be used to implement any of the above-described embodiments. A description of rover station 100 is provided in conjunction with a flow diagram shown in FIG. 6. Referring to FIG. 5, rover 100 comprises a GPS antenna 101 for receiving navigation satellite signals, an RF antenna 102 for receiving information from the base stations, a main processor 110, an instruction memory 112 a data memory 114 for processor 110, and a keyboard/display 115 for interfacing with a human user. Memories 112 and 114 may be separate, or different sections of the same memory bank. Rover 100 further comprises a satellite-signal demodulator 120 for generating the navigation data $\rho_{0,k}^{L1,s}$, $\rho_{0,k}^{L2,s}$, $\phi_{0,k}^{L1,s}$, and $\phi_{0,k}^{L2,s}$ for each epoch k from the signals received by GPS antenna 101, which is provided to processor 110. Rover 100 also comprises a base-station information demodulator 130 that receives information signals from the base stations by way of RF antenna 102. Demodulators 120 and 130 may be of any conventional design. The information received by demodulator 130 includes the positions ($X_1$, $X_2$, $X_3$) of the base stations, the satellite-navigational data (e.g., k, $\rho_{r,k}^{L1,s}$, $\rho_{r,k}^{L2,s}$, $\phi_{r,k}^{L1,s}$, and $\phi_{r,k}^{L2,s}$, r=1,2,3) received by each base station at each epoch k, and the between-base station unknowns (e.g., $\Delta_{r,q}\tau_k$, $\Delta_{r,q}N^{L1,s}$, $\Delta_{r,q}\psi^{L1}$, etc., {r,q}={1,2},{2,3},{3,1}). Each set of information may be transmitted on a respective frequency channel. The between-base station unknowns may be generated by the first base station B1, and thereafter transmitted to the rover by the first base station. The first base station may receive the satellite-navigation data from the other base stations in order to compute the between-base station unknowns. Methods of generating the between-base station unknowns are described below in greater detail in the section entitled Between Base Station Processing, Part II. As another approach, the between-base station unknowns may be generated by rover 100 locally by a between-base station processor 140, which receives the positions of the base stations and their satellite navigation data from base station information to modulator 130. Processor 140 may implement the same methods described in greater detail in the below section entitled Between Base Station Processing, Part II. In addition, processor 140 may comprise its own instruction and data memory, or may be implemented as part of main processor 110, such as by being implemented as a sub-process executed by main processor 110.

Main processor 110 may be configured to implement any of the above-described embodiments by the instructions stored in instruction memory 112. We describe implementation of these embodiments with respect to FIG. 6, where certain of the steps may be omitted when not needed by a particular embodiment. In step 202, the locations $X_1$, $X_2$, $X_3$ of the base stations B1, B2, B3 are received by base-station information modulator 130 and conveyed to main processor 110. These locations, and the location of the rover station, are measured at the phase centers of the GPS antennas. Thus, RF antenna 102 and demodulator 130 provide means for receiving the locations of the first base station and the second base station. Also in step 202, main processor 110 generates an initial estimated location for rover 100, which is relatively coarse. This may be the center of the triangle formed by the base stations, or may be derived from a conventional single-point GPS measurements (as opposed to a differential GPS measurement), or may be generated by other means. The means for performing this step is provided by main processor 110 under the direction of an instruction set stored in memory 112.

In step 204, one of the base stations is selected as a primary base station (B1) to form a primary baseline with the Rover station. The selection may be arbitrary, or may be based upon which base station is the closest to the initial estimated location of the Rover. The other base stations are secondary base stations and form secondary baselines with the rover. The means for performing this step may be provided by the human user, as prompted by main processor 100 through keypad/display 115, or may be provided directly by main processor 110 under the direction of an instruction set stored in memory 112.

In step 206, main processor 110 is provided with the measured satellite-navigation data (e.g., $\rho_{r,k}^{L1,s}$, $\rho_{r,k}^{L2,s}$, $\phi_{r,k}^{L1,s}$, and $\phi_{r,k}^{L2,s}$) as received by the rover (r=0), the primary base station (r=1), and the secondary base station(s) (r=2,3) at one or more time moments k (epochs). The data is provided by the modulators 120 (for the Rover data) and 130 (for the base station data). Although these sets of data for each epoch k may be received at slightly different times (because the base stations are at different distances from the Rover), the data sets are time-stamped with the epoch identifier (which is conventional practice), and can be stored in a synchronized queue until all the data sets for the epoch are received. Also during this step, main processor 110 determines the positions of the satellites for these time moments from orbital predictions, and generates the computed ranges of the satellites to the rover and base stations based on the positions of the satellites and the stations. The means for performing this step is provided by main processor 110 under the direction of an instruction set stored in memory 112, with the computed information being stored in data memory 114.

In step 208, for each secondary base station, Rover 100 obtains a time offset representative of the time difference between the clocks of the primary and secondary base station (e.g., $\Delta_{2,1}\tau_k$, $\Delta_{3,1}\tau_k$) at the time moments k. Rover 100 may obtain this information by directly receiving it from the primary base station B1 by way of demodulator 130, or may obtain at this information by using between-base station processor 140 to generate it, as indicated above. Either of these approaches provides the means for obtaining these time differences. As used herein, the term "obtain" encompasses both the receiving of the information from an outside source (e.g., the primary base station) and the generating of the information locally by processor 140.

The next step 210 is optional, depending upon the embodiment being implemented. In this step, rover 100 obtains, for each secondary base station, a set of satellite-phase cycle ambiguities related to the baseline between the secondary and primary base stations for one or more of the frequency bands (e.g., L1 and L2) at the time moments k. These ambiguities may be in floating form (e.g, $\Delta_{2,1}\overline{N}^{L1,s}$, $\Delta_{2,1}\overline{N}^{L2,s}$, $\Delta_{3,1}\overline{N}^{L1,s}$, $\Delta_{3,1}\overline{N}^{L2,s}$), fixed-integer form (e.g, $\Delta_{2,1}\hat{N}^{L1,s}$, $\Delta_{2,1}\hat{N}^{L2,s}$, $\Delta_{3,1}\hat{N}^{L1,s}$, $\Delta_{3,1}\hat{N}^{L2,s}$) or integer plus fractional phase form (e.g., $\Delta_{2,1}N^{L1,s}$, $\Delta_{2,1}\psi^{L1}$; $\Delta_{2,1}N^{L2,s}$, $\Delta_{2,1}\psi^{L2}$; $\Delta_{3,1}N^{L1,s}$, $\Delta_{3,1}\psi^{L1}$; $\Delta_{3,1}N^{L2,s}$, $\Delta_{3,1}\psi^{L2}$). Rover 100 may obtain this information by directly receiving it from the primary base station B1 by way of demodulator 130, or may obtain this information by using between-base station processor 140 to generate it, as indicated above. Either of these approaches provides the means for obtaining this information. As used herein, the term "obtain" encompasses both the receiving of the information from an outside source (e.g., the primary base station) and the generating the information locally with processor 140.

In step 212, which is optional depending upon the embodiment, main processor 110 generates tropospheric difference terms $\Delta_{q,r}T_k^s$ at the time moments k, which are to be used in the residuals. In the step, main processor 110 also generates the observation matrices for each time moment k. The means for performing this step is provided by main processor 110 under the direction of an instruction set stored in memory 112, with the difference terms being stored in data memory 114.

In step 214, main processor 110 generates the sets of residuals of the single-difference navigation equations (e.g., $\Delta_{1,0}B_k^{L1}$, $\Delta_{1,0}B_k^{L2}$, $\Delta_{1,0}p_k^{L1}$ and $\Delta_{1,0}p_k^{L2}$) associated with the primary baseline (R-B1) at the time moments k, and generates the sets of residuals of the single-difference navigation equations associated with the secondary baseline(s) (R-B2, R-B3) at the time moments k. The forms for generating these residuals were described above, and depend upon the embodiment being implemented. The means for generating the residuals is provided by main processor 110 under the direction of an instruction set stored in memory 112, with the residuals being stored in data memory 114.

As an optional step 216, main processor 110 generates ionosphere corrections and adds these corrections to the residuals. The means for performing this step is provided by main processor 110 under the direction of an instruction set stored in memory 112, with the corrections being stored in data memory 114.

Finally, in step 218, main processor 110 estimates the rover's location at the one or more time moments k from the sets of residuals, the time offset between the clocks of the base stations, the sets of satellite-phase cycle ambiguities related to the baseline between the primary base station and the secondary base stations (optional), and an observation matrix. The estimation may be done by the previously-described methods. The means for performing this estimation step is provided by main processor 110 under the direction of an instruction set stored in memory 112, with the computed information being stored in data memory 114.

Keypad/display 115 may be used to receive an instruction from the human user to commence an estimation of the position of the Rover, and to provide an indication of the estimated position of the Rover to the user. For some applications, it may be appreciated that human interaction is not required and that the keyboard/display would be replaced by another interface component, as needed by the application.

Preferred Floating Ambiguity Resolution Process

We demonstrate the preferred floating ambiguity resolution process using forms [12']–[17'] above. It may be appreciated that the other previously-described embodiments of the present invention may also use this floating ambiguity resolution process by simply omitting forms and/or terms of forms from the process. The general view of the preferred ambiguity resolution process is to reduce the value of the following form during a series of epochs:

and $\Delta_{q,0}p_l^{*L2}\Delta_{q,0}p_k^{L2}$. We have also broken down the weighting matrices $[C_n^{L1}]^{-1}$, $[C_v^{L1}]^{-1}$, etc., as follows:

$$[C_n^{L1}]^{-1} = \begin{pmatrix} [C_{n,1}^{L1}]^{-1} & 0 & 0 \\ 0 & [C_{n,2}^{L1}]^{-1} & 0 \\ 0 & 0 & [C_{n,3}^{L1}]^{-1} \end{pmatrix},$$

$$[C_v^{L1}]^{-1} = \begin{pmatrix} [C_{v,1}^{L1}]^{-1} & 0 & 0 \\ 0 & [C_{v,2}^{L1}]^{-1} & 0 \\ 0 & 0 & [C_{v,3}^{L1}]^{-1} \end{pmatrix},$$

etc. All of the other terms used above have been previously described with the exception of covariance matrix $\bar{\sigma}_{1,0}$ and matrix D. The between station ionosphere delay, generally denoted here as $\Delta_{q,r}I_k^s$, usually follows the Gauss-Markov time model:

$$\Delta_{q,r}I_{k+1}^s - \gamma\Delta_{q,r}I_k^s = \Delta_{q,r}\epsilon_k,$$  [GM1]

where $$\gamma = \exp\left(-\frac{\tau_e}{\tau_I}\right),$$

$\tau_e$ is the time between successive epochs [sec], $\tau_1$ is the ionosphere model correlation time [see], $\Delta_{q,r}\epsilon_k$ is white noise with the zero mean value and the variance of:

$$[\sigma_{q,r}^s]^2 = (1-\gamma_1^2)[\bar{\sigma}_{q,r}^s]^2, \text{ where}$$  [GM2]

$$[\bar{\sigma}_{q,r}^s]^2 = [\alpha]^2 \cdot [\|X_r - X_q\|]^2 \cdot 10^{-12} \text{ [in dimension of m}^2\text{]},$$

where, $\alpha \in [1,5]$ is a scaling parameter depending on the solar activity. Covariance matrix $\bar{\sigma}_{1,0}$ is a diagonal matrix of all the individual values $\bar{\sigma}_{1,0}^s$, and where the inverse square $[\bar{\sigma}_{1,0}]^{-2}$ of the covariance matrix is a diagonal matrix of the $$F_\Sigma(\delta X_k, \Delta_{1,0}\tau_k, \delta_{1,0}I_k, \Delta_{1,0}\overline{N}_k) = \frac{1}{2}(\Delta_{1,0}\overline{N}_{k-1} - \Delta_{1,0}\overline{N}_k)^T D_{k-1}(\Delta_{1,0}\overline{N}_{k-1} - \Delta_{1,0}\overline{N}_k) + \qquad [31]$$

$$\frac{1}{2}\sum_{q=1}^{3}\begin{pmatrix}(A_k\delta X_k - c\Delta_{1,0}\tau_k\cdot\vec{1} + \delta_{1,0}I_k - \Delta_{q,0}b_k^{*L1})^T [C_{n,q}^{L1}]^{-1} \times \\ (A_k\delta X_k - c\Delta_{1,0}\tau_k\cdot\vec{1} + \delta_{1,0}I_k - \Delta_{q,0}b_k^{*L1})\end{pmatrix} +$$

$$\frac{1}{2}\sum_{q=1}^{3}\begin{pmatrix}(A_k\delta X_k - c\Delta_{1,0}\tau_k\cdot\vec{1} + \Lambda_{L2}^2\Lambda_{L1}^{-2}\cdot\delta_{1,0}I_k - \Delta_{q,0}b_k^{*L2})^T [C_{n,q}^{L2}]^{-1} \times \\ (A_k\delta X_k - c\Delta_{1,0}\tau_k\cdot\vec{1} + \Lambda_{L2}^2\Lambda_{L1}^{-2}\cdot\delta_{1,0}I_k - \Delta_{q,0}b_k^{*L2})\end{pmatrix} +$$

$$\frac{1}{2}\sum_{q=1}^{3}\begin{pmatrix}(\Lambda_{L1}^{-1}A_k\delta X_k - f^{L1}\Delta_{1,0}\tau_k\cdot\vec{1} - \Lambda_{L1}^{-1}\cdot\delta_{1,0}I_k + \Delta_{1,0}\overline{N}^{L1} - \Delta_{q,0}p_k^{*L1})^T [C_{v,q}^{L1}]^{-1} \times \\ (\Lambda_{L1}^{-1}A_k\delta X_k - f^{L1}\Delta_{1,0}\tau_k\cdot\vec{1} - \Lambda_{L1}^{-1}\cdot\delta_{1,0}I_k + \Delta_{1,0}\overline{N}^{L1} - \Delta_{q,0}p_k^{*L1})\end{pmatrix} +$$

$$\frac{1}{2}\sum_{q=1}^{3}\begin{pmatrix}(\Lambda_{L2}^{-1}A_k\delta X_k - f^{L2}\Delta_{1,0}\tau_k\cdot\vec{1} - \Lambda_{L2}\Lambda_{L1}^{-2}\delta_{1,0}I_k + \Delta_{1,0}\overline{N}^{L2} - \Delta_{q,0}p_k^{*L2})^T [C_{v,q}^{L2}]^{-1} \times \\ (\Lambda_{L2}^{-1}A_k\delta X_k - f^{L2}\Delta_{1,0}\tau_k\cdot\vec{1} - \Lambda_{L2}\Lambda_{L1}^{-2}\delta_{1,0}I_k + \Delta_{1,0}\overline{N}^{L2} - \Delta_{q,0}p_k^{*L2})\end{pmatrix} +$$

$$\frac{1}{2}\delta_{1,0}I_k^T[\bar{\sigma}_{1,0}]^{-2}\delta_{1,0}I_k$$

In form $F_\Sigma$, $\Delta_{1,0}\overline{N}_k$ represents the combined vector of current estimates of floating ambiguities: $\Delta_{1,0}\overline{N}_k = [\Delta_{1,0}\overline{N}^{L1}, \Delta_{1,0}\overline{N}^{L2}]$, and the following are used for the cases of q=1: $\Delta_{q,0}b_k^{*L1} = \Delta_{q,0}b_k^{L1}$, $\Delta_{q,0}b_k^{*L2} = \Delta_{q,0}b_k^{L2}$, $\Delta_{q,0}p_k^{*L1} = \Delta_{q,0}p_k^{L1}$, inverse squares $[\bar{\sigma}_{1,0}^s]^{-2}$ of the individual values $\bar{\sigma}_{1,0}^s$. Since this process is only accounting for the second order effects in the ionosphere delay differentials (rather than the full amount), the value of α is generally 2 to 3 times smaller than the value used in a single baseline ambiguity resolution process which accounts for the full amount.

In form [31], the term $\frac{1}{2}(\Delta_{1,0}\overline{N}_{k-1}-\Delta_{1,0}\overline{N}_k)^T D_{k-1}(\Delta_{1,0}\overline{N}_{k-1}-\Delta_{1,0}\overline{N}_k)$ is a cost function which effectively averages the floating ambiguities over several epochs by introducing a penalty if the set of estimated floating ambiguities $\Delta_{1,0}\overline{N}_k$ at the k-th epoch is too far different from the previous estimated set $\Delta_{1,0}\overline{N}_{k-1}$. With each successive epoch, the weighting matrix $D_{k-1}$ is generally made to be more convex. The second term of $F_\Sigma$ generates the weighted sum of the squared residuals of forms [13A'], [15A'], and [17A']. In a similar manner, the third term of $F_\Sigma$ generates the weighted sum of the squared residuals of forms [13B'], [15B'], and [17B'], the fourth term generates the weighted sum of the squared residuals of forms [13C'], [15C'], and [17C'], and the fifth term generates the weighted sum of the squared residuals of forms [13D'], [15D'], and [17D']. The residual of each of the above forms of [13'], [15'], and [17'] is the difference between the right-hand side and left-hand side of the form. The weights are defined by the corresponding inverse covariance matrices.

An exemplary estimation process for the floating ambiguities according to the present invention employs form [31] in an iterative manner. We start at the initial epoch k=0 with the weighting matrix $D_0$ set to the zero matrix, and an initial guess of floating ambiguities $\Delta_{1,0}\overline{N}_0$ equal to zero. The first term of form [31] evaluates to zero for this initial epoch. We then generate a set of values for $\delta X_k$, $\Delta_{1,0}\tau_k$, $\delta_{1,0}I_k$, $\Delta_{1,0}\overline{N}_k$ at a first epoch k=1 which moves the value of $F_\Sigma$ towards zero. This generates an initial estimate $\Delta_{1,0}\overline{N}_1$ for the floating ambiguities and the rover's position (by way of $\delta X_1$). A weighting matrix $D_1$ for the ambiguities is then generated, and a new set of values is generated for $\delta X_k$, $\Delta_{1,0}\tau_k$, $\delta_{1,0}I_k$, $\Delta_{1,0}\overline{N}_k$ at the next epoch k=2 which moves the value of $F_\Sigma$ (k=2) towards zero. As a result, subsequent estimates $\Delta_{1,0}\overline{N}_2$ and $\delta X_2$ are generated. This iteration process continues, with $\Delta_{1,0}\overline{N}_k$ and $\delta X_k$ generally improving in accuracy as the iterations progress.

Generating the values of $\delta X_k$, $\Delta_{1,0}\tau_k$, $\delta_{1,0}I_k$, $\Delta_{1,0}\overline{N}_k$ to minimize form [31] can be done in the following manner. Form [31] is constructed in a manner whereby each term is generally of the form: $(M \cdot Y - b)^T \cdot W \cdot (M \cdot Y - b)$, where Y is a vector of unknowns (e.g., some or all of $\delta X_k$, $\Delta_{1,0}\tau_k$, $\delta_{1,0}I_k$, $\Delta_{1,0}\overline{N}_k$), M is a matrix of constants which multiply the unknowns (e.g., $A_k$, c), b is a vector of known values (e.g., $\Delta_{q,0}b_k^{*L1}$, $\Delta_{q,0}b_k^{*L2}$), and W is a weighting matrix (e.g., $D_k$, $[C_n^{L1}]^{-1}$). The term $(M \cdot Y - b)^T \cdot W \cdot (M \cdot Y - b)$ can be reduced in value towards zero by generating a vector Y which satisfies the relationship $(M^T \cdot W \cdot M) \cdot Y = M^T \cdot W \cdot b$, which we can simplify as $H \cdot Y = B$. If H is not singular, we may apply an LU-decomposition method on H to find Y. The contributions of the six terms of form [31] may be synthesized according to the following form:

$$\begin{bmatrix} H_{00,k} & h_{10,k}^T & H_{20,k}^T & H_{30,k}^T \\ h_{10,k} & h_{11,k}^T & h_{21,k}^T & h_{31,k}^T \\ H_{20,k} & h_{21,k}^T & H_{22,k}^T & H_{32,k}^T \\ h_{30,k} & h_{31,k}^T & H_{32,k}^T & H_{33,k}^T \end{bmatrix} \begin{bmatrix} \delta X_k \\ \Delta_{1,0}\tau_k \\ \delta_{1,0}I_k \\ \Delta_{1,0}\overline{N}_k \end{bmatrix} = \begin{bmatrix} B_{0,k} \\ B_{1,k} \\ B_{2,k} \\ B_{3,k} \end{bmatrix} \quad [32]$$

where $H_{00}$ is a 3-by-3 matrix with the following form:

$$H_{00,k} = \sum_{q=1}^{3} \begin{pmatrix} A_k^T [C_{n,q}^{L1}]^{-1} A_k + A_k^T [C_{n,q}^{L2}]^{-1} A_k + \\ A_k^T \Lambda_{L1}^{-1} [C_{v,q}^{L1}]^{-1} \Lambda_{L1}^{-1} A_k + A_k^T \Lambda_{L2}^{-1} [C_{v,q}^{L2}]^{-1} \Lambda_{L2}^{-1} A_k \end{pmatrix}$$

where $H_{10}$ is a 1-by-3 row vector with the following form:

$$h_{10,k} = \sum_{q=1}^{3} \begin{pmatrix} -c \cdot \vec{1}^T \cdot [C_{n,q}^{L1}]^{-1} A_k - c \cdot \vec{1}^T \cdot [C_{n,q}^{L2}]^{-1} A_k \\ -f_{L1}^T \cdot [C_{v,q}^{L1}]^{-1} \Lambda_{L1}^{-1} A_k - f_{L2}^T \cdot [C_{v,q}^{L2}]^{-1} \Lambda_{L2}^{-1} A_k \end{pmatrix}$$

where $H_{20}$ is an N-by-3 matrix with the following form:

$$H_{20,k} = \sum_{q=1}^{3} \begin{pmatrix} [C_{n,q}^{L1}]^{-1} A_k + \Lambda_{L2}^2 \Lambda_{L1}^{-2} [C_{n,q}^{L2}]^{-1} A_k - \\ \Lambda_{L1}^{-1} [C_{v,q}^{L1}]^{-1} \Lambda_{L1}^{-1} A_k - \Lambda_{L2} \Lambda_{L1}^{-2} [C_{v,q}^{L2}]^{-1} \Lambda_{L2}^{-1} A_k \end{pmatrix}$$

where $H_{30}$ is a 2N-by-3 matrix with the following form:

$$H_{30,k} = \begin{pmatrix} \sum_{q=1}^{3} ([C_{v,q}^{L1}]^{-1} \Lambda_{L1}^{-1} A_k) \\ \hline \sum_{q=1}^{3} ([C_{v,q}^{L2}]^{-1} \Lambda_{L2}^{-1} A_k) \end{pmatrix}$$

where $h_{11}$ is a 1-by-1 matrix with the following form:

$$h_{11,k} = \sum_{q=1}^{3} \begin{pmatrix} c^2 \cdot \vec{1}^T \cdot [C_{n,q}^{L1}]^{-1} \cdot \vec{1} + c^2 \cdot \vec{1}^T \cdot [C_{n,q}^{L2}]^{-1} \cdot \vec{1} + \\ f_{L1}^T \cdot [C_{v,q}^{L1}]^{-1} \cdot f_{L1} + f_{L2}^T \cdot [C_{v,q}^{L2}]^{-1} \cdot f_{L2} \end{pmatrix},$$

where $h_{21}$ is an N-by-3 matrix with the following form:

$$h_{21,k} = \sum_{q=1}^{3} \begin{pmatrix} -c \cdot [C_{n,q}^{L1}]^{-1} \cdot \vec{1} - c \cdot \Lambda_{L2}^2 \Lambda_{L1}^{-2} [C_{n,q}^{L2}]^{-1} \cdot \vec{1} + \\ \Lambda_{L1}^{-1} [C_{v,q}^{L1}]^{-1} \cdot f_{L1} + \Lambda_{L2} \Lambda_{L1}^{-2} [C_{v,q}^{L2}]^{-1} \cdot f_{L2} \end{pmatrix},$$

where $h_{31}$ is a 2N-by-1 column vector with the following form:

$$h_{31,k} = \begin{pmatrix} \sum_{q=1}^{3} (-[C_{v,q}^{L1}]^{-1} f_{L1}) \\ \hline \sum_{q=1}^{3} (-[C_{v,q}^{L2}]^{-1} f_{L2}) \end{pmatrix}$$

where $H_{22}$ is an N-by-N matrix with the following form:

$$H_{22,k} = \sum_{q=1}^{3} \begin{pmatrix} [C_{n,q}^{L1}]^{-1} + \Lambda_{L2}^2 \Lambda_{L1}^{-2} [C_{n,q}^{L2}]^{-1} \Lambda_{L2}^2 \Lambda_{L1}^{-2} + \\ \Lambda_{L1}^{-1} [C_{v,q}^{L1}]^{-1} \Lambda_{L1}^{-1} + \Lambda_{L2} \Lambda_{L1}^{-2} [C_{v,q}^{L2}]^{-1} \Lambda_{L2}^{-1} \Lambda_{L1}^{-2} \end{pmatrix} + [\sigma_{1,0}]^{-2}$$

where $H_{32}$ is a 2N-by-N matrix with the following form:

$$H_{32,k} = \begin{pmatrix} \sum_{q=1}^{3}(-[C_{v,q}^{L1}]^{-1}\Lambda_{L1}^{-1}) \\ \sum_{q=1}^{3}(-[C_{v,q}^{L2}]^{-1}\Lambda_{L2}\Lambda_{L1}^{-2}) \end{pmatrix}$$

where $H_{33}$ is a 2N-by-2N matrix with the following form:

$$H_{33,k} = \begin{pmatrix} \sum_{q=1}^{3}[C_{v,q}^{L1}]^{-1} & 0_{N\times N} \\ 0_{N\times N} & \sum_{q=1}^{3}[C_{v,q}^{L2}]^{-1} \end{pmatrix} + D_{k-1}$$

where $B_{0,k}$ is a 3-by-1 column vector with the forms:

$$B_{0,k} = \sum_{q=1}^{3}\begin{pmatrix} A_k^T[C_{n,q}^{L1}]^{-1}\Delta_{q,0}b_k^{*L1} + A_k^T[C_{n,q}^{L2}]^{-1}\Delta_{q,0}b_k^{*L2} + \\ A_k^T\Lambda_{L1}^{-1}[C_{v,q}^{L1}]^{-1}\Delta_{q,0}p_k^{*L1} + A_k^T\Lambda_{L2}^{-1}[C_{v,q}^{L2}]^{-1}\Delta_{q,0}p_k^{*L2} \end{pmatrix}$$

where $B_{1,k}$ is a single value with the forms:

$$B_{1,k} = \sum_{q=1}^{3}\begin{pmatrix} -c\cdot\vec{1}^T\cdot[C_{n,q}^{L1}]^{-1}\Delta_{q,0}b_k^{*L1} - c\cdot\vec{1}^T\cdot[C_{n,q}^{L2}]^{-1}\Delta_{q,0}b_k^{*L2} \\ -f_{L1}^T\cdot[C_{v,q}^{L1}]^{-1}\Delta_{q,0}p_k^{*L1} - f_{L2}^T\cdot[C_{v,q}^{L2}]^{-1}\Delta_{q,0}p_k^{*L2} \end{pmatrix}$$

where $B_{2,k}$ is an N-by-1 column vector with the forms:

$$B_{2,k} = \sum_{q=1}^{3}\begin{pmatrix} [C_{n,q}^{L1}]^{-1}\Delta_{q,0}b_k^{*L1} + \Lambda_{L2}^2\Lambda_{L1}^{-2}[C_{n,q}^{L2}]^{-1}\Delta_{q,0}b_k^{*L2} - \\ \Lambda_{L1}^{-1}[C_{v,q}^{L1}]^{-1}\Delta_{q,0}p_k^{*L1} - \Lambda_{L2}\Lambda_{L1}^{-2}[C_{v,q}^{L2}]^{-1}\Delta_{q,0}p_k^{*L2} \end{pmatrix}$$

and where $B_{3,k}$ is a 2N-by-1 column vector with the form:

$$B_{3,k} = \begin{pmatrix} \sum_{q=1}^{3}([C_{v,q}^{L1}]^{-1}\Delta_{q,0}p_k^{*L1}) \\ \sum_{q=1}^{3}([C_{v,q}^{L2}]^{-1}\Delta_{q,0}p_k^{*L2}) \end{pmatrix} + D_{k-1}\Delta_{1,0}\overline{N}_{k-1}.$$

The matrix $H_k$ of form [32] is symmetric, and can be decomposed by a Cholesky factorization process into the form:

$$H_k = L_k L_k^T, \text{ where } L_k = \begin{bmatrix} L_{00,k} & 0 & 0 & 0 \\ l_{10,k} & l_{11,k} & 0 & 0 \\ L_{20,k} & l_{21,k} & L_{22,k} & 0 \\ L_{30,k} & l_{31,k} & L_{32,k} & L_{33,k} \end{bmatrix}.$$  [33]

Then, the unknown vector $$\begin{bmatrix} \delta X_k \\ \Delta_{1,0}\tau_k \\ \delta_{1,0}I_k \\ \Delta_{1,0}\overline{N}_k \end{bmatrix}$$

can be generated by a conventional forward and backward substitution processes by generating an intermediate matrix $\tilde{Y}$ from the form $L_k \tilde{Y} = B_k$, and then generating matrix $Y_k$ from $L_k^T Y_k = \tilde{Y}$, where $$B_k = \begin{bmatrix} B_{0,k} \\ B_{1,k} \\ B_{2,k} \\ B_{3,k} \end{bmatrix}.$$

This generates an updated set of floating ambiguities and updated rover position. Next, matrix $D_k$ for the next iteration is generated as follows: $D_k = L_{33,k} L_{33}^T{}_k$. The next iteration is then started by generating a new matrix H based on another epoch of data, and thereafter reiterating the above steps. While the epochs of data are generally processed in sequential time order, that is not a requirement of the present invention. In a post-processing situation, the epochs may be processed in any order. It can be shown that the matrix $D_k = L_{33,k} L_{33}^T{}_k$ is mathematically equivalent to the following form:

$$D_k = H_{33,k} - (H_{30,k} \mid h_{31,k} \mid H_{32,k}) \tag{34}$$

$$\begin{pmatrix} H_{00,k} & h_{10,k}^T & H_{20,k}^T \\ h_{10,k} & h_{11,k} & h_{21,k}^T \\ H_{20,k} & h_{21,k} & H_{22,k} \end{pmatrix}^{-1} \begin{pmatrix} H_{30,k}^T \\ h_{31,k}^T \\ H_{32,k}^T \end{pmatrix}.$$

Matrix $D_k$ is the matrix of the second partial derivatives of the cost function $F_\Sigma(\delta X_k, \Delta_{1,0}\tau_k, \delta_{1,0}I_k, \Delta_{1,0}\overline{N}_k)$ partially minimized with respect to the variables $\delta X_k, \Delta_{1,0}\tau_k, \delta_{1,0}I_k$:

$$D_k = \frac{\partial^2}{\partial[\Delta_{1,0}\overline{N}_k]^2}\overline{F}_\Sigma(\Delta 1, 0\overline{N}_k), \tag{35}$$

where $\overline{F}_\Sigma(\Delta_{1,0}\overline{N}_k) = \min_{\delta X_k, \Delta_{1,0}\tau_k, \delta_{1,0}I_k} F_\Sigma(\delta X_k, \Delta_{1,0}\tau_k, \delta_{1,0}I_k, \Delta_{1,0}\overline{N}_k).$ [36]

The above process of generating the values of $\delta X_k, \Delta_{1,0}\tau_k, \delta_{1,0}I_k$, and $\Delta_{1,0}\overline{N}_k$ which minimizes the cost function $F_\Sigma(\delta X_k, \Delta_{1,0}\tau_k, \delta_{1,0}I_k, \Delta_{1,0}\overline{N}_k)$ generates an estimate for the position of Rover as $X_0 = (\overline{X}_0 + \delta X_k)$, which has an accuracy which is acceptable for many applications. Higher accuracy generally results if we generate a set of fixed-integer ambiguities $\Delta_{1,0}\hat{N}_k$ from the floating ambiguities $\Delta_{1,0}\overline{N}_k$, and generate an estimate of the rover position from the fixed-integer ambiguities. Examples of this are described in the next section.

The means for performing the above steps in rover 100 are provided by main processor 110 under the direction of instruction sets stored in memory 112, with the various computed data being stored in data memory 114.

Fixed-integer Ambiguity Resolution

Having at hand the estimation of the floating ambiguities $\Delta_{1,0}\overline{N}_k$, we describe an inventive method of generating the fixed-integer ambiguities $$\Delta_{1,0}\hat{N}_k = \begin{pmatrix} \Delta_{1,0}\hat{N}_{L1,k} \\ \Delta_{1,0}\hat{N}_{L2,k} \end{pmatrix},$$

which may be used alone or in combination with the processes described above. The components of the vector $\Delta_{1,0}\hat{N}_{L1,k}$ have the same fractional part $\Delta\psi^{L1}$, and the components of vector $\Delta_{1,0}\hat{N}_{L2,k}$ have the same fractional part $\Delta\psi^{L2}$. Having at hand the matrix $D_k$ and the vector $\Delta_{1,0}\overline{N}_k$, the embodiment forms the following cost function form:

$$F(\Delta_{1,0}\hat{N}_k) = \tfrac{1}{2}(\Delta_{1,0}\overline{N}_k - \Delta_{1,0}\hat{N}_k)^T D_k (\Delta_{1,0}\overline{N}_k - \Delta_{1,0}\hat{N}_k) \quad [37]$$

The embodiment generates the values of $\Delta_{1,0}\hat{N}_k$ which minimize the value of $F(\Delta_{1,0}\hat{N}_k)$ subject to the conditions:

$$\Delta_{1,0}\hat{N}_{L1,k} \in Z^{n_k} + \Delta\psi^{L1} \cdot \vec{1} \text{ for some } \Delta\psi^{L1}, \text{ and}$$

$$\Delta_{1,0}\hat{N}_{L2,k} \in Z^{n_k} + \Delta\psi^{L2} \cdot \vec{1} \text{ for some } \Delta\psi^{L2},$$

where $Z^{n_k}$ denotes the domain of integer valued vectors (vectors having only integer components). To generate the values of $\Delta_{1,0}\hat{N}_k$, two reference satellites $\hat{s}^{L1}$ and $\hat{s}^{L2}$ are selected for the first and the second frequency bands. A between-satellite double difference matrix $\Sigma$ is then generated, and will be applied to matrix $\Delta_{1,0}\overline{N}_k$. Matrix $\Sigma$ comprises a 2N-by-2N identity matrix, but with the columns associated with satellites $\hat{s}^{L1}$ and $\hat{s}^{L2}$ being modified, as shown below:

$$\Sigma = \begin{pmatrix} \begin{matrix} 1 & 0 & -1 & \ldots & 0 \\ 0 & 1 & -1 & \ldots & 0 \\ 0 & 0 & 1 & \ldots & 0 \\ \vdots & \vdots & \vdots & \ddots & \vdots \\ 0 & 0 & -1 & \ldots & 1 \end{matrix} & 0 \\ \hline 0 & \begin{matrix} 1 & 0 & -1 & \ldots & 0 \\ 0 & 1 & -1 & \ldots & 0 \\ 0 & 0 & 1 & \ldots & 0 \\ \vdots & \vdots & \vdots & \ddots & \vdots \\ 0 & 0 & -1 & \ldots & 1 \end{matrix} \end{pmatrix}$$
$\uparrow \hat{s}^{L1} \qquad \uparrow \hat{s}^{L2}$ The columns are modified by substituting a value of $-1$ for each column element that would normally be zero in the identity matrix. The positions of columns of matrix $\Sigma$ which are associated with satellites $\hat{s}^1$ and $\hat{s}^2$ correspond to the row positions of these satellites in the vector $\Delta_{1,0}\overline{N}_k$. When matrix $\Sigma$ is multiplied onto vector $\Delta_{1,0}\overline{N}_k$, the floating ambiguities corresponding to satellites $\hat{s}^{L1}$ and $\hat{s}^{L2}$ remain unchanged, but the floating ambiguity associated with $\hat{s}^{L1}$ is subtracted from the other floating ambiguities in the L1-band, and the floating ambiguity associated with $\hat{s}^{L2}$ is subtracted from the other floating ambiguities in the L2-band. Next, a permutation matrix $\Pi$ is generated, and is applied to matrix $\Sigma$ to generate a matrix product $\Pi\cdot\Sigma$. The permutation matrix is constructed to move the $\hat{s}^1$ and $\hat{s}^2$ columns of matrix $\Sigma$ to the first and second column positions of the matrix product $\Pi\cdot\Sigma$. The construction of permutation matrices is well known to the field of mathematics. A permutation matrix satisfies the following relationships:

$\Pi^T \cdot \Pi = \Pi \cdot \Pi^T = I$. Next, a change of variables for the cost function F is undertaken as follows:

$$\overline{M}_k = \Pi \cdot \Sigma \cdot \Delta_{1,0}\overline{N}_k,$$

$$\hat{M}_k = \Pi \cdot \Sigma \cdot \Delta_{1,0}\hat{N}_k,$$

$$G_k = \Pi \cdot [\Sigma^{-1}]^T \cdot D_k \Sigma^{-1} \cdot \Pi^T, \quad [38]$$

and the cost function can be formed as:

$$F(\hat{M}_k) = \tfrac{1}{2}(\overline{M}_k - \hat{M}_k)^T G_k (\overline{M}_k - \hat{M}_k). \quad [39]$$

The first two components of $\hat{M}_k$ are real valued components (floating point numbers) and the remaining 2N-2 components are integers. Let us divide the matrix $G_k$ into appropriate blocks in accordance with division of the vectors $$\hat{M}_k = \begin{pmatrix} \hat{M}_{1,k} \\ \hline \hat{M}_{2,k} \end{pmatrix}$$

and $$M_k = \begin{pmatrix} \overline{M}_{1,k} \\ \hline \overline{M}_{2,k} \end{pmatrix};$$

$$G_k = \begin{pmatrix} G_{11,k} & G_{21,k}^T \\ \hline G_{21,k} & G_{22,k} \end{pmatrix},$$

where $G_{11,k}$ is a 2-by-2 matrix, $G_{21,k}$ is a 2-by-(2N-2) matrix, and where $G_{22,k}$ is a (2N-2)-by-(2N-2) matrix. This partitioning enables us to use a two step process of minimizing $F(\hat{M}_k) = \tfrac{1}{2}(\overline{M}_k - \hat{M}_k)^T G_k (\overline{M}_k - \hat{M}_k)$ by first generating values of $\hat{M}_{1,k}$ that reduce the value of $F(\hat{M}_k)$, and thereafter generating values of $\hat{M}_{2,k}$ that further reduce the value of $F(\hat{M}_k)$. We notate this two step process as:

$$\min_{\hat{M}_k}\left\{\tfrac{1}{2}(\overline{M}_k - \hat{M}_k)^T G_k (\overline{M}_k - \hat{M}_k)\right\} = \quad [40]$$

$$\min_{\hat{M}_{2,k}} \min_{\hat{M}_{1,k}} \left\{ \begin{array}{l} \tfrac{1}{2}(\overline{M}_{1,k} - \hat{M}_{1,k})^T G_{11,k}(\overline{M}_{1,k} - \hat{M}_{1,k}) + \\ (\overline{M}_{2,k} - \hat{M}_{2,k})^T G_{21,k}(\overline{M}_{1,k} - \hat{M}_{1,k}) + \\ \tfrac{1}{2}(\overline{M}_{2,k} - \hat{M}_{2,k})^T G_{22,k}(\overline{M}_{2,k} - \hat{M}_{2,k}) \end{array} \right\}$$

The first step (inner minimization) of generating $\hat{M}_{1,k}$ to reduce $F(\hat{M}_k)$ is performed in the space of floating point numbers (real valued space), and generates $\hat{M}_{1,k}$ in a form equivalent to:

$$\hat{M}_{1,k} = \overline{M}_{1,k} + [G_{11,k}]^{-1}[G_{21,k}]^T(\overline{M}_{2,k} - \hat{M}_{2,k}) \quad [41]$$

the second step (outer minimization) of generating $\hat{M}_{2,k}$ is performed by substituting the form [41] of $\hat{M}_{1,k}$ into form [46] to generate the following modified version thereof:

$$\tfrac{1}{2}(\overline{M}_{2,k} - \hat{M}_{2,k})^T [G_{22,k} - G_{21,k}[G_{11,k}]^{-1}[G_{21,k}]^T](\overline{M}_{2,k} - \hat{M}_{2,k}) \quad [42]$$

Then, a search of an integer subspace for values of $\hat{M}_{2,k}$ is performed to find a set of integers which provides the smallest value of the modified form [42]. The integer subspace can be relatively small, and centered about the floating point values of $\overline{M}_{2,k}$. After the integer search of form [42] is performed, the result $\hat{M}_{2,k}$ is substituted into form

[41] to generate a revised vector $\hat{M}_{1,k}$. Then, the change of variables operation (form [38]) is reversed as follows to generate the fixed-integer ambiguities $\Delta_{1,0}\hat{N}_k$ as:

$$\Delta_{1,0}\hat{N}_k = \Sigma^{-1} \cdot \Pi^T \cdot \hat{M}_k \qquad [43]$$

$\Delta_{1,0}\hat{N}_k$ may then be separated into its components $\Delta_{1,0}\hat{N}_k^{L1}$ and $\Delta_{1,0}\hat{N}_k^{L2}$.

As an option, an ambiguity resolution validation procedure may be performed to check for consistency in the ambiguity resolution. This procedure is conventional, and the reader is referred to prior art literature for a description thereof.

Having resolved the fixed-integer ambiguities, we can now generate a further refined estimate of the other solvable unknowns: $\delta X_k$, $\Delta_{1,0}\tau_k$, $\delta_{1,0}I_k$. A third cost function is formed as follows:

$$F_3(\delta X_k, \Delta_{1,0}\tau_k, \delta_{1,0}I_k) = +\frac{1}{2}\sum_{q=1}^{3}\left(\begin{array}{l}\left(A_k\delta X_k - c\Delta_{1,0}\tau_k \cdot \vec{1} + \delta_{1,0}I_k - \Delta_{q,0}b_k^{*L1}\right)^T [C_{n,q}^{L1}]^{-1} \times \\ \left(A_k\delta X_k - c\Delta_{1,0}\tau_k \cdot \vec{1} + \delta_{1,0}I_k - \Delta_{q,0}b_k^{*L1}\right)\end{array}\right) + \qquad [44]$$

$$\frac{1}{2}\sum_{q=1}^{3}\left(\begin{array}{l}\left(A_k\delta X_k - c\Delta_{1,0}\tau_k \cdot \vec{1} + \Lambda_{L2}^2\Lambda_{L1}^{-2}\cdot\delta_{1,0}I_k - \Delta_{q,0}b_k^{*L2}\right)^T [C_{n,q}^{L2}]^{-1} \times \\ \left(A_k\delta X_k - c\Delta_{1,0}\tau_k \cdot \vec{1} + \Lambda_{L2}^2\Lambda_{L1}^{-2}\cdot\delta_{1,0}I_k - \Delta_{q,0}b_k^{*L2}\right)\end{array}\right) +$$

$$\frac{1}{2}\sum_{q=1}^{3}\left(\begin{array}{l}\left(\Lambda_{L1}^{-1}A_k\delta X_k - f^{L1}\Delta_{1,0}\tau_k \cdot \vec{1} - \Lambda_{L1}^{-1}\cdot\delta_{1,0}I_k + \Delta_{1,0}\hat{N}^{L1} - \Delta_{q,0}p_k^{*L1}\right)^T [C_{v,q}^{L1}]^{-1} \times \\ \left(\Lambda_{L1}^{-1}A_k\delta X_k - f^{L1}\Delta_{1,0}\tau_k \cdot \vec{1} - \Lambda_{L1}^{-1}\cdot\delta_{1,0}I_k + \Delta_{1,0}\hat{N}^{L1} - \Delta_{q,0}p_k^{*L1}\right)\end{array}\right) +$$

$$\frac{1}{2}\sum_{q=1}^{3}\left(\begin{array}{l}\left(\Lambda_{L2}^{-1}A_k\delta X_k - f^{L2}\Delta_{1,0}\tau_k \cdot \vec{1} - \Lambda_{L2}\Lambda_{L1}^{-2}\cdot\delta_{1,0}I_k + \Delta_{1,0}\hat{N}^{L2} - \Delta_{q,0}p_k^{*L2}\right)^T [C_{v,q}^{L2}]^{-1} \times \\ \left(\Lambda_{L2}^{-1}A_k\delta X_k - f^{L2}\Delta_{1,0}\tau_k \cdot \vec{1} - \Lambda_{L2}\Lambda_{L1}^{-2}\cdot\delta_{1,0}I_k + \Delta_{1,0}\hat{N}^{L2} - \Delta_{q,0}p_k^{*L2}\right)\end{array}\right) +$$

$$\frac{1}{2}\delta_{1,0}I_k^T[\sigma_{1,0}]^{-2}\delta_{1,0}I_k$$

where the five terms of the form are the same as the second through sixth terms of form [31], except that floating ambiguities have been replaced by the fixed-integer ambiguities. The same estimation procedures used on form [31] may be applied above to form [44], except that only one iteration is needed, and matrix D is not generated.

The means for performing the above steps in rover 110 are provided by main processor 110 under the direction of instruction sets stored in memory 112, with the various computed data being stored in data memory 114.

If lower accuracy can be tolerated, we may apply the process on form [44] using the floating point ambiguities rather than the fixed-integer ambiguities. In this case, the above fixed-integer ambiguity resolution process may be omitted.

Between Base Station Processing, Part II

In the above embodiments, the data of forms [6] and/or [7] were provided to the rover station. However, because several of the rover-to-base station processes described above are more efficient than those in the prior art, it is possible for the rover itself to undertake the task of generating some or all of forms [6] and [7] at the rover location, in real-time, from phase and pseudo-range measurements conveyed from the base stations to the rover. This information may be conveyed by radio-signals from the base stations to the rover, as described above. One may also implement a system whereby the base stations convey their information to a relay station by cable (such as the internet), with the relay station positioned within a few kilometers of the rover station. The relay station then relays the base station data to the rover by radio-signals.

In these embodiments, the rover receives the following data from each base station "r" (r=1, 2, 3) for several epochs "k": $\rho_{r,k}^{L1,s}$, $\rho_{r,k}^{L2,s}$, $\phi_{r,k}^{L1,s}$, and $\phi_{r,k}^{L2,s}$. The locations of the base stations are also obtained: $X_1$, $X_2$, and $X_3$. As indicated previously, the locations of the satellites are highly predictable and can readily be determined by the rover with its clock and correction data from the almanac data transmitted by the satellites. From this, the rover generates the computed ranges $R_{r,k}^s$ from each rover "r" to each satellite "s" of a group of satellites being tracked. As before, the troposphere delay terms are estimated from the Goad-Goodman model.

With this information, the residuals (difference quantities) $\Delta_{q,r}b_k^{L1,s}$, $\Delta_{q,r}b_k^{L2,s}$, $\Delta_{q,r}p_k^{L1,s}$, and $\Delta_{q,r}p_k^{L2,s}$ of forms [4A–4D] are generated for each baseline (q, r), where (q, r) has the following pairings (B2, B1), (B3, B1), and (B2, B3). For each baseline, the solvable unknowns in forms [5A–5D] are $\Delta_{q,r}\tau_k$, $\Delta_{q,r}I_k$, and $\Delta_{q,r}\overline{N}_k$. Values are estimated from the residuals in a manner similar to that described above for the primary baseline between the Rover and first base station. As an example, a cost function F(*) may be formed as follows:

$$F(\Delta_{q,r}\tau_k, \Delta_{q,r}I_k, \Delta_{q,r}\overline{N}_k) = \qquad [45]$$

$$\frac{1}{2}(\Delta_{q,r}\overline{N}_{k-1} - \Delta_{q,r}\overline{N}_k)^T D_{k-1}(\Delta_{q,r}\overline{N}_{k-1} - \Delta_{q,r}\overline{N}_k) + \frac{1}{2}\left(\begin{array}{l}\left(-c\Delta_{q,r}\tau_k \cdot \vec{1} + \Delta_{q,r}I_k - \Delta_{q,r}b_k^{L1}\right)^T [C_{n,q,r}^{L1}]^{-1} \times \\ \left(-c\Delta_{q,r}\tau_k \cdot \vec{1} + \Delta_{q,r}I_k - \Delta_{q,r}b_k^{L1}\right)\end{array}\right) +$$

-continued $$\frac{1}{2}\begin{pmatrix}\left(-c\Delta_{q,r}\tau_k\cdot\vec{1}+\Lambda_{L2}^2\Lambda_{L1}^{-2}\cdot\Delta_{q,r}I_k-\Delta_{q,r}b_k^{L2}\right)^T[C_{n,q,r}^{L2}]^{-1}\times\\ \left(-c\Delta_{q,r}\tau_k\cdot\vec{1}+\Lambda_{L2}^2\Lambda_{L1}^{-2}\cdot\Delta_{q,r}I_k-\Delta_{q,r}b_k^{L2}\right)\end{pmatrix}+$$

$$\frac{1}{2}\begin{pmatrix}\left(-f^{L1}\Delta_{q,r}\tau_k\cdot\vec{1}-\Lambda_{L1}^{-1}\cdot\Delta_{q,r}I_k+\Delta_{q,r}\overline{N}^{L1}-\Delta_{q,r}p_k^{L1}\right)^T[C_{v,q,r}^{L1}]^{-1}\times\\ \left(-f^{L1}\Delta_{q,r}\tau_k\cdot\vec{1}-\Lambda_{L1}^{-1}\cdot\delta_{q,r}I_k+\Delta_{q,r}\overline{N}^{L1}-\Delta_{q,r}p_k^{L1}\right)\end{pmatrix}+$$

$$\frac{1}{2}\begin{pmatrix}\left(-f^{L2}\Delta_{q,r}\tau_k\cdot\vec{1}-\Lambda_{L2}\Lambda_{L1}^{-2}\cdot\Delta_{q,r}I_k+\Delta_{q,r}\overline{N}^{L2}-\Delta_{q,r}p_k^{L2}\right)^T[C_{v,q,r}^{L2}]^{-1}\times\\ \left(-f^{L2}\Delta_{q,r}\tau_k\cdot\vec{1}-\Lambda_{L2}\Lambda_{L1}^{-2}\cdot\delta_{q,r}I_k+\Delta_{q,r}\overline{N}^{L2}-\Delta_{q,r}p_k^{L2}\right)\end{pmatrix}+\frac{1}{2}\Delta_{q,r}I_k^T[\overline{\sigma}_{q,r}]^{-2}\Delta_{q,r}I_k$$

wherein the covariance matrices $C_{n,q,r}^{L1}$, $C_{v,q,r}^{L1}$, $C_{n,q,r}^{L2}$, $C_{v,q,r}^{L2}$, $\overline{\sigma}_{q,r}$ are generated in a similar manner as the covariance matrices for the primary baseline.

The floating ambiguities may be estimated in an iterative manner as described above. We start at the initial epoch k=0 with the weighting matrix $D_0$ set to the zero matrix, and an initial guess of floating ambiguities $\Delta_{q,r}\overline{N}_0$ equal to zero. The first term of form [31] evaluates to zero for this initial epoch. We then generate a set of values for $\Delta_{q,r}\tau_k$, $\Delta_{q,r}I_k$, $\Delta_{q,r}\overline{N}_k$ at a first epoch k=1 which moves the value of F towards zero. This generates an initial estimate $\Delta_{q,r}\overline{N}_1$ for the floating ambiguities. A weighting matrix $D_1$ for the ambiguities is then generated, and a new set of values is generated for $\Delta_{q,r}\tau_k$, $\Delta_{q,r}I_k$, $\Delta_{q,r}\overline{N}_k$ at the next epoch k=2 which moves the value of F (k=2) towards zero. As a result, a subsequent estimate $\Delta_{q,r}\overline{N}_2$ is generated. This iteration process continues, with $\Delta_{q,r}\overline{N}_k$ generally improving in accuracy as the iterations progress. The corresponding H·Y=B form for this process (similar to form [32]) is as follows:

$$\begin{bmatrix}h_{11,k} & h_{21,k}^T & h_{31,k}^T\\ h_{21,k} & H_{22,k} & H_{32,k}^T\\ h_{31,k} & H_{32,k} & H_{33,k}\end{bmatrix}\begin{bmatrix}\Delta_{q,r}\tau_k\\ \Delta_{q,r}I_k\\ \Delta_{q,r}\overline{N}_k\end{bmatrix}=\begin{bmatrix}B_{1,k}\\ B_{2,k}\\ B_{3,k}\end{bmatrix}\quad[46]$$

where $h_{11}$ is a 1-by-1 matrix with the following form:

$$h_{11,k}=\begin{pmatrix}c^2\cdot\vec{1}^T\cdot[C_{n,q,r}^{L1}]^{-1}\cdot\vec{1}+c^2\cdot\vec{1}^T\cdot[C_{n,q,r}^{L2}]^{-1}\cdot\vec{1}+\\ f_{L1}^T\cdot[C_{v,q,r}^{L1}]^{-1}\cdot f_{L1}+f_{L2}^T\cdot[C_{v,q,r}^{L2}]^{-1}\cdot f_{L2}\end{pmatrix},$$

where $h_{21}$ is an N-by-3 matrix with the following form:

$$h_{21,k}=\begin{pmatrix}-c\cdot[C_{n,q,r}^{L1}]^{-1}\cdot\vec{1}-c\cdot\Lambda_{L2}^2\Lambda_{L1}^{-2}[C_{n,q,r}^{L2}]^{-1}\cdot\vec{1}+\\ \Lambda_{L1}^{-1}[C_{v,q,r}^{L1}]^{-1}\cdot f_{L1}+\Lambda_{L2}\Lambda_{L1}^{-2}[C_{v,q,r}^{L2}]^{-1}\cdot f_{L2}\end{pmatrix},$$

where $b_{31}$ is a 2N-by-1 column vector with the following form:

$$h_{31,k}=\begin{pmatrix}(-[C_{v,q,r}^{L1}]^{-1}f_{L1})\\ (-[C_{v,q,r}^{L2}]^{-1}f_{L2})\end{pmatrix}$$

where $H_{22}$ is an N-by-N matrix with the following form:

$$H_{22,k}=[C_{n,q,r}^{L1}]^{-1}+\Lambda_{L2}^2\Lambda_{L1}^{-2}[C_{n,q,r}^{L2}]^{-1}\Lambda_{L2}^2\Lambda_{L1}^2+$$
$$\Lambda_{L1}^{-1}[C_{v,q,r}^{L1}]^{-1}\Lambda_{L1}^{-1}+\Lambda_{L2}\Lambda_{L1}^{-2}[C_{v,q,r}^{L2}]^{-1}\Lambda_{L2}\Lambda_{L1}^{-2}+[\overline{\sigma}_{q,r}]^{-2}$$

where $H_{32}$ is a 2N-by-N matrix with the following form:

$$H_{32,k}=\begin{pmatrix}(-[C_{v,q,r}^{L1}]^{-1}\Lambda_{L1}^{-1})\\ (-[C_{v,q,r}^{L2}]^{-1}\Lambda_{L2}\Lambda_{L1}^{-2})\end{pmatrix}$$

where $H_{33}$ is a 2N-by-2N matrix with the following form:

$$H_{33,k}=\begin{pmatrix}[C_{v,q,r}^{L1}] & 0_{N\times N}\\ 0_{N\times N} & [C_{v,q,r}^{L2}]\end{pmatrix}+D_{k-1}$$

where $B_{1,k}$ is a single value with the forms:

$$B_{1,k}=\begin{pmatrix}-c\cdot\vec{1}^T\cdot[C_{n,q,r}^{L1}]^{-1}\Delta_{q,r}b_k^{L1}-c\cdot\vec{1}^T\cdot[C_{n,q,r}^{L2}]^{-1}\Delta_{q,r}b_k^{L2}-\\ f_{L1}^T\cdot[C_{v,q,r}^{L1}]^{-1}\Delta_{q,r}p_k^{L1}-f_{L2}^T\cdot[C_{v,q,r}^{L2}]^{-1}\Delta_{q,r}p_k^{L2}\end{pmatrix}$$

where $B_{2,k}$ is an N-by-1 column vector with the forms:

$$B_{2,k}=\begin{pmatrix}[C_{n,q,r}^{L1}]^{-1}\Delta_{q,r}b_k^{L1}+\Lambda_{L2}^2\Lambda_{L1}^{-2}[C_{n,q,r}^{L2}]^{-1}\Delta_{q,r}b_k^{L2}-\\ \Lambda_{L1}^{-1}[C_{v,q,r}^{L1}]^{-1}\Delta_{q,r}p_k^{L1}-\Lambda_{L2}\Lambda_{L1}^{-2}[C_{v,q,r}^{L2}]^{-1}\Delta_{q,r}p_k^{L2}\end{pmatrix}$$

and where $B_{3,k}$ is a 2N-by-1 column vector with the form:

$$B_{3,k}=\begin{pmatrix}[C_{v,q,r}^{L1}]^{-1}\Delta_{q,r}p_k^{L1}\\ [C_{v,q,r}^{L2}]^{-1}\Delta_{q,r}p_k^{L2}\end{pmatrix}+D_{k-1}\Delta_{q,r}\overline{N}_{k-1}.$$

The matrix $H_k$ of form [46] is symmetric, and can be decomposed by a Cholesky factorization process into the form:

$$H_k = L_k L_k^T, \text{ where } L_k = \begin{bmatrix} l_{11,k} & 0 & 0 \\ l_{21,k} & L_{22,k} & 0 \\ l_{31,k} & L_{32,k} & L_{33,k} \end{bmatrix}. \quad [47]$$

Then, the unknown vector $$Y = \begin{bmatrix} \Delta_{q,r}\tau_k \\ \Delta_{q,r}I_k \\ \Delta_{q,r}\overline{N}_k \end{bmatrix}$$

can be generated by a conventional forward and backward substitution processes by generating an intermediate matrix $\tilde{Y}$ from the form $L_k \tilde{Y} = B_k$, and then generating matrix $Y_k$ from $La_k^T Y_k = \tilde{Y}$, where $$B_k = \begin{bmatrix} B_{1,k} \\ B_{2,k} \\ B_{3,k} \end{bmatrix}.$$

This generates an updated set of floating ambiguities and updated rover position. Next, matrix $D_k$ for the next iteration is generated as follows: $D_k = L_{33,k} L_{33}{}^T{}_k$. The next iteration is then started by generating a new matrix H based on another epoch of data, and thereafter reiterating the above steps. While the epochs of data are generally processed in sequential time order, that is not a requirement of the present invention. In a post-processing situation, the epochs may be processed in any order. It can be shown that the matrix $D_k = L_{33,k} L_{33}{}^T{}_k$ is mathematically equivalent to the following form:

$$D_k = H_{33,k} - (h_{31,k} \; H_{32,k}) \begin{pmatrix} h_{11,k} & h_{21,k}^T \\ h_{21,k} & H_{22,k} \end{pmatrix}^{-1} \begin{pmatrix} h_{31,k}^T \\ H_{32,k}^T \end{pmatrix}. \quad [48]$$

Matrix $D_k$ is the matrix of the second partial derivatives of the cost function $F(\Delta_{q,r}\tau_k, \Delta_{q,r}I_k, \Delta_{q,r}\overline{N}_k)$ partially minimized with respect to the variables $\Delta_{q,r}\tau_k, \Delta_{q,r}I_k$:

$$D_k = \frac{\partial^2}{\partial[\Delta_{q,r}\overline{N}_k]^2} \overline{F}(\Delta_{q,r}\overline{N}_k), \quad [49]$$

where $\overline{F}(\Delta_{q,r}\overline{N}_k) = \min F(\Delta_{q,r}\tau_k, \Delta_{q,r}I_k, \Delta_{q,r}\overline{N}_k)$. [50]

$\Delta_{q,r}\tau_k, \Delta_{q,r}I_k$

The corresponding fixed-integer ambiguities $\Delta_{q,r}\hat{N}_k$ may be generated from the floating ambiguities $\Delta_{q,r}\overline{N}_k$ by the same process described above with reference to forms [37]–[43] that was used to generate the fixed-integer ambiguities associated with the primary baseline between the rover (R) and first base station (B1).

Having resolved the fixed-integer ambiguities, we can now generate a further refined estimate of the other solvable unknowns: $\Delta_{q,r}\tau_k$ and $\Delta_{q,r}I_k$. A third cost function is formed as follows:

$$F_4(\Delta_{q,r}\tau_k, \Delta_{q,r}I_k, \Delta_{q,r}\overline{N}_k) + \frac{1}{2} \begin{pmatrix} (-c\Delta_{q,r}\tau_k \cdot \vec{1} + \Delta_{q,r}I_k - \Delta_{q,r}b_k^{L1})^T [C_{n,q,r}^{L1}]^{-1} \times \\ (-c\Delta_{q,r}\tau_k \cdot \vec{1} + \Delta_{q,r}I_k - \Delta_{q,r}b_k^{L1}) \end{pmatrix} + \quad [51]$$

$$\frac{1}{2}\begin{pmatrix}(-c\Delta_{q,r}\tau_k \cdot \vec{1} + \Lambda_{L2}^2\Lambda_{L1}^{-2}\cdot\Delta_{q,r}I_k - \Delta_{q,r}b_k^{L2})^T [C_{n,q,r}^{L2}]^{-1} \times \\ (-c\Delta_{q,r}\tau_k\cdot\vec{1}+\Lambda_{L2}^2\Lambda_{L1}^{-2}\cdot\Delta_{q,r}I_k-\Delta_{q,r}b_k^{L2})\end{pmatrix} + \frac{1}{2}\begin{pmatrix}(-f^{L1}\Delta_{q,r}\tau_k\cdot\vec{1}-\Lambda_{L1}^{-1}\cdot\Delta_{q,r}I_k+\Delta_{q,r}\hat{N}^{L1}-\Delta_{q,r}p_k^{L1})^T[C_{v,q,r}^{L1}]^{-1}\times \\ (-f^{L1}\Delta_{q,r}\tau_k\cdot\vec{1}-\Lambda_{L1}^{-1}\cdot\delta_{q,r}I_k+\Delta_{q,r}\hat{N}^{L1}-\Delta_{q,r}p_k^{*L1})\end{pmatrix}+$$

$$\frac{1}{2}\begin{pmatrix}(-f^{L2}\Delta_{q,r}\tau_k\cdot\vec{1}-\Lambda_{L2}\Lambda_{L1}^{-2}\cdot\Delta_{q,r}I_k+\Delta_{q,r}\hat{N}^{L2}-\Delta_{q,r}p_k^{L2})^T[C_{v,q,r}^{L2}]^{-1}\times \\ (-f^{L2}\Delta_{q,r}\tau_k\cdot\vec{1}-\Lambda_{L2}\Lambda_{L1}^{-2}\cdot\delta_{1,0}I_k+\Delta_{q,r}\hat{N}^{L2}-\Delta_{q,r}p_k^{L2})\end{pmatrix} + \frac{1}{2}\Delta_{q,r}I_k^T[\overline{\sigma}_{q,r}]^{-2}\Delta_{q,r}I_k$$

where the five terms of the form are the same as the second through sixth terms of form [45], except that floating ambiguities have been replaced by the fixed-integer ambiguities. The same estimation procedures used on form [45] may be applied above to form [51], except that only one iteration is needed, and matrix D is not generated or used. As a result, estimates for $\Delta_{q,r}\tau_k$ and $\Delta_{q,r}I_k$ are generated. However, we prefer to perform some consistency checks on these estimates before providing them to the process that operates on the primary baseline between the rover and the first base station. Thus, we will denote these estimates with hat symbols as follows: $\Delta_{q,r}\hat{\tau}_k$ and $\Delta_{q,r}\hat{I}_k$. After the estimates associated with the three baselines (q,r)=(B2, B1), (B3, B1), (B3, B1) have been generated for the k-th epoch, we have the following data:

$\Delta_{2,1}\hat{\tau}_k, \Delta_{2,1}\hat{I}_k, \Delta_{2,1}\hat{N}_k,$
$\Delta_{3,1}\hat{\tau}_k, \Delta_{3,1}\hat{I}_k, \Delta_{3,1}\hat{N}_k,$ and
$\Delta_{3,2}\hat{\tau}_k, \Delta_{3,2}\hat{I}_k, \Delta_{3,2}\hat{N}_k.$ We first perform an ambiguity resolution closure check. In this check, the following relationships should hold:

$$\Delta_{2,1}\hat{N}_k + \Delta_{3,2}\hat{N}_k + \Delta_{1,3}\hat{N}_k = 0, \quad [52A]$$

which is equivalent to:

$$\Delta_{2,1}\hat{N}_k + \Delta_{3,2}\hat{N}_k - \Delta_{3,1}\hat{N}_k = 0. \quad [52B]$$

If the above relationships are not satisfied, the ambiguities have been resolved incorrectly for at least one baselines, and the estimations of fixed ambiguity should be neglected. To address an incorrect resolution, new data may be taken, or various subsets of data may be processed to generate sets of ambiguities which satisfy the above relationships. After all three between-base receivers' ambiguities have been resolved and the above relationships are satisfied, the ambiguity vectors $\Delta_{2,1}\hat{N}_k$, $\Delta_{3,1}\hat{N}_k$, and $\Delta_{3,2}\hat{N}_k$ are considered to be correctly fixed.

The time delays are similarly checked and corrected by taking new data or searching existing data sets. In this check, the following relationships should hold:

$$\Delta_{2,1}\hat{\tau}_k + \Delta_{3,2}\hat{\tau}_k + \Delta_{1,3}\hat{\tau}_k = 0 \text{, to within a tolerance value of } \pm\epsilon_1, \quad [53A]$$

which is equivalent to:

$$\Delta_{2,1}\hat{\tau}_k + \Delta_{3,2}\hat{\tau}_k - \Delta_{3,1}\hat{\tau}_k = 0 \text{, to within a tolerance value of } \pm\epsilon_1, \quad [53B]$$

where $\epsilon_1$ is a tolerance level which is close to zero. In general, $\epsilon_1$ depends upon the distances between baselines and the desired degree of accuracy for the system. If the above relationships hold, then we validate these delays (i.e., $\Delta_{2,1}\tau_k = \Delta_{2,1}\hat{\tau}_k$, $\Delta_{3,1}\tau_k = \Delta_{3,1}\hat{\tau}_k$, and $\Delta_{3,2}\tau_k = \Delta_{3,2}\hat{\tau}_k$).

Next, we perform a consistency check on the ionosphere delays. In the following discussion, the subscripts on the ionosphere delay differentials have sometimes been exchanged, but this is of no substantive consequence since $\Delta_{1,2}\hat{I}_k = -\Delta_{2,1}\hat{I}_k$, $\Delta_{2,3}\hat{I}_k = -\Delta_{3,2}\hat{I}_k$, and $\Delta_{1,3}\hat{I}_k = -\Delta_{3,1}\hat{I}_k$. The between-base receivers' ionosphere estimations should satisfy the relationship $$\Delta_{1,2}\hat{I}_k + \Delta_{2,3}\hat{I}_k + \Delta_{3,1}\hat{I}_k = 0 \text{, to within a tolerance value of } \pm\epsilon_2. \quad [54]$$

However, measurement noise typically prevents these relationships from being satisfied to an acceptable tolerance level $\pm\epsilon_2$. To better satisfy [54], the following quadratic function is minimized to obtain new estimations $\Delta_{1,2}\tilde{I}_k$, $\Delta_{2,3}\tilde{I}_k$, $\Delta_{3,1}\tilde{I}_k$:

$$F_1(\Delta_{1,2}\tilde{I}_k, \Delta_{2,3}\tilde{I}_k, \Delta_{3,1}\tilde{I}_k) = \quad [55]$$

$$\frac{1}{2}(\Delta_{1,2}\tilde{I}_k - \Delta_{1,2}\hat{I}_k)^T [C_{1,2}]^{-1} (\Delta_{1,2}\tilde{I}_k - \Delta_{1,2}\hat{I}_k) +$$

$$\frac{1}{2}(\Delta_{2,3}\tilde{I}_k - \Delta_{2,3}\hat{I}_k)^T [C_{2,3}]^{-1} (\Delta_{2,3}\tilde{I}_k - \Delta_{2,3}\hat{I}_k) +$$

$$\frac{1}{2}(\Delta_{3,1}\tilde{I}_k - \Delta_{3,1}\hat{I}_k)^T [C_{3,1}]^{-1} (\Delta_{3,1}\tilde{I}_k - \Delta_{3,1}\hat{I}_k) \to$$

$$\min_{\Delta_{1,2}\tilde{I}_k, \Delta_{2,3}\tilde{I}_k, \Delta_{3,1}\tilde{I}_i},$$

provided the condition of:

$$\Delta_{1,2}\tilde{I}_k + \Delta_{2,3}\tilde{I}_k + \Delta_{3,1}\tilde{I}_k = 0 \quad [56]$$

is satisfied. The ionosphere estimations covariance matrices $C_{1,2}, C_{2,3}, C_{3,1}$ are estimated in the previous process by conventional methods. The inventors have found that the following form minimizes form [55] subject to condition [56]:

$$\Delta_{1,2}\tilde{I}_k = \Delta_{1,2}\hat{I}_k - C_{1,2}[C_{1,2} + C_{2,3} + C_{3,1}]^{-1}(\Delta_{1,2}\hat{I}_k + \Delta_{2,3}\hat{I}_k + \Delta_{3,1}\hat{I}_k)$$

$$\Delta_{2,3}\tilde{I}_k = \Delta_{2,3}\hat{I}_k - C_{2,3}[C_{1,2} + C_{2,3} + C_{3,1}]^{-1}(\Delta_{1,2}\hat{I}_k + \Delta_{2,3}\hat{I}_k + \Delta_{3,1}\hat{I}_k) \quad [57]$$

$$\Delta_{3,1}\tilde{I}_k = \Delta_{3,1}\hat{I}_k - C_{3,1}[C_{1,2} + C_{2,3} + C_{3,1}]^{-1}(\Delta_{1,2}\hat{I}_k + \Delta_{2,3}\hat{I}_k + \Delta_{3,1}\hat{I}_k)$$

Before applying form [57], the vectors $\Delta_{1,2}\hat{I}_k, \Delta_{2,3}\hat{I}_k, \Delta_{3,1}\hat{I}_k$ are preferably smoothed using a Kalman filtering scheme with a dynamic model based on the above-described Gauss-Markov time model (forms [GM 1] and [GM2] above).

The results of these processes may be provided to the process which generates the ionosphere delay differentials for the baselines associated with the rover stations, specifically the differentials generated according to forms [26], [29], and [30]. For form [26], which generates $\Delta_{1,0}\tilde{I}_k$, the results are provided as follows: $\Delta_{1,2}I_k = \Delta_{1,2}\tilde{I}_k$ and $\Delta_{1,3}I_k = \Delta_{1,3}\tilde{I}_k$. For generating the ionosphere delay differentials according to form [29], we set $\Delta_{2,1}I_k = -\Delta_{1,2}\tilde{I}_k$. For generating the ionosphere delay differentials according to form [30], we set $\Delta_{3,1}I_k = \Delta_{3,1}\tilde{I}_k$.

Thus, to summarize a preferred embodiment of the present invention, at each epoch "k" the following occurs for the three baselines between the base stations:

Update of the floating ambiguity estimates by way of forms [45]–[50],

Generate fixed-integer ambiguities (with a process similar to that illustrated by forms [37]–[43]);

Generate estimates of $\Delta_{q,r}\tau_k$ and $\Delta_{q,r}I_k$ by way of form [51] with a process similar to that illustrated by forms [45]–[50]

Check consistency of the ambiguities ($\Delta_{2,1}\hat{N}_k + \Delta_{3,2}\hat{N}_k + \Delta_{1,3}\hat{N}_k = 0$) and time offsets ($\Delta_{2,1}\hat{\tau}_k + \Delta_{3,2}\hat{\tau}_k + \Delta_{1,3}\hat{\tau}_k = 0$);

Generate adjusted estimates $\Delta_{1,2}\tilde{I}_k, \Delta_{2,3}\tilde{I}_k, \Delta_{3,1}\tilde{I}_k$ of the ionosphere delay differentials;

Provide these results to the process of estimating the rover's position using the primary and secondary baselines.

The above base-station to base-station data can be generated by the rover, or by an external source, such as relay station. In the case of rover 100, the means for performing all of the above steps are provided by Between-Base Station processor 140 under the direction of instruction sets stored in an instruction memory, with the various computed data being stored in a data memory. Moreover, while higher accuracy is obtained by generating the fixed-integer ambiguities, lower accuracy embodiments may just generate the floating ambiguities.

Figure 4:
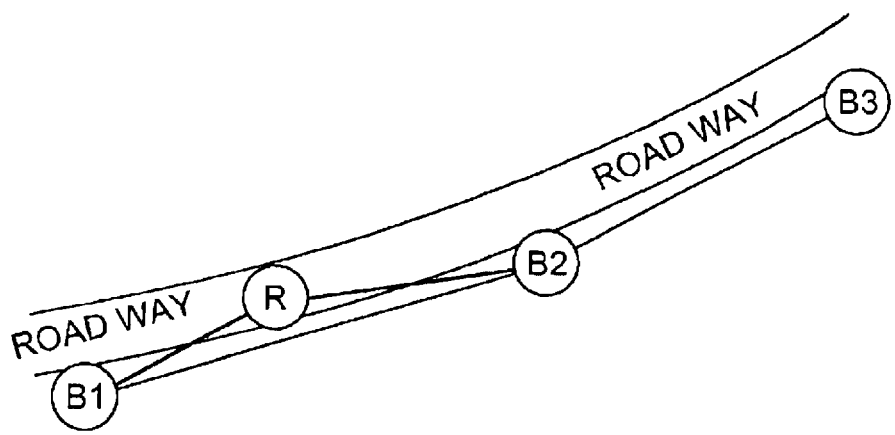
FIG. 4 is a top-plan schematic view of a road application where a reduced level of interpolation of ionosphere delays may be used according to the present invention.

While it is preferable to interpolate the ionosphere delays using two baselines between three base stations, it may be appreciated that some applications may achieve acceptable accuracy by interpolating the ionosphere delays using only one baseline between two base stations. Such an example may be a road project where the road is relatively straight, as shown in FIG. 4.

Each of the above methods of generating the base station data and estimating the coordinates of the rover is preferably implemented by a data processing system, such as a microcomputer, operating under the direction of a set of instructions stored in computer-readable medium, such as ROM, RAM, magnetic tape, magnetic disk, etc. All the methods may be implemented on one data processor, or they may be divided among two or more data processors.

Computer Program Products

It may be appreciated that each of the above methods may comprise the form of a computer program to be installed in a computer for controlling the computer to perform the process for estimating the location of a rover station (R) with the use of at least a first base station (B1) and a second base station (B2), with the process comprising the various steps of the method.

In addition, each of the above methods of generating the base station data and estimating the coordinates of the rover may be implemented by a respective computer program product which directs a data processing system, such as a microcomputer, to perform the steps of the methods. Each computer program product comprises a computer-readable memory, such for example as ROM, RAM, magnetic tape, magnetic disk, etc., and a plurality of sets of instructions embodied on the computer-readable medium, each set directing the data processing system to execute a respective step of the method being implemented. FIG. 7 shows an exemplary comprehensive listing of instructions sets for implementing the above method. Each of the above methods is achieved by selecting the corresponding groups of instruction sets (as apparent from the above discussions). Instruction set #18 is common to all of the methods, and is modified to omit the data which is not used by the particular method.

While the present invention has been particularly described with respect to the illustrated embodiments, it will be appreciated that various alterations, modifications and adaptations may be made based on the present disclosure, and are intended to be within the scope of the present invention. While the invention has been described in connection with what is presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. A method of estimating the location of a rover station (R) with the use of a first base station (B1) and a second base station (B2), the method comprising:
   (a) receiving the known locations of the first base station and the second base station;
   (b) obtaining a first time offset representative of the time difference between the clocks of the first and second base stations;
   (c) receiving measured satellite navigation data as received by the rover, the first base station, and the second base station;
   (d) generating a first set of residuals of differential navigation equations associated with a first baseline (R-B1) between the rover and the first base station, the residuals being related to the measured satellite navigation data received by the rover station and the first base station, the locations of the satellites, and the locations of the rover station and the first base station;
   (e) generating a second set of residuals of differential navigation equations associated with a second baseline (R-B2) between the rover and the second base station, the residuals being related to the measured satellite navigation data received by the rover station and the second base station, the locations of the satellites, and the locations of the rover station and the second base station; and
   (f) generating an estimate of the rover's location from the first set of residuals, the second set of residuals, and the time offset between the clocks of the first and second base stations.

2. The method of claim 1 further comprising the steps of:
   (g) receiving the location of a third base station;
   (h) obtaining a second time offset representative of the time difference between the clocks of the first and third base stations;
   (i) receiving measured satellite navigation data as received by the third base station; and
   (j) generating a third set of residuals of differential navigation equations associated with a third baseline (R-B3) between the rover and the third base station, the residuals being related to the satellite navigation data received by the rover station and the third base station, the locations of the satellites, and the locations of the rover station and the third base station; and
   wherein step (f) generates the estimate of the rover's location further from the third set of residuals and the time offset between the clocks of the first and third base stations.

3. The method of claim 1 wherein step (b) comprises the step of generating the first time offset.

4. The method of claim 2 wherein step (b) comprises the step of generating the first time offset and wherein step (h) comprises the step of generating the second time offset.

5. The method of claim 4 further comprising the steps of generating a third time offset representative of the time difference between the clocks of the second and third base stations, and comparing the sum of the three time offsets around a loop of the base stations to the value of zero.

6. The method of claim 1 wherein the first and second sets of residuals are based on pseudo-range data, and wherein said method further comprises the step of generating a first set of carrier-phase-based residuals of differential navigation equations for the first baseline (R-B1) between the rover and the first base station, the first set of carrier-phase-based residuals being related to at least the measured satellite carrier-phase data received by the rover station and the first base station, the locations of the satellites, and the locations of the rover station and the first base station; and
   wherein step (f) generates the estimate of the rover's location further from the first set of carrier-phase-based residuals.

7. The method of claim 6 further comprising the steps of:
   obtaining a first set of satellite carrier-phase cycle ambiguities associated with the baseline between the first and second base stations;
   generating a second set of carrier-phase-based residuals of differential navigation equations associated with the second baseline (R-B2) between the rover and the second base station, the second set of carrier-phase-based residuals being related to at least the measured satellite carrier-phase data received by the rover station and the second base station, the locations of the satellites, and the locations of the rover station and the second base station; and
   wherein step (f) generates the estimate of the rover's location further from the second set of carrier-phase-based residuals and the first set of satellite-phase cycle ambiguities.

8. The method of claim 7 further comprising the steps of:
   obtaining a second set of satellite carrier-phase cycle ambiguities associated with the baseline between the first and third base stations;
   generating a third set of carrier-phase-based residuals of differential navigation equations associated with the third baseline (R-B3) between the rover and the third base station, the third set of carrier-phase-based residuals being related to at least the measured satellite carrier-phase data received by the rover station and the third base station, the locations of the satellites, and the locations of the rover station and the third base station; and
   wherein step (f) generates the estimate of the rover's location further from the third set of carrier-phase-based residuals and the second set of satellite-phase cycle ambiguities.

9. The method of claim 6 further comprising the step of generating a first set of floating ambiguities for the baseline between the rover and first base station from the first set of carrier-phase-based residuals and at least one of the sets of residuals based on pseudo-range data; and
   wherein step (f) generates the estimate of the rover's location further from the first set of floating ambiguities.

10. The method of claim 6 further comprising the steps of:
generating a first set of floating ambiguities for the baseline between the rover and first base station from the first set of carrier-phase-based residuals and at least one of the sets of residuals based on pseudo-range data; and generating a first set of fixed-integer floating ambiguities for the baseline between the rover and first base station from the first set of floating ambiguities;

wherein step (f) generates the estimate of the rover's location further from the first set of fixed-integer floating ambiguities.

11. The method of claim 7 further comprising the step of:
generating a first set of floating ambiguities for the baseline between the rover and first base station from the first set of carrier-phase-based residuals, the second set of carrier-phase-based residuals, the first set of satellite carrier-phase cycle ambiguities related to the baseline between the first and second base stations, and at least one of the sets of residuals based on pseudo-range data;

wherein step (f) generates the estimate of the rover's location further from the first set of floating ambiguities.

12. The method of claim 7 further comprising the steps of:
generating a first set of floating ambiguities for the baseline between the rover and first base station from the first set of carrier-phase-based residuals, the second set of carrier-phase-based residuals, the first set of satellite carrier-phase cycle ambiguities related to the baseline between the first and second base stations, and at least one of the sets of residuals based on pseudo-range data;

generating a first set of fixed-integer floating ambiguities for the baseline between the rover and first base station from the first set of floating ambiguities;

wherein step (f) generates the estimate of the rover's location further from the first set of fixed-integer floating ambiguities.

13. The method of claim 8 further comprising the step of:
generating a first set of floating ambiguities for the baseline between the rover and first base station from the first set of carrier-phase-based residuals, the second set of carrier-phase-based residuals, the first set of satellite carrier-phase cycle ambiguities related to the baseline between the first and second base stations, the third set of carrier-phase-based residuals, the second set of satellite carrier-phase cycle ambiguities related to the baseline between the first and second base stations, and at least one of the sets of residuals based on pseudo-range data;

wherein step (f) generates the estimate of the rover's location further from the first set of floating ambiguities.

14. The method of claim 8 further comprising the steps of:
generating a first set of floating ambiguities for the baseline between the rover and first base station from the first set of carrier-phase-based residuals, the second set of carrier-phase-based residuals, the first set of satellite carrier-phase cycle ambiguities related to the baseline between the first and second base stations, the third set of carrier-phase-based residuals, the second set of satellite carrier-phase cycle ambiguities related to the baseline between the first and second base stations, and at least one of the sets of residuals based on pseudo-range data;

generating a first set of fixed-integer floating ambiguities for the baseline between the rover and first base station from the first set of floating ambiguities;

wherein step (f) generates the estimate of the rover's location further from the first set of fixed-integer floating ambiguities.

15. The method according to claim 6 further comprising the steps of:
obtaining a first set of first ionosphere delay differentials associated with the satellite signals received along the baseline formed by the first and second base stations, and generating corrections to one or more of the residuals, the corrections being related to the first set of first ionosphere delay differentials, the locations of the first and second base stations, and an estimated location of the rover station; and modifying said one or more of the residuals with said corrections.

16. The method according to claim 8 further comprising the steps of:
obtaining a first set of first ionosphere delay differentials associated with the satellite signals received along the baseline formed by the first and second base stations, obtaining a second set of second ionosphere delay differentials associated with the satellite signals received along the baseline formed by the first and third base stations, and generating corrections to one or more of the residuals, the corrections being related to the first set of first ionosphere delay differentials, the second set of second ionosphere delay differentials, the locations of the base stations, and an estimated location of the rover station; and modifying said one or more of the residuals with said corrections.

17. The method of claim 16 wherein the correction to the residuals associated with satellite "s" in one or both of the second set of residuals and the second set of carrier-phase-based residuals is related to the quantity $(\Delta_{2,1}I_k^s + \Delta_{1,0}\tilde{I}_k^s)$, where $\Delta_{2,1}I_k^s$ is the first ionosphere delay differential associated with satellite "s", and $\Delta_{1,0}\tilde{I}_k^s$ is an estimated ionosphere delay differential associated with satellite "s" along the baseline between the rover and first base station.

18. The method of claim 16 wherein the correction to the residuals associated with satellite "s" in one or both of the third set of residuals and the third set of carrier-phase-based residuals is related to the quantity $(\Delta_{3,1}I_k^s + \Delta_{1,0}\tilde{I}_k^s)$, where $\Delta_{3,1}I_k^s$ is the second ionosphere delay differential associated with satellite "s", and $\Delta_{1,0}\tilde{I}_k^s$ is an estimated ionosphere delay differential associated with satellite "s" along the baseline between the rover and first base station.

19. The method of claim 16 wherein the ionosphere delay differential from the first set and associated with satellite "s" may be denoted as $\Delta_{1,2}I_k^s$, wherein the ionosphere delay differential from the second set and associated with satellite "s" may be denoted as $\Delta_{1,3}I_k^s$, wherein the locations of the first, second, and third base stations may be represented by the vectors $X_1$, $X_2$, and $X_3$, and wherein the estimated location of the rover may be represented as $\overline{X}_{0,k}$, wherein the corrections to one or more of the residuals associated with satellite "s" are related to a quantity $\Delta_{1,0}\tilde{I}_k^s$, where $\Delta_{1,0}\tilde{I}_k^s = (\alpha\Delta_{1,2}I_k^s + \beta\Delta_{1,3}I_k^s)$, wherein $\alpha$ and $\beta$ are constants that satisfy the relationships:

$$\{\bar{X}_{0,k}-X_1\}_n = \alpha\{X_2-X_1\}_n + \beta\{X_3-X_1\}_n$$

$$\{\bar{X}_{0,k}-X_1\}_e = \alpha\{X_2-X_1\}_e + \beta\{X_3-X_1\}_e$$

where notation $\{*\}_n$ denotes the component of the bracketed quantity along the north direction, where notation $\{*\}_e$ denotes the component of the bracketed quantity along the east direction.

20. The method of claim 19 wherein the correction to the residuals associated with satellite "s" in one or both of the second set of residuals and the second set of carrier-phase-based residuals is related to the quantity $(\Delta_{2,1}I_k^s + \Delta_{1,0}\tilde{I}_k^s)$, where $\Delta_{2,1}I_k^s$ is the first ionosphere delay differential associated with satellite "s".

21. The method of claim 19 wherein the correction to the residual associated with satellite "s" in one or both of the third set of residuals and the third set of carrier-phase-based residuals is related to the quantity $(\Delta_{3,1}I_k^s + \Delta_{1,0}\tilde{I}_k^s)$, where $\Delta_{3,1}I_k^s$ is the second ionosphere delay differential associated with satellite "s".

22. The method according to claim 16 further comprising the steps of:
modifying one or more of the above residuals to be dependent upon second order effects in the ionosphere delay corrections applied to the baselines associated with the rover, and
generating an estimate of the second order effects, and
wherein step (f) generates the estimate of the rover's location further from the estimated second order effects.

23. The method according to claim 16 wherein the method generates the first set of first ionosphere delay differentials and the second set of second ionosphere delay differentials from at least the navigation data that it receives from the base stations.

24. The method according to claim 16 further comprising the steps of:
generating an initial estimate of the first set of first ionosphere delay differentials associated with the satellite signals received along the baseline formed by the first and second base stations;
generating an initial estimate of a second set of second ionosphere delay differentials associated with the satellite signals received along the baseline formed by the first and third base stations;
generating an initial estimate of a third set of third ionosphere delay differentials associated with the satellite signals received along the baseline formed by the second and third base stations; and
generating final estimates of the ionosphere delay differentials such that the sum of the final estimates of the first, second, and third ionosphere delay differentials for at least one satellite "s" around a loop of the base stations is substantially zero.

25. The method of claim 7 wherein the step of obtaining the first set of satellite carrier-phase cycle ambiguities comprises the step of generating the first set of satellite carrier-phase cycle ambiguities from at least the locations of the base stations, and measured satellite navigation data as received by the base stations.

26. The method of claim 8 wherein the steps of obtaining the first and second sets of satellite carrier-phase cycle ambiguities comprises the step of generating the first set of satellite carrier-phase cycle ambiguities from at least the locations of the first and second base stations and measured satellite navigation data as received by the first and second base stations, and the step of generating the second set of satellite carrier-phase cycle ambiguities from at least locations of the first and third base stations and measured satellite navigation data as received by the first and third base stations.

27. The method of claim 26 further comprising the steps of generating a third set of satellite carrier-phase cycle ambiguities associated with the baseline between the second and third base stations, and comparing the sum of the three sets of satellite carrier-phase ambiguities around a loop of the base stations to the value of zero.

28. A method of estimating the location of a rover station (R) with the use of a first base station (B1), a second base station (B2), and a third base station (B3), the method comprising:
(a) receiving the known locations of the first base station, the second base station, and the third base station;
(b) obtaining a first set of satellite-phase cycle ambiguities related to the baseline between the first and second base stations, and a second set of satellite-phase cycle ambiguities related to the baseline between the first and third base stations;
(c) obtaining a first time offset representative of the time difference between the clocks of the first and second base stations, and a second time offset representative of the time difference between the clocks of the first and third base stations;
(d) obtaining measured satellite data as received by the rover, the first base station, the second base station, and the third base station;
(e) generating a first set of residuals of differential navigation equations for a first baseline (R-B1) between the rover and the first base station, the residuals being related to at least the measured satellite data received by the rover station and the first base station, the locations of the satellites, and the locations of the rover station and the first base station;
(f) generating a second set of residuals of differential navigation equations for a second baseline (R-B2) between the rover and the second base station, the residuals being related to at least the measured satellite data received by the rover station and the second base station, the locations of the satellites, and the locations of the rover station and the second base station;
(g) generating a third set of residuals of differential navigation equations for a third baseline (R-B3) between the rover and the third base station, the residuals being related to at least the measured satellite data received by the rover station and the third base station, the locations of the satellites, and the locations of the rover station and the third base station;
(h) generating an estimate of the rover's location from the first set of residuals, the second set of residuals, the third set of residuals, the first time offset, the first set of satellite-phase cycle ambiguities, the second time offset, and the second set of satellite-phase cycle ambiguities.

29. The method of claim 28 wherein steps (c)–(h) are repeated in one or more subsequent iterations for one or more corresponding time moments, and wherein step (h) generates, for each subsequent iteration, an estimate of the rover's location from the first set of residuals, the second set of residuals, the third set of residuals, the first time offset, and the second time offset generated for the iteration, and further from at least one estimated rover location generated by a previous iteration, and from at least the first set of satellite-phase cycle ambiguities and the second set of satellite-phase cycle ambiguities.

30. The method of claim 28 wherein step (b) comprises:
   (i) generating a fourth set of residuals of differential navigation equations for a fourth baseline (B1–B2) between the first and second base stations, the residuals being related to at least the measured satellite data received by the first and second base stations, the locations of the satellites, and the locations of the first and second base stations;
   (j) generating a fifth set of residuals of differential navigation equations for a fifth baseline (B1–B3) between the first and third base stations, the residuals being related to at least the measured satellite data received by the first and third base stations, the locations of the satellites, and the locations of the first and third base stations;
   (k) generating a sixth set of residuals of differential navigation equations for a sixth baseline (B2–B3) between the second and third base stations, the residuals being related to at least the measured satellite data received by the second and third base stations, the locations of the satellites, and the locations of the second and third base stations; and
   (l) generating the first set of satellite-phase cycle ambiguities, the second set of satellite-phase cycle ambiguities, and a third set of satellite-phase cycle ambiguities from at least the fourth, fifth, and sixth sets of residuals, wherein the third set of satellite-phase cycle ambiguities is related to the baseline between the second and third base stations.

31. The method of claim 30 wherein step (c) comprises the steps of
   generating a seventh set of residuals of differential navigation equations associated with the fourth baseline (B1–B2) between the first and second base stations, the seventh set of residuals being related to at least the measured satellite data received by the first and second base stations, the locations of the satellites, the locations of the first and second base stations, and the first set of satellite-phase cycle ambiguities;
   generating an eighth set of residuals of differential navigation equations associated with the fifth baseline (B1–B3) between the first and third base stations, the eighth set of residuals being related to at least the measured satellite data received by the first and third base stations, the locations of the satellites, the locations of the first and third base stations, and the second set of satellite-phase cycle ambiguities; and
   generating the first and second time offsets from at least the seventh and eighth sets of residuals.

32. The method of claim 28 wherein step (c) comprises the steps of
   (m) generating a fourth set of residuals of differential navigation equations associated with a fourth baseline (B1–B2) between the first and second base stations, the fourth set of residuals being related to at least the measured satellite data received by the first and second base stations, the locations of the satellites, the locations of the first and second base stations, and the first set of satellite-phase cycle ambiguities;
   (n) generating a fifth set of residuals of differential navigation equations associated with a fifth baseline (B1–B3) between the first and third base stations, the fifth set of residuals being related to at least the measured satellite data received by the first and third base stations, the locations of the satellites, the locations of the first and third base stations, and the second set of satellite-phase cycle ambiguities; and
   (o) generating the first and second time offsets from at least the fourth and fifth sets of residuals.

33. The method of claim 28 further comprising the steps of:
   obtaining a first ionosphere delay differential related to the baseline between the first and second base stations and a second ionosphere delay differential related to the baseline between the first and third base stations;
   generating ionosphere delay corrections for the first, second, and third sets of residuals from at least the first ionosphere delay differential, the second ionosphere delay differential, the locations of the base stations, and an estimated location of the rover; and
   wherein step (e) further generates the first set of residuals in relation to the ionosphere delay correction for the first set of residuals;
   wherein step (f) further generates the second set of residuals in relation to the ionosphere delay correction for the second set of residuals; and
   wherein step (g) further generates the third set of residuals in relation to the ionosphere delay correction for the third set of residuals.

34. A method of estimating the location of a rover station (R) with the use of a first base station (B1) and a second base station (B2), the method comprising:
   (a) receiving the known locations of the first base station and the second base station;
   (b) obtaining the time offset representative of the time difference between the clocks of the first and second base stations, and a set of satellite-phase cycle ambiguities related to the baseline between the first and second base stations;
   (c) obtaining measured satellite data as received by the rover, the first base station, and the second base station;
   (d) generating a first set of residuals of differential navigation equations for a first baseline (R-B1) between the rover and the first base station, the residuals being related to the measured satellite data received by the rover station and the first base station, the locations of the satellites, and the locations of the rover station and the first base station;
   (e) generating a second set of residuals of differential navigation equations for a second baseline (R-B2) between the rover and the second base station, the residuals being related to the measured satellite data received by the rover station and the second base station, the locations of the satellites, and the locations of the rover station and the second base station; and
   (f) estimating the rover's location from the first set of residuals, the second set of residuals, the time offset between the clocks of the first and second base stations, and the set of satellite-phase cycle ambiguities related to the baseline between the first and second base stations.

35. A computer program product for directing a computer processor to estimate the location of a rover station (R) with the use of a first base station (B1) and a second base station (B2), the locations of the first base station and the second base station, and measured satellite data as received by the rover, the first base station, and the second base station, the computer program product comprising:

a computer-readable medium;
an initial set of instructions embodied on the computer-readable medium which directs the data processor to receive the known positions of the base stations;
a first set of instructions embodied on the computer-readable medium which directs the data processor to obtain a first time offset representative of the time difference between the clocks of the first and second base stations;
a second set of instructions embodied on the computer-readable medium which directs the data processor to generate a first set of residuals of differential navigation equations associated with a first baseline (R-B1) between the rover and the first base station, the residuals being related to the measured pseudo-range satellite data received by the rover station and the first base station, the locations of the satellites, and the locations of the rover station and the first base station;
a third set of instructions embodied on the computer-readable medium which directs the data processor to generate a second set of residuals of differential navigation equations associated with a second baseline (R-B2) between the rover and the second base station, the residuals being related to the measured pseudo-range satellite data received by the rover station and the second base station, the locations of the satellites, and the locations of the rover station and the second base station; and
a fourth set of instructions embodied on the computer-readable medium which directs the data processing system to generate an estimate of the rover's location from the first set of residuals, the second set of residuals, and the time offset between the clocks of the first and second base stations.

36. The computer program product of claim 35 further for directing the computer processor to estimate the location of the rover station with a third base station at a known location and with the measured satellite data of the third base station, the computer program product further comprising:
   a fifth set of instructions embodied on the computer-readable medium which directs the data processing system to obtain a second time offset representative of the time difference between the clocks of the first and third base stations;
   a sixth set of instructions embodied on the computer-readable medium which directs the data processing system to generate a third set of residuals of differential navigation equations associated with a third baseline (R-B3) between the rover and the third base station, the residuals being related to the measured pseudo-range satellite data received by the rover station and the third base station, the locations of the satellites, and the locations of the rover station and the third base station; and
   wherein the fourth set of instructions comprises additional instructions that direct the data processing system to generate the estimate of the rover's location further from the third set of residuals and the time offset between the clocks of the first and third base stations.

37. The computer program product of claim 35 further comprising a set of instructions embodied on the computer-readable medium which directs the data processing system to generate a first set of carrier-phase-based residuals of differential navigation equations for the first baseline (R-B1) between the rover and the first base station, the first set of carrier-phase-based residuals being related to at least the measured satellite carrier-phase data received by the rover station and the first base station, the locations of the satellites, and the locations of the rover station and the first base station; and
   wherein the fourth set of instructions comprises additional instructions that direct the data processing system to generate the estimate of the rover's location further from the first set of carrier-phase-based residuals.

38. The computer program product of claim 37 further comprising:
   a seventh set of instructions embodied on the computer-readable medium which directs the data processing system to obtain a first set of satellite carrier-phase cycle ambiguities associated with the baseline between the first and second base stations;
   an eighth set of instructions embodied on the computer-readable medium which directs the data processing system to generate a second set of carrier-phase-based residuals of differential navigation equations for the second baseline (R-B2) between the rover and the second base station, the second set of carrier-phase-based residuals being related to at least the measured satellite carrier-phase data received by the rover station and the second base station, the locations of the satellites, and the locations of the rover station and the second base station; and
   wherein the fourth set of instructions comprises additional instructions that direct the data processing system to generate the estimate of the rover's location further from the second set of carrier-phase-based residuals and the first set of satellite-phase cycle ambiguities.

39. The computer program product of claim 38 further comprising:
   a ninth set of instructions embodied on the computer-readable medium which directs the data processing system to obtain a second set of satellite carrier-phase cycle ambiguities associated with the baseline between the first and third base stations;
   a tenth set of instructions embodied on the computer-readable medium which directs the data processing system to generate a third set of carrier-phase-based residuals of differential navigation equations for the third baseline (R-B3) between the rover and the third base station, the third set of carrier-phase-based residuals being related to at least the measured satellite carrier-phase data received by the rover station and the third base station, the locations of the satellites, and the locations of the rover station and the third base station; and
   wherein the fourth set of instructions comprises additional instructions that direct the data processing system to generate the estimate of the rover's location further from the third set of carrier-phase-based residuals and the second set of satellite-phase cycle ambiguities.

40. A computer program product for directing a data processor to estimate the location of a rover station (R) with the use of a first base station (B1), a second base station (B2), a third base station (B3), the locations of the base stations, and measured satellite data as received by the rover and the base stations, the computer program product comprising:
   a computer-readable medium;
   an initial set of instructions embodied on the computer-readable medium which directs the data processor to receive the known positions of the base stations;
   a first set of instructions embodied on the computer-readable medium which directs the data processor to obtain a first time offset representative of the time difference between the clocks of the first and second base stations;

a second set of instructions embodied on the computer-readable medium which directs the data processor to obtain a second time offset representative of the time difference between the clocks of the first and third base stations;

a third set of instructions embodied on the computer-readable medium which directs the data processor to obtain a third time offset representative of the time difference between the clocks of the second and third base stations;

a fourth set of instructions embodied on the computer-readable medium which directs the data processor to generate a first set of residuals of differential navigation equations associated with a first baseline (R-B1) between the rover and the first base station, the residuals being related to the measured pseudo-range satellite data received by the rover station and the first base station, the locations of the satellites, and the locations of the rover station and the first base station;

a fifth set of instructions embodied on the computer-readable medium which directs the data processor to generate a second set of residuals of differential navigation equations associated with a second baseline (R-B2) between the rover and the second base station, the residuals being related to the measured pseudo-range satellite data received by the rover station and the second base station, the locations of the satellites, and the locations of the rover station and the second base station;

a sixth set of instructions embodied on the computer-readable medium which directs the data processor to generate a third set of residuals of differential navigation equations associated with a third baseline (R-B3) between the rover and the third base station, the residuals being related to the measured pseudo-range satellite data received by the rover station and the third base station, the locations of the satellites, and the locations of the rover station and the third base station; and a seventh set of instructions embodied on the computer-readable medium which directs the data processor to generate an estimate of the rover's location from the first set of residuals, the second set of residuals, the third set of residuals, the time offset between the clocks of the first and second base stations, and the time offset between the clocks of the second and third base stations.

41. The computer program product of claim 40 wherein the first set of instructions comprises instructions that direct the data processor to generate the first time offset from the locations of the first and second base stations and the satellite data received by the first and second base stations;

wherein the second set of instructions comprises instructions that direct the data processor to generate the second time offset from the locations of the first and third base stations and the satellite data received by the first and third base stations; and wherein the third set of instructions comprises instructions that direct the data processor to generate the third time offset from the locations of the second and third base stations and the satellite data received by the second and third base stations.

42. The computer program product of claim 40 further comprising:

an eighth set of instructions embodied on the computer-readable medium which directs the data processor to obtain a first set of satellite carrier-phase cycle ambiguities associated with the baseline between the first and second base stations;

a ninth set of instructions embodied on the computer-readable medium which directs the data processor to obtain a second set of satellite carrier-phase cycle ambiguities associated with the baseline between the first and third base stations;

a tenth set of instructions embodied on the computer-readable medium which directs the data processor to obtain a third set of satellite carrier-phase cycle ambiguities associated with the baseline between the second and third base stations;

an eleventh set of instructions embodied on the computer-readable medium which directs the data processor to generate a first set of carrier-phase-based residuals for the first baseline (R-B1) between the rover and the first base station, the first set of carrier-phase-based residuals of differential navigation equations being related to at least the measured satellite carrier-phase data received by the rover station and the first base station, the locations of the satellites, and the locations of the rover station and the first base station;

a twelfth set of instructions embodied on the computer-readable medium which directs the data processor to generate a second set of carrier-phase-based residuals of differential navigation equations for the second baseline (R-B2) between the rover and the second base station, the second set of carrier-phase-based residuals being related to at least the measured satellite carrier-phase data received by the rover station and the second base station, the locations of the satellites, and the locations of the rover station and the second base station;

a thirteenth set of instructions embodied on the computer-readable medium which directs the data processor to generate a third set of carrier-phase-based residuals of differential navigation equations for the third baseline (R-B3) between the rover and the third base station, the third set of carrier-phase-based residuals being related to at least the measured satellite carrier-phase data received by the rover station and the third base station, the locations of the satellites, and the locations of the rover station and the third base station; and wherein the seventh set of instructions comprises additional instructions that direct the data processor to generate the estimate of the rover's location further from the sets of the carrier-phase-based residuals and the first and second sets of satellite-phase cycle ambiguities.

43. The computer program product of claim 42 wherein the eighth set of instructions comprises instructions that direct the data processor to generate the first set of satellite carrier-phase cycle ambiguities associated with the baseline between the first and second base stations from the measured satellite data and positions of the first and second base stations;

wherein the ninth set of instructions comprises instructions that direct the data processor to generate the second set of satellite carrier-phase cycle ambiguities associated with the baseline between the first and third base stations from the measured satellite data and positions of the first and third base stations; and wherein the tenth set of instructions comprises instructions that direct the data processor to generate the third set of satellite carrier-phase cycle ambiguities associated with the baseline between the second and third base stations from the measured satellite data and positions of the second and third base stations.

44. The computer program product of claim 42 further comprising:

a fourteenth set of instructions embodied on the computer-readable medium which directs the data processor to obtain a first set of first ionosphere delay differentials associated with the satellite signals received along the baseline formed by the first and second base stations, a fifteenth set of instructions embodied on the computer-readable medium which directs the data processor to obtain a second set of second ionosphere delay differentials associated with the satellite signals received along the baseline formed by the first and third base stations, a sixteenth set of instructions embodied on the computer-readable medium which directs the data processor to obtain a third set of third ionosphere delay differentials associated with the satellite signals received along the baseline formed by the second and third base stations, a seventeenth set of instructions embodied on the computer-readable medium which directs the data processor to generate corrections to one or more of the residuals, the corrections being related to at least the first set of first ionosphere delay differentials, the second set of second ionosphere delay differentials, the locations of the base stations, and an estimated location of the rover station; and wherein one or more of the sets of the instructions which direct the processor to generate the residuals further comprises instructions to modify their respective residuals with the corrections.

45. The computer program product of claim 44 wherein the seventeenth set of instructions comprises:

instructions that direct the data processor to generate the corrections to the residuals associated with satellite "s" along the baseline between the first and second base stations in relation to the quantity $(\Delta_{2,1}I_k^s + \Delta_{1,0}\tilde{I}_k^s)$, where $\Delta_{2,1}I_k^s$ is the ionosphere delay differential associated with satellite "s" along the baseline between the first and second base stations, and $\Delta_{1,0}\tilde{I}_k^s$ is an estimated ionosphere delay differential associated with satellite "s" along the baseline between the rover and first base station; and instructions that direct the data processor to generate the corrections to the residuals associated with satellite "s" along the baseline between the first and third base stations in relation to the quantity $(\Delta_{3,1}\tilde{I}_k^s + \Delta_{1,0}\tilde{I}_k^s)$, where $\Delta_{3,1}I_k^s$ is the second ionosphere delay differential associated with satellite "s" along the baseline between the first and second base stations, and $\Delta_{1,0}\tilde{I}_k^s$ is an estimated ionosphere delay differential associated with satellite "s" along the baseline between the rover and first base station.

46. An apparatus for estimating the location of a rover station (R) with the use of a first base station (B1) and a second base station (B2), the apparatus comprising:

(a) means for receiving the locations of the first base station and the second base station;

(b) means for obtaining a first time offset representative of the time difference between the clocks of the first and second base stations;

(c) means for receiving measured satellite navigation data as received by the rover, the first base station, and the second base station;

(d) means for generating a first set of residuals of differential navigation equations associated with a first baseline (R-B1) between the rover and the first base station, the residuals being related to the measured satellite navigation data received by the rover station and the first base station, the locations of the satellites, and the locations of the rover station and the first base station;

(e) means for generating a second set of residuals of differential navigation equations associated with a second baseline (R-B2) between the rover and the second base station, the residuals being related to the measured satellite navigation data received by the rover station and the second base station, the locations of the satellites, and the locations of the rover station and the second base station; and (f) means for generating an estimate of the rover's location from the first set of residuals, the second set of residuals, and the time offset between the clocks of the first and second base stations.

47. The apparatus of claim 46 further comprising:

(g) means for receiving the location of a third base station;

(h) means for obtaining a second time offset representative of the time difference between the clocks of the first and third base stations;

(i) means for receiving measured satellite navigation data as received by the third base station; and (j) means for generating a third set of residuals of differential navigation equations associated with a third baseline (R-B3) between the rover and the third base station, the residuals being related to the satellite navigation data received by the rover station and the third base station, the locations of the satellites, and the locations of the rover station and the third base station; and wherein the means (f) for generating the estimate of the rover's location generates the estimate further from the third set of residuals and the time offset between the clocks of the first and third base stations.

48. The apparatus of claim 46 wherein the means (b) for obtaining the first time offset comprises means for generating the first time offset.

49. The apparatus of claim 47 wherein the means (b) for obtaining the first time offset comprises means for generating the first time offset and wherein the means (h) for obtaining the second time offset comprises means for generating the second time offset.

50. The apparatus of claim 49 further comprising means for generating a third time offset representative of the time difference between the clocks of the second and third base stations, and means for comparing the sum of the three time offsets around a loop of the base stations to the value of zero.

51. The apparatus of claim 46 wherein the first and second sets of residuals are based on pseudo-range data, and wherein the apparatus further comprises means for generating a first set of carrier-phase-based residuals of differential navigation equations for the first baseline (R-B1) between the rover and the first base station, the first set of carrier-phase-based residuals being related to at least the measured satellite carrier-phase data received by the rover station and the first base station, the locations of the satellites, and the locations of the rover station and the first base station; and wherein the means (f) for generating the estimate of the rover's location generates the estimate further from the first set of carrier-phase-based residuals.

52. The apparatus of claim 51 further comprising:

means for obtaining a first set of satellite carrier-phase cycle ambiguities associated with the baseline between the first and second base stations;

means for generating a second set of carrier-phase-based residuals of differential navigation equations associated with the second baseline (R-B2) between the rover and the second base station, the second set of carrier-phase-based residuals being related to at least the measured satellite carrier-phase data received by the rover station and the second base station, the locations of the satellites, and the locations of the rover station and the second base station; and wherein the means (f) for generating the estimate of the rover's location generates the estimate further from the second set of carrier-phase-based residuals and the first set of satellite-phase cycle ambiguities.

53. The apparatus of claim 52 further comprising:

means for obtaining a second set of satellite carrier-phase cycle ambiguities associated with the baseline between the first and third base stations;

means for generating a third set of carrier-phase-based residuals of differential navigation equations associated with the third baseline (R-B3) between the rover and the third base station, the third set of carrier-phase-based residuals being related to at least the measured satellite carrier-phase data received by the rover station and the third base station, the locations of the satellites, and the locations of the rover station and the third base station; and wherein the means (f) for generating the estimate of the rover's location generates the estimate further from the third set of carrier-phase-based residuals and the second set of satellite-phase cycle ambiguities.

54. The apparatus of claim 51 further comprising means for generating a first set of floating ambiguities for the baseline between the rover and first base station from the first set of carrier-phase-based residuals and at least one of the sets of residuals based on pseudo-range data; and wherein the means (f) for generating the estimate of the rover's location generates the estimate further from the first set of floating ambiguities.

55. The apparatus of claim 51 further comprising:

means for generating a first set of floating ambiguities for the baseline between the rover and first base station from the first set of carrier-phase-based residuals and at least one of the sets of residuals based on pseudo-range data; and means for generating a first set of fixed-integer floating ambiguities for the baseline between the rover and first base station from the first set of floating ambiguities;

wherein the means (f) for generating the estimate of the rover's location generates the estimate further from the first set of fixed-integer floating ambiguities.

56. The apparatus of claim 52 further comprising:

means for generating a first set of floating ambiguities for the baseline between the rover and first base station from the first set of carrier-phase-based residuals, the second set of carrier-phase-based residuals, the first set of satellite carrier-phase cycle ambiguities related to the baseline between the first and second base stations, and at least one of the sets of residuals based on pseudo-range data;

wherein the means (f) for generating the estimate of the rover's location generates the estimate further from the first set of floating ambiguities.

57. The apparatus of claim 52 further comprising:

means for generating a first set of floating ambiguities for the baseline between the rover and first base station from the first set of carrier-phase-based residuals, the second set of carrier-phase-based residuals, the first set of satellite carrier-phase cycle ambiguities related to the baseline between the first and second base stations, and at least one of the sets of residuals based on pseudo-range data; and means for generating a first set of fixed-integer floating ambiguities for the baseline between the rover and first base station from the first set of floating ambiguities;

wherein the means (f) for generating the estimate of the rover's location generates the estimate further from the first set of fixed-integer floating ambiguities.

58. The apparatus of claim 53 further comprising:

means for generating a first set of floating ambiguities for the baseline between the rover and first base station from the first set of carrier-phase-based residuals, the second set of carrier-phase-based residuals, the first set of satellite carrier-phase cycle ambiguities related to the baseline between the first and second base stations, the third set of carrier-phase-based residuals, the second set of satellite carrier-phase cycle ambiguities related to the baseline between the first and second base stations, and at least one of the sets of residuals based on pseudo-range data;

wherein the means (f) for generating the estimate of the rover's location generates the estimate further from the first set of floating ambiguities.

59. The apparatus of claim 53 further comprising:

means for generating a first set of floating ambiguities for the baseline between the rover and first base station from the first set of carrier-phase-based residuals, the second set of carrier-phase-based residuals, the first set of satellite carrier-phase cycle ambiguities related to the baseline between the first and second base stations, the third set of carrier-phase-based residuals, the second set of satellite carrier-phase cycle ambiguities related to the baseline between the first and second base stations, and at least one of the sets of residuals based on pseudo-range data;

means for generating a first set of fixed-integer floating ambiguities for the baseline between the rover and first base station from the first set of floating ambiguities;

wherein the means (f) for generating the estimate of the rover's location generates the estimate further from the first set of fixed-integer floating ambiguities.

60. The apparatus according to claim 51 further comprising:

means for obtaining a first set of first ionosphere delay differentials associated with the satellite signals received along the baseline formed by the first and second base stations, and means for generating corrections to one or more of the residuals, the corrections being related to the first set of first ionosphere delay differentials, the locations of the first and second base stations, and an estimated location of the rover station; and means for modifying said one or more of the residuals with said corrections.

61. The apparatus according to claim 53 further comprising:

means for obtaining a first set of first ionosphere delay differentials associated with the satellite signals received along the baseline formed by the first and second base stations, means for obtaining a second set of second ionosphere delay differentials associated with the satellite signals received along the baseline formed by the first and third base stations, and means for generating corrections to one or more of the residuals, the corrections being related to the first set of first ionosphere delay differentials, the second set of second ionosphere delay differentials, the locations of the base stations, and an estimated location of the rover station; and means for modifying said one or more of the residuals with said corrections.

62. The apparatus of claim 61 wherein the correction to the residuals associated with satellite "s" in one or both of the second set of residuals and the second set of carrier-phase-based residuals is related to the quantity $(\Delta_{2,1}I_k^s + \Delta_{1,0}\tilde{I}_k^s)$, where $\Delta_{2,1}I_k^s$ is the first ionosphere delay differential associated with satellite "s", and $\Delta_{1,0}\tilde{I}_k^s$ is an estimated ionosphere delay differential associated with satellite "s" along the baseline between the rover and first base station.

63. The apparatus of claim 61 wherein the correction to the residuals associated with satellite "s" in one or both of the third set of residuals and the third set of carrier-phase-based residuals is related to the quantity $(\Delta_{3,1}I_k^s + \Delta_{1,0}\tilde{I}_k^s)$, where $\Delta_{3,1}I_k^s$ is the second ionosphere delay differential associated with satellite "s", and $\Delta_{1,0}\tilde{I}_k^s$ is an estimated ionosphere delay differential associated with satellite "s" along the baseline between the rover and first base station.

64. The apparatus of claim 61 wherein the ionosphere delay differential from the first set and associated with satellite "s" may be denoted as $\Delta_{1,2}I_k^s$, wherein the ionosphere delay differential from the second set and associated with satellite "s" may be denoted as $\Delta_{1,3}I_k^s$, wherein the locations of the first, second, and third base stations may be represented by the vectors $X_1$, $X_2$, and $X_3$, and wherein the estimated location of the rover may be represented as $\overline{X}_{0,k}$, wherein the corrections to one or more of the residuals associated with satellite "s" are related to a quantity $\Delta_{1,0}\tilde{I}_k^s$, where $\Delta_{1,0}\tilde{I}_k^s = (\alpha\Delta_{1,2}I_k^s + \beta\Delta_{1,3}I_k^s)$, wherein $\alpha$ and $\beta$ are constants that satisfy the relationships:

$\{\overline{X}_{0,k} - X_1\}_n = \alpha\{X_2 - X_1\}_n + \beta\{X_3 - X_1\}_n$ $\{\overline{X}_{0,k} - X_1\}_e = \alpha\{X_2 - X_1\}_e + \beta\{X_3 - X_1\}_e$ where notation $\{*\}_n$ denotes the component of the bracketed quantity along the north direction, where notation $\{*\}_e$ denotes the component of the bracketed quantity along the east direction.

65. The apparatus of claim 64 wherein the correction to the residuals associated with satellite "s" in one or both of the second set of residuals and the second set of carrier-phase-based residuals is related to the quantity $(\Delta_{2,1}I_k^s + \Delta_{1,0}\tilde{I}_k^s)$, where $\Delta_{2,1}I_k^s$ is the first ionosphere delay differential associated with satellite "s".

66. The apparatus of claim 64 wherein the correction to the residual associated with satellite "s" in one or both of the third set of residuals and the third set of carrier-phase-based residuals is related to the quantity $(\Delta_{3,1}I_k^s + \Delta_{1,0}\tilde{I}_k^s)$, where $\Delta_{3,1}I_k^s$ is the second ionosphere delay differential associated with satellite "s".

67. The apparatus according to claim 61 further comprising:

means for modifying one or more of the above residuals to be dependent upon second order effects in the ionosphere delay corrections applied to the baselines associated with the rover, and means for generating an estimate of the second order effects, and wherein the means (f) for generating the estimate of the rover's location generates the estimate further from the estimated second order effects.

68. The apparatus according to claim 61 wherein the apparatus generates the first set of first ionosphere delay differentials and the second set of second ionosphere delay differentials from at least the navigation data that it receives from the base stations.

69. The apparatus according to claim 61 further comprising:

means for generating an initial estimate of the first set of first ionosphere delay differentials associated with the satellite signals received along the baseline formed by the first and second base stations;

means for generating an initial estimate of second set of second ionosphere delay differentials associated with the satellite signals received along the baseline formed by the first and third base stations;

means for generating an initial estimate of a third set of third ionosphere delay differentials associated with the satellite signals received along the baseline formed by the second and third base stations; and means for generating final estimates of the ionosphere delay differentials such that the sum of the final estimates of the first, second, and third ionosphere delay differentials for at least one satellite "s" around a loop of the base stations is substantially zero.

70. The apparatus of claim 52 wherein the means for obtaining the first set of satellite carrier-phase cycle ambiguities comprises means for generating the first set of satellite carrier-phase cycle ambiguities from at least the locations of the base stations, and measured satellite navigation data as received by the base stations.

71. The apparatus of claim 53 wherein the means for obtaining the first and second sets of satellite carrier-phase cycle ambiguities comprises means for generating the first set of satellite carrier-phase cycle ambiguities from at least the locations of the first and second base stations and measured satellite navigation data as received by the first and second base stations, and means for generating the second set of satellite carrier-phase cycle ambiguities from at least the locations of the first and third base stations and measured satellite navigation data as received by the first and third base stations.

72. An apparatus for estimating the location of a rover station (R) with the use of a first base station (B1) and a second base station (B2), the apparatus comprising:

a first antenna which receives navigation satellite signals, a second antenna which receives data signals from the base stations;

a main processor coupled to an instruction memory and a data memory, a satellite-signal demodulator coupled to the first antenna and the main processor, the satellite-signal demodulator demodulating the satellite signals and providing measured satellite data related to the rover's location to the main processor;

a base-station information demodulator coupled to the second antenna and the main processor, the base-station information demodulator demodulating the data signals transmitted by the base stations and providing data demodulated therefrom to the main processor, the data including at least the locations of the base stations and the measured satellite data as received by the base stations;

an initial set of instructions embodied in the instruction memory which directs the main processor to receive the known positions of the base stations;

a first set of instructions embodied in the instruction memory which directs the main processor to obtain a first time offset representative of the time difference between the clocks of the first and second base stations;

a second set of instructions embodied in the instruction memory which directs the main processor to generate a first set of residuals of differential navigation equations associated with a first baseline (R-B1) between the rover and the first base station, the residuals being related to the measured pseudo-range satellite data received by the rover station and the first base station, the locations of the satellites, and the locations of the rover station and the first base station;

a third set of instructions embodied in the instruction memory which directs the main processor to generate a second set of residuals of differential navigation equations associated with a second baseline (R-B2) between the rover and the second base station, the residuals being related to the measured pseudo-range satellite data received by the rover station and the second base station, the locations of the satellites, and the locations of the rover station and the second base station; and a fourth set of instructions embodied in the instruction memory which directs the main processor to generate an estimate of the rover's location from the first set of residuals, the second set of residuals, and the time offset between the clocks of the first and second base stations.

73. The apparatus of claim 72 wherein the apparatus further estimates the location of the rover station with the use of a third base station at a known location and with the measured satellite data of the third base station, the apparatus further comprising:

a fifth set of instructions embodied in the instruction memory which directs the main processor to obtain a second time offset representative of the time difference between the clocks of the first and third base stations;

a sixth set of instructions embodied in the instruction memory which directs the main processor to generate a third set of residuals of differential navigation equations associated with a third baseline (R-B3) between the rover and the third base station, the residuals being related to the measured pseudo-range satellite data received by the rover station and the third base station, the locations of the satellites, and the locations of the rover station and the third base station; and wherein the fourth set of instructions comprises additional instructions that direct the main processor to generate the estimate of the rover's location further from the third set of residuals and the time offset between the clocks of the first and third base stations.

74. The apparatus of claim 72 further comprising a set of instructions embodied in the instruction memory which directs the main processor to generate a first set of carrier-phase-based residuals of differential navigation equations for the first baseline (R-B1) between the rover and the first base station, the first set of carrier-phase-based residuals being related to at least the measured satellite carrier-phase data received by the rover station and the first base station, the locations of the satellites, and the locations of the rover station and the first base station; and wherein the fourth set of instructions comprises additional instructions that direct the main processor to generate the estimate of the rover's location further from the first set of carrier-phase-based residuals.

75. The apparatus of claim 74 further comprising:

a seventh set of instructions embodied in the instruction memory which directs the main processor to obtain a first set of satellite carrier-phase cycle ambiguities associated with the baseline between the first and second base stations;

an eighth set of instructions embodied in the instruction memory which directs the main processor to generate a second set of carrier-phase-based residuals of differential navigation equations for the second baseline (R-B2) between the rover and the second base station, the second set of carrier-phase-based residuals being related to at least the measured satellite carrier-phase data received by the rover station and the second base station, the locations of the satellites, and the locations of the rover station and the second base station; and wherein the fourth set of instructions comprises additional instructions that direct the main processor to generate the estimate of the rover's location further from the second set of carrier-phase-based residuals and the first set of satellite-phase cycle ambiguities.

76. The computer program product of claim 75 further comprising:

a ninth set of instructions embodied in the instruction memory which directs the main processor to obtain a second set of satellite carrier-phase cycle ambiguities associated with the baseline between the first and third base stations;

a tenth set of instructions embodied in the instruction memory which directs the main processor to generate a third set of carrier-phase-based residuals of differential navigation equations for the third baseline (R-B3) between the rover and the third base station, the third set of carrier-phase-based residuals being related to at least the measured satellite carrier-phase data received by the rover station and the third base station, the locations of the satellites, and the locations of the rover station and the third base station; and wherein the fourth set of instructions comprises additional instructions that direct the main processor to generate the estimate of the rover's location further from the third set of carrier-phase-based residuals and the second set of satellite-phase cycle ambiguities.

77. The apparatus of claim 76 further comprising:

an eleventh set of instructions embodied in the instruction memory which directs the main processor to obtain a first set of first ionosphere delay differentials associated with the satellite signals received along the baseline formed by the first and second base stations, a twelfth set of instructions embodied in the instruction memory which directs the main processor to obtain a second set of second ionosphere delay differentials associated with the satellite signals received along the baseline formed by the first and third base stations, a thirteenth set of instructions embodied in the instruction memory which directs the main processor to obtain a third set of third ionosphere delay differentials associated with the satellite signals received along the baseline formed by the second and third base stations, a fourteenth set of instructions embodied in the instruction memory which directs the main processor to generate corrections to one or more of the residuals, the corrections being related to at least the first set of first ionosphere delay differentials, the second set of second ionosphere delay differentials, the locations of the base stations, and an estimated location of the rover station; and wherein one or more of the sets of the instructions which direct the main processor to generate the residuals further comprises instructions to modify their respective residuals with the corrections.

78. The computer program product of claim 77 wherein the fourteenth set of instruction comprises:

instructions that direct the main processor to generate the corrections to the residuals associated with satellite "s" along the baseline between the first and second base stations in relation to the quantity $(\Delta_{2,1}I_k^s + \Delta_{1,0}\tilde{I}_k^s)$, where $\Delta_{2,1}I_k^s$ is the ionosphere delay differential associated with satellite "s" along the baseline between the first and second base stations, and $\Delta_{1,0}\tilde{I}_k^s$ is an estimated ionosphere delay differential associated with satellite "s" along the baseline between the rover and first base station; and instructions that direct the main processor to generate the corrections to the residuals associated with satellite "s" along the baseline between the first and third base stations in relation to the quantity $(\Delta_{3,1}I_k^s + \Delta_{1,0}\tilde{I}_k^s)$, where $\Delta_{3,1}I_k^s$ is the second ionosphere delay differential associated with satellite "s" along the baseline between the first and second base stations, and $\Delta_{1,0}\tilde{I}_k^s$ is an estimated ionosphere delay differential associated with satellite "s" along the baseline between the rover and first base station.

* * * * *